US012717468B1

(12) United States Patent
Weinshtock et al.

(10) Patent No.: US 12,717,468 B1
(45) Date of Patent: Aug. 25, 2026

(54) SYSTEMS AND METHODS FOR PROGRESSIVE UI SEGMENTATION FOR PRECISION SELECTION

(71) Applicant: MONDAY.COM LTD., Tel Aviv (IL)

(72) Inventors: Matanya Weinshtock, Jerusalem (IL); Zvi Markfeld, Pardes Hanna-Karkur (IL)

(73) Assignee: MONDAY.COM LTD., Tel Aviv (IL)

( * ) Notice: Subject to any disclaimer, the term of this patent is extended or adjusted under 35 U.S.C. 154(b) by 0 days.

(21) Appl. No.: 19/371,511

(22) Filed: Oct. 28, 2025

Related U.S. Application Data

(60) Provisional application No. 63/763,309, filed on Feb. 26, 2025.

(51) Int. Cl.
*G06F 3/04847* (2022.01)
*G06F 3/04842* (2022.01)

(52) U.S. Cl.
CPC ...... *G06F 3/04847* (2013.01); *G06F 3/04842* (2013.01)

(58) Field of Classification Search
None
See application file for complete search history.

(56) References Cited

U.S. PATENT DOCUMENTS 4,972,314 A 11/1990 Getzinger et al.
5,220,657 A 6/1993 Bly et al.
(Continued)

FOREIGN PATENT DOCUMENTS

CA 2828011 A1 9/2012
CN 103064833 A 4/2013
(Continued)

OTHER PUBLICATIONS

Abor Jr. C., "Low-Code and No-Code AI: New AI Development—What is code anymore ?!?!" Linkedin, Published Jul. 15, 2023, Retrieved from <https://www.linkedin.com/pulse/ low-code-no-code-ai-new-development-what-code-anymore-c-l-abor-jr>, 15 pages.
(Continued)

*Primary Examiner* — Tuan S Nguyen
(74) *Attorney, Agent, or Firm* — Finnegan, Henderson, Farabow, Garrett & Dunner LLP

(57) ABSTRACT

Systems, methods, and computer-readable medium containing instructions are disclosed for user interface control via control option segmentation, including: outputting signals for causing distinct control options to be presented in distinct selectable regions of a display, including first control options displayed in a first selectable region and second control options displayed in a second selectable region; receiving a selection of the second selectable region; in response, outputting signals for modifying the display to partition the second selectable region into additional distinct selectable regions including third control options displayed in a third selectable region and fourth control options displayed in a fourth selectable region; receiving a selection of the fourth selectable region; in response, outputting signals for modifying the display to partition the fourth selectable region into further distinct selectable regions including fifth control options displayed in a fifth selectable region and sixth control options displayed in a sixth selectable region.

27 Claims, 19 Drawing Sheets

(56) References Cited

U.S. PATENT DOCUMENTS 5,479,602 A 12/1995 Baecker et al.
5,517,663 A 5/1996 Kahn
5,632,009 A 5/1997 Rao et al.
5,657,437 A 8/1997 Bishop et al.
5,682,469 A 10/1997 Linnett et al.
5,696,702 A 12/1997 Skinner et al.
5,726,701 A 3/1998 Needham
5,734,837 A 3/1998 Flores et al.
5,787,411 A 7/1998 Groff et al.
5,844,555 A 12/1998 Menaker et al.
5,880,742 A 3/1999 Rao et al.
5,933,145 A 8/1999 Meek
5,987,469 A 11/1999 Lewis et al.
5,999,911 A 12/1999 Berg et al.
6,016,438 A 1/2000 Wakayama
6,016,553 A 1/2000 Schneider et al.
6,023,695 A 2/2000 Osborn et al.
6,034,681 A 3/2000 Miller et al.
6,049,622 A 4/2000 Robb et al.
6,088,707 A 7/2000 Bates et al.
6,108,573 A 8/2000 Debbins et al.
6,111,573 A 8/2000 Mccomb et al.
6,157,381 A 12/2000 Bates et al.
6,167,405 A 12/2000 Rosensteel et al.
6,169,534 B1 1/2001 Raffel et al.
6,182,127 B1 1/2001 Cronin, III et al.
6,185,582 B1 2/2001 Zellweger et al.
6,195,794 B1 2/2001 Buxton
6,222,541 B1 4/2001 Bates et al.
6,252,594 B1 6/2001 Xia et al.
6,266,067 B1 7/2001 Owen et al.
6,275,809 B1 8/2001 Tamaki et al.
6,330,022 B1 12/2001 Seligmann
6,377,965 B1 4/2002 Fries et al.
6,385,617 B1 5/2002 Malik
6,460,043 B1 10/2002 Tabbara et al.
6,496,832 B2 12/2002 Chi et al.
6,509,912 B1 1/2003 Moran et al.
6,510,459 B2 1/2003 Cronin et al.
6,522,347 B1 2/2003 Tsuji et al.
6,527,556 B1 3/2003 Koskinen
6,567,830 B1 5/2003 Madduri
6,606,740 B1 8/2003 Lynn et al.
6,626,959 B1 9/2003 Moise et al.
6,636,242 B2 10/2003 Bowman-Amuah
6,647,370 B1 11/2003 Fu et al.
6,661,431 B1 12/2003 Stuart et al.
6,874,010 B1 3/2005 Sargent
6,988,248 B1 1/2006 Tang et al.
7,027,052 B1 4/2006 Thorn et al.
7,027,997 B1 4/2006 Robinson et al.
7,034,860 B2 4/2006 Lia et al.
7,043,529 B1 5/2006 Simonoff
7,054,891 B2 5/2006 Cole
7,086,007 B1 8/2006 Bushey et al.
7,228,492 B1 6/2007 Graham
7,237,188 B1 6/2007 Leung
7,249,042 B1 7/2007 Doerr et al.
7,272,637 B1 9/2007 Himmelstein
7,274,375 B1 9/2007 David
7,379,934 B1 5/2008 Forman et al.
7,380,202 B1 5/2008 Lindhorst et al.
7,383,320 B1 6/2008 Silberstein et al.
7,389,473 B1 6/2008 Sawicki et al.
7,415,664 B2 8/2008 Aureglia et al.
7,417,644 B2 8/2008 Cooper et al.
7,461,077 B1 12/2008 Greenwood
7,464,366 B2 12/2008 Shukla et al.
7,489,976 B2 2/2009 Adra
7,565,270 B2 7/2009 Bramwell et al.
7,617,443 B2 11/2009 Mills et al.
7,685,152 B2 3/2010 Chivukula et al.
7,707,514 B2 4/2010 Forstall et al.
7,710,290 B2 5/2010 Johnson
7,747,782 B2 6/2010 Hunt et al.
7,770,100 B2 8/2010 Chamberlain et al.
7,827,476 B1 11/2010 Roberts et al.
7,827,615 B1 11/2010 Allababidi et al.
7,836,408 B1 11/2010 Ollmann et al.
7,885,847 B2 2/2011 Wodtke et al.
7,916,157 B1 3/2011 Kelley et al.
7,921,360 B1 4/2011 Sundermeyer et al.
7,933,952 B2 4/2011 Parker et al.
7,945,622 B1 5/2011 Pegg
7,954,043 B2 5/2011 Bera
7,954,064 B2 5/2011 Forstall et al.
8,046,703 B2 10/2011 Busch et al.
8,060,518 B2 11/2011 Timmons
8,078,955 B1 12/2011 Gupta
8,082,274 B2 12/2011 Steinglass et al.
8,108,241 B2 1/2012 Shukoor
8,136,031 B2 3/2012 Massand
8,151,213 B2 4/2012 Weitzman et al.
8,223,172 B1 7/2012 Miller et al.
8,286,072 B2 10/2012 Chamberlain et al.
8,365,095 B2 1/2013 Bansal et al.
8,375,327 B2 2/2013 Lorch et al.
8,386,960 B1 2/2013 Eismann et al.
8,407,217 B1 3/2013 Zhang
8,413,261 B2 4/2013 Nemoy et al.
8,423,909 B2 4/2013 Zabielski
8,543,566 B2 9/2013 Weissman et al.
8,548,997 B1 10/2013 Wu
8,560,942 B2 10/2013 Fortes et al.
8,566,732 B2 10/2013 Louch et al.
8,572,173 B2 10/2013 Briere et al.
8,578,399 B2 11/2013 Khen et al.
8,601,383 B2 12/2013 Folting et al.
8,620,703 B1 12/2013 Kapoor et al.
8,621,652 B2 12/2013 Slater
8,635,520 B2 1/2014 Christiansen et al.
8,660,881 B2 2/2014 Wood et al.
8,677,448 B1 3/2014 Kauffman et al.
8,689,131 B2 4/2014 Ali et al.
8,694,981 B2 4/2014 Federighi et al.
8,719,071 B2 5/2014 MacIntyre et al.
8,738,414 B1 5/2014 Nagar et al.
8,812,471 B2 8/2014 Akita
8,819,042 B2 8/2014 Samudrala et al.
8,825,758 B2 9/2014 Bailor et al.
8,838,533 B2 9/2014 Kwiatkowski et al.
8,862,979 B2 10/2014 Hawking
8,863,022 B2 10/2014 Rhodes et al.
8,869,027 B2 10/2014 Louch et al.
8,910,062 B2 12/2014 Bangor
8,937,627 B1 1/2015 Otero et al.
8,938,465 B2 1/2015 Messer
8,954,871 B2 2/2015 Louch et al.
9,007,405 B1 4/2015 Eldar et al.
9,015,716 B2 4/2015 Fletcher et al.
9,021,118 B2 4/2015 John et al.
9,026,897 B2 5/2015 Zarras
9,043,362 B2 5/2015 Weissman et al.
9,063,958 B2 6/2015 Muller et al.
9,129,234 B2 9/2015 Campbell et al.
9,159,246 B2 10/2015 Rodriguez et al.
9,172,738 B1 10/2015 Dacosta
9,177,238 B2 11/2015 Windmueller et al.
9,183,303 B1 11/2015 Goel et al.
9,223,770 B1 12/2015 Ledet
9,239,719 B1 1/2016 Feinstein et al.
9,244,917 B1 1/2016 Sharma et al.
9,253,130 B2 2/2016 Zaveri
9,268,604 B1 2/2016 Herzberg et al.
9,286,246 B2 3/2016 Saito et al.
9,286,475 B2 3/2016 Li et al.
9,292,587 B2 3/2016 Kann et al.
9,336,502 B2 5/2016 Mohammad et al.
9,342,579 B2 5/2016 Cao et al.
9,361,287 B1 6/2016 Simon et al.
9,372,592 B1 6/2016 Goodspeed et al.
9,390,059 B1 7/2016 Gur et al.
9,395,959 B2 7/2016 Hatfield et al.
9,424,287 B2 8/2016 Schroth

(56) References Cited

U.S. PATENT DOCUMENTS 9,424,333 B1 8/2016 Bisignani et al.
9,424,545 B1 8/2016 Lee
9,430,458 B2 8/2016 Rhee et al.
9,449,031 B2 9/2016 Barrus et al.
9,495,386 B2 11/2016 Tapley et al.
9,519,699 B1 12/2016 Kulkarni et al.
9,558,172 B2 1/2017 Rampson et al.
9,569,511 B2 2/2017 Morin
9,613,086 B1 4/2017 Sherman
9,635,091 B1 4/2017 Laukkanen et al.
9,659,284 B1 5/2017 Wilson et al.
9,679,456 B2 6/2017 East
9,686,086 B1 6/2017 Nguyen et al.
9,720,602 B1 8/2017 Chen et al.
9,727,376 B1 8/2017 Bills et al.
9,760,271 B2 9/2017 Persaud
9,779,150 B1 10/2017 Sherman et al.
9,794,256 B2 10/2017 Kiang et al.
9,798,829 B1 10/2017 Baisley
9,811,676 B1 11/2017 Gauvin
9,866,561 B2 1/2018 Psenka et al.
9,870,136 B2 1/2018 Pourshahid
9,911,092 B2 3/2018 Goja
10,001,908 B2 6/2018 Grieve et al.
10,043,296 B2 8/2018 Li
10,057,246 B1 8/2018 Drozd et al.
10,067,928 B1 9/2018 Krappe
10,078,668 B1 9/2018 Woodrow et al.
10,169,306 B2 1/2019 O'Shaughnessy et al.
10,176,154 B2 1/2019 Ben-Aharon et al.
10,235,441 B1 3/2019 Makhlin et al.
10,255,609 B2 4/2019 Kinkead et al.
10,282,405 B1 5/2019 Silk et al.
10,282,406 B2 5/2019 Bissantz
10,311,080 B2 6/2019 Folting et al.
10,318,624 B1 6/2019 Rosner et al.
10,327,712 B2 6/2019 Beymer et al.
10,347,017 B2 7/2019 Ruble et al.
10,372,706 B2 8/2019 Chavan et al.
10,380,140 B2 8/2019 Sherman
10,419,469 B1 9/2019 Singh et al.
10,423,758 B2 9/2019 Kido et al.
10,445,702 B1 10/2019 Hunt
10,452,360 B1 10/2019 Burman et al.
10,453,118 B2 10/2019 Smith et al.
10,474,317 B2 11/2019 Ramanathan et al.
10,489,391 B1 11/2019 Tomlin
10,489,462 B1 11/2019 Rogynskyy et al.
10,496,737 B1 12/2019 Sayre et al.
10,505,825 B1 12/2019 Bettaiah et al.
10,528,599 B1 1/2020 Pandis et al.
10,534,507 B1 1/2020 Laukkanen et al.
10,540,152 B1 1/2020 Krishnaswamy et al.
10,540,434 B2 1/2020 Migeon et al.
10,546,001 B1 1/2020 Nguyen et al.
10,564,622 B1 2/2020 Dean et al.
10,573,407 B2 2/2020 Ginsburg
10,579,724 B2 3/2020 Campbell et al.
10,581,675 B1 3/2020 Iyer et al.
10,587,714 B1 3/2020 Kulkarni et al.
10,602,332 B2 3/2020 Dong et al.
10,628,002 B1 4/2020 Kang et al.
10,649,739 B2 5/2020 Burges et al.
10,698,594 B2 6/2020 Sanches et al.
10,706,061 B2 7/2020 Sherman et al.
10,719,220 B2 7/2020 Ouellet et al.
10,719,311 B2 7/2020 Foskett et al.
10,733,256 B2 8/2020 Fickenscher et al.
10,740,117 B2 8/2020 Ording et al.
10,747,764 B1 8/2020 Plenderleith
10,747,950 B2 8/2020 Dang et al.
10,748,312 B2 8/2020 Ruble et al.
10,754,688 B2 8/2020 Powell
10,761,691 B2 9/2020 Anzures et al.
10,762,471 B1 9/2020 Wang et al.
10,795,555 B2 10/2020 Burke et al.
10,795,649 B1 10/2020 Drake et al.
10,809,696 B1 10/2020 Principato
10,817,660 B2 10/2020 Rampson et al.
D910,077 S 2/2021 Naroshevitch et al.
10,955,992 B2 3/2021 Hooton et al.
10,963,578 B2 3/2021 More et al.
10,997,531 B2 5/2021 Leonelli et al.
11,010,371 B1 5/2021 Slomka et al.
11,030,259 B2 6/2021 Mullins et al.
11,042,363 B1 6/2021 Krishnaswamy et al.
11,042,699 B1 6/2021 Sayre et al.
11,044,257 B1 6/2021 Heuts et al.
11,048,499 B2 6/2021 Foskett et al.
11,048,714 B2 6/2021 Sherman et al.
11,080,636 B1 8/2021 Son
11,086,894 B1 8/2021 Srivastava et al.
11,128,464 B1 9/2021 Loladia
11,144,854 B1 10/2021 Mouawad
11,182,218 B2 11/2021 Sanchez et al.
11,190,516 B1 11/2021 Loladia
11,222,167 B2 1/2022 Gehrmann et al.
11,231,862 B1 1/2022 Vig et al.
11,240,278 B1 2/2022 Wang et al.
11,243,688 B1 2/2022 Remy et al.
11,301,623 B2 4/2022 Helft et al.
11,341,705 B1 5/2022 Isaacs et al.
11,356,485 B2 6/2022 Hegde et al.
11,360,765 B2 6/2022 Miller et al.
11,372,380 B2 6/2022 Iyer et al.
11,405,504 B1 8/2022 Tripathy et al.
11,429,384 B1 8/2022 Navert et al.
11,443,390 B1 9/2022 Caligaris et al.
11,494,171 B1 11/2022 Acharya et al.
11,501,255 B2 11/2022 Mann et al.
11,513,772 B1 11/2022 Gross
11,570,182 B1 1/2023 Tran et al.
11,593,096 B1 2/2023 Chaptini et al.
11,593,477 B1 2/2023 Thimmegowda et al.
11,620,615 B2 4/2023 Jiang et al.
11,663,023 B2 5/2023 Syed et al.
11,681,445 B2 6/2023 Vohra et al.
11,682,091 B2 6/2023 Sukman et al.
11,714,612 B2 8/2023 Accardo et al.
11,720,410 B2 8/2023 Culp et al.
11,750,475 B1 9/2023 Gonzalez et al.
11,799,951 B1 10/2023 Maloo et al.
11,823,269 B2 11/2023 Aisen et al.
11,882,117 B1 1/2024 Kumar
11,922,222 B1 3/2024 Chawla et al.
11,977,858 B2 5/2024 Kulkarni et al.
12,034,613 B2 7/2024 Gupta et al.
12,056,664 B2 8/2024 Zionpour et al.
12,094,018 B1 9/2024 O'Malley
12,105,939 B1 10/2024 Rank et al.
12,118,490 B1 10/2024 Hooks et al.
2001/0008998 A1 7/2001 Tamaki et al.
2001/0032248 A1 10/2001 Krafchin
2001/0039551 A1 11/2001 Saito et al.
2002/0002459 A1 1/2002 Lewis et al.
2002/0019827 A1 2/2002 Shiman et al.
2002/0065848 A1 5/2002 Walker et al.
2002/0065849 A1 5/2002 Ferguson et al.
2002/0065880 A1 5/2002 Hasegawa et al.
2002/0069207 A1 6/2002 Alexander et al.
2002/0075309 A1 6/2002 Michelman et al.
2002/0082892 A1 6/2002 Raffel et al.
2002/0099777 A1 7/2002 Gupta et al.
2002/0138528 A1 9/2002 Gong et al.
2003/0004771 A1 1/2003 Yaung
2003/0033196 A1 2/2003 Tomlin
2003/0041113 A1 2/2003 Larsen
2003/0051377 A1 3/2003 Chirafesi
2003/0052912 A1 3/2003 Bowman et al.
2003/0058277 A1 3/2003 Bowman-Amuah
2003/0065662 A1 4/2003 Cosic
2003/0093408 A1 5/2003 Brown et al.
2003/0101416 A1 5/2003 Mcinnes et al.
2003/0135558 A1 7/2003 Bellotti et al.

(56) References Cited

U.S. PATENT DOCUMENTS

2003/0137536 A1 7/2003 Hugh
2003/0187864 A1 10/2003 Mcgoveran
2003/0200215 A1 10/2003 Chen et al.
2003/0204490 A1 10/2003 Kasriel
2003/0233224 A1 12/2003 Marchisio et al.
2004/0010514 A1 1/2004 Agarwal et al.
2004/0032432 A1 2/2004 Baynger
2004/0078105 A1 4/2004 Moon et al.
2004/0078373 A1 4/2004 Ghoneimy et al.
2004/0098284 A1 5/2004 Petito et al.
2004/0111666 A1 6/2004 Hollcraft
2004/0119713 A1 6/2004 Meyringer
2004/0133441 A1 7/2004 Brady et al.
2004/0138939 A1 7/2004 Theiler
2004/0139400 A1 7/2004 Allam et al.
2004/0162833 A1 8/2004 Jones et al.
2004/0168115 A1 8/2004 Bauernschmidt et al.
2004/0172592 A1 9/2004 Collie et al.
2004/0212615 A1 10/2004 Uthe
2004/0215443 A1 10/2004 Hatton
2004/0230940 A1 11/2004 Cooper et al.
2004/0268227 A1 12/2004 Brid
2005/0010454 A1 1/2005 Falk et al.
2005/0034058 A1 2/2005 Mills et al.
2005/0034064 A1 2/2005 Meyers et al.
2005/0039001 A1 2/2005 Hudis et al.
2005/0039033 A1 2/2005 Meyers et al.
2005/0044486 A1 2/2005 Kotler et al.
2005/0060342 A1 3/2005 Farag
2005/0063615 A1 3/2005 Siegel et al.
2005/0066306 A1 3/2005 Diab
2005/0086360 A1 4/2005 Mamou et al.
2005/0091314 A1 4/2005 Blagsvedt et al.
2005/0091596 A1 4/2005 Anthony et al.
2005/0096973 A1 5/2005 Heyse et al.
2005/0114305 A1 5/2005 Haynes et al.
2005/0125395 A1 6/2005 Boettiger
2005/0149908 A1 7/2005 Klianev
2005/0165600 A1 7/2005 Kasravi et al.
2005/0171881 A1 8/2005 Ghassemieh et al.
2005/0210371 A1 9/2005 Pollock et al.
2005/0216830 A1 9/2005 Turner et al.
2005/0228250 A1 10/2005 Bitter et al.
2005/0251021 A1 11/2005 Kaufman et al.
2005/0257204 A1 11/2005 Bryant et al.
2005/0278297 A1 12/2005 Nelson
2005/0289170 A1 12/2005 Brown et al.
2005/0289342 A1 12/2005 Needham et al.
2005/0289453 A1 12/2005 Segal et al.
2006/0009960 A1 1/2006 Valencot et al.
2006/0013462 A1 1/2006 Sadikali
2006/0015499 A1 1/2006 Clissold et al.
2006/0015806 A1 1/2006 Wallace
2006/0031148 A1 2/2006 O'Dell et al.
2006/0031764 A1 2/2006 Keyser et al.
2006/0036568 A1 2/2006 Moore et al.
2006/0044307 A1 3/2006 Song
2006/0047553 A1 3/2006 Fuhrmann et al.
2006/0047811 A1 3/2006 Lau et al.
2006/0053096 A1 3/2006 Subramanian et al.
2006/0053194 A1 3/2006 Schneider et al.
2006/0069604 A1 3/2006 Leukart et al.
2006/0069635 A1 3/2006 Ram et al.
2006/0074735 A1 4/2006 Shukla et al.
2006/0080594 A1 4/2006 Chavoustie et al.
2006/0085744 A1 4/2006 Hays et al.
2006/0090169 A1 4/2006 Daniels et al.
2006/0095276 A1 5/2006 Axelrod et al.
2006/0101324 A1 5/2006 Goldberg et al.
2006/0106642 A1 5/2006 Reicher et al.
2006/0107196 A1 5/2006 Thanu et al.
2006/0111953 A1 5/2006 Setya
2006/0112123 A1 5/2006 Clark et al.
2006/0129415 A1 6/2006 Thukral et al.
2006/0129913 A1 6/2006 Vigesaa et al.
2006/0136828 A1 6/2006 Asano
2006/0150090 A1 7/2006 Swamidass
2006/0173762 A1 8/2006 Clater
2006/0173908 A1 8/2006 Browning et al.
2006/0190313 A1 8/2006 Lu
2006/0212299 A1 9/2006 Law
2006/0224542 A1 10/2006 Yalamanchi
2006/0224568 A1 10/2006 Debrito
2006/0224946 A1 10/2006 Barrett et al.
2006/0236246 A1 10/2006 Bono et al.
2006/0250369 A1 11/2006 Keim
2006/0253205 A1 11/2006 Gardiner
2006/0271574 A1 11/2006 Villaron et al.
2006/0271859 A1 11/2006 Gorzela
2006/0282348 A1 12/2006 Greenfield et al.
2006/0287998 A1 12/2006 Folting et al.
2006/0294451 A1 12/2006 Kelkar et al.
2007/0027932 A1 2/2007 Thibeault
2007/0032993 A1 2/2007 Yamaguchi et al.
2007/0033531 A1 2/2007 Marsh
2007/0050322 A1 3/2007 Vigesaa et al.
2007/0050379 A1 3/2007 Day et al.
2007/0050710 A1 3/2007 Redekop
2007/0067373 A1 3/2007 Higgins et al.
2007/0073899 A1 3/2007 Judge et al.
2007/0092048 A1 4/2007 Chelstrom et al.
2007/0094607 A1 4/2007 Morgan et al.
2007/0101291 A1 5/2007 Forstall et al.
2007/0106754 A1 5/2007 Moore
2007/0118527 A1 5/2007 Winje et al.
2007/0118813 A1 5/2007 Forstall et al.
2007/0143169 A1 6/2007 Grant et al.
2007/0143736 A1 6/2007 Moriarty et al.
2007/0150389 A1 6/2007 Aamodt et al.
2007/0168861 A1 7/2007 Bell et al.
2007/0174228 A1 7/2007 Folting et al.
2007/0174760 A1 7/2007 Chamberlain et al.
2007/0186173 A1 8/2007 Both et al.
2007/0192729 A1 8/2007 Downs
2007/0220119 A1 9/2007 Himmelstein
2007/0233647 A1 10/2007 Rawat et al.
2007/0239746 A1 10/2007 Masselle et al.
2007/0256043 A1 11/2007 Peters et al.
2007/0282522 A1 12/2007 Geelen
2007/0282627 A1 12/2007 Greenstein et al.
2007/0283259 A1 12/2007 Barry et al.
2007/0294235 A1 12/2007 Millett
2007/0299795 A1 12/2007 Macbeth et al.
2007/0300174 A1 12/2007 Macbeth et al.
2007/0300185 A1 12/2007 Macbeth et al.
2008/0004929 A9 1/2008 Raffel et al.
2008/0005235 A1 1/2008 Hegde et al.
2008/0010615 A1 1/2008 Curtis et al.
2008/0033777 A1 2/2008 Shukoor
2008/0034307 A1 2/2008 Cisler et al.
2008/0034314 A1 2/2008 Louch et al.
2008/0040181 A1 2/2008 Freire et al.
2008/0046816 A1 2/2008 Cao et al.
2008/0052291 A1 2/2008 Bender
2008/0059312 A1 3/2008 Gern et al.
2008/0059539 A1 3/2008 Chin et al.
2008/0065460 A1 3/2008 Raynor
2008/0077530 A1 3/2008 Banas et al.
2008/0088628 A1 4/2008 Lu et al.
2008/0097748 A1 4/2008 Haley et al.
2008/0104091 A1 5/2008 Chin
2008/0126389 A1 5/2008 Mush et al.
2008/0126945 A1 5/2008 Munkvold et al.
2008/0127205 A1 5/2008 Barros
2008/0133736 A1 6/2008 Wensley et al.
2008/0148140 A1 6/2008 Nakano
2008/0155547 A1 6/2008 Weber et al.
2008/0163075 A1 7/2008 Beck et al.
2008/0183593 A1 7/2008 Dierks
2008/0195948 A1 8/2008 Bauer
2008/0209318 A1 8/2008 Allsop et al.
2008/0216022 A1 9/2008 Lorch et al.
2008/0221946 A1 9/2008 Balon
2008/0222192 A1 9/2008 Hughes

(56) References Cited

U.S. PATENT DOCUMENTS

2008/0256014 A1 10/2008 Gould et al.
2008/0256429 A1 10/2008 Penner et al.
2008/0270597 A1 10/2008 Tenenti
2008/0282189 A1 11/2008 Hofmann et al.
2008/0295038 A1 11/2008 Helfman et al.
2008/0301237 A1 12/2008 Parsons et al.
2009/0006171 A1 1/2009 Blatchley et al.
2009/0006283 A1 1/2009 Labrie et al.
2009/0007157 A1 1/2009 Ward et al.
2009/0013244 A1 1/2009 Cudich et al.
2009/0019383 A1 1/2009 Riley et al.
2009/0024944 A1 1/2009 Louch et al.
2009/0043814 A1 2/2009 Faris et al.
2009/0044090 A1 2/2009 Gur et al.
2009/0048896 A1 2/2009 Anandan
2009/0049372 A1 2/2009 Goldberg
2009/0075694 A1 3/2009 Kim et al.
2009/0077164 A1 3/2009 Phillips et al.
2009/0077217 A1 3/2009 Mcfarland et al.
2009/0083140 A1 3/2009 Phan
2009/0088875 A1 4/2009 Baier et al.
2009/0094514 A1 4/2009 Dargahi et al.
2009/0113310 A1 4/2009 Appleyard et al.
2009/0129596 A1 5/2009 Chavez et al.
2009/0132331 A1 5/2009 Cartledge et al.
2009/0132470 A1 5/2009 Vignet
2009/0150813 A1 6/2009 Chang et al.
2009/0174680 A1 7/2009 Anzures et al.
2009/0192787 A1 7/2009 Roon
2009/0198715 A1 8/2009 Barbarek
2009/0222760 A1 9/2009 Halverson et al.
2009/0234699 A1 9/2009 Steinglass et al.
2009/0248710 A1 10/2009 Mccormack et al.
2009/0256972 A1 10/2009 Ramaswamy et al.
2009/0262690 A1 10/2009 Breuer et al.
2009/0271696 A1 10/2009 Bailor et al.
2009/0276692 A1 11/2009 Rosner
2009/0292690 A1 11/2009 Culbert
2009/0313201 A1 12/2009 Huelsman et al.
2009/0313537 A1 12/2009 Fu et al.
2009/0313570 A1 12/2009 Po
2009/0319542 A1 12/2009 Le Brazidec et al.
2009/0319623 A1 12/2009 Srinivasan et al.
2009/0319882 A1 12/2009 Morrison et al.
2009/0327240 A1 12/2009 Meehan et al.
2009/0327301 A1 12/2009 Lees et al.
2009/0327851 A1 12/2009 Raposo
2009/0327875 A1 12/2009 Kinkoh
2010/0017699 A1 1/2010 Farrell et al.
2010/0031135 A1 2/2010 Naghshin et al.
2010/0070845 A1 3/2010 Facemire et al.
2010/0070895 A1 3/2010 Messer
2010/0077260 A1 3/2010 Pillai et al.
2010/0082705 A1 4/2010 Ramesh et al.
2010/0083164 A1 4/2010 Martin et al.
2010/0088636 A1 4/2010 Yerkes et al.
2010/0095219 A1 4/2010 Stachowiak et al.
2010/0095298 A1 4/2010 Seshadrinathan et al.
2010/0100427 A1 4/2010 Mckeown et al.
2010/0100463 A1 4/2010 Molotsi et al.
2010/0114926 A1 5/2010 Agrawal et al.
2010/0149005 A1 6/2010 Yoon et al.
2010/0169853 A1 7/2010 Jain et al.
2010/0174678 A1 7/2010 Massand
2010/0205521 A1 8/2010 Folting
2010/0228752 A1 9/2010 Folting et al.
2010/0241477 A1 9/2010 Nylander et al.
2010/0241948 A1 9/2010 Andeen et al.
2010/0241968 A1 9/2010 Tarara et al.
2010/0241972 A1 9/2010 Spataro et al.
2010/0241990 A1 9/2010 Gabriel et al.
2010/0251090 A1 9/2010 Chamberlain et al.
2010/0251386 A1 9/2010 Gilzean et al.
2010/0257015 A1 10/2010 Molander
2010/0262625 A1 10/2010 Pittenger
2010/0268705 A1 10/2010 Douglas et al.
2010/0268773 A1 10/2010 Hunt et al.
2010/0281462 A1 11/2010 Festa
2010/0287163 A1 11/2010 Sridhar et al.
2010/0287221 A1 11/2010 Battepati et al.
2010/0313119 A1 12/2010 Baldwin et al.
2010/0324964 A1 12/2010 Callanan et al.
2010/0332973 A1 12/2010 Kloiber et al.
2011/0010340 A1 1/2011 Hung et al.
2011/0016432 A1 1/2011 Helfman
2011/0028138 A1 2/2011 Davies-Moore et al.
2011/0041140 A1 2/2011 Harm et al.
2011/0047484 A1 2/2011 Mount et al.
2011/0055177 A1 3/2011 Chakra et al.
2011/0066933 A1 3/2011 Ludwig
2011/0071869 A1 3/2011 O'Brien et al.
2011/0106636 A1 5/2011 Spear et al.
2011/0119352 A1 5/2011 Perov et al.
2011/0154192 A1 6/2011 Yang et al.
2011/0179371 A1 7/2011 Kopycinski et al.
2011/0205231 A1 8/2011 Hartley et al.
2011/0208324 A1 8/2011 Fukatsu
2011/0208732 A1 8/2011 Melton et al.
2011/0209150 A1 8/2011 Hammond et al.
2011/0219321 A1 9/2011 Gonzalez Veron et al.
2011/0225500 A1 9/2011 Casalaina et al.
2011/0225525 A1 9/2011 Chasman et al.
2011/0231273 A1 9/2011 Buchheit
2011/0238716 A1 9/2011 Amir et al.
2011/0258040 A1 10/2011 Gnanasambandam
2011/0269424 A1 11/2011 Multer
2011/0288900 A1 11/2011 Mcqueen et al.
2011/0289397 A1 11/2011 Eastmond et al.
2011/0289439 A1 11/2011 Jugel
2011/0292046 A1 12/2011 Gotz
2011/0298618 A1 12/2011 Stahl et al.
2011/0302003 A1 12/2011 Shirish et al.
2012/0018953 A1 1/2012 Frey
2012/0029962 A1 2/2012 Podgurny et al.
2012/0035974 A1 2/2012 Seybold
2012/0036423 A1 2/2012 Haynes et al.
2012/0036462 A1 2/2012 Schwartz et al.
2012/0050802 A1 3/2012 Masuda
2012/0062465 A1* 3/2012 Spetalnick ............ G06F 3/0237 704/9
2012/0066587 A1 3/2012 Zhou et al.
2012/0072821 A1 3/2012 Bowling
2012/0079408 A1 3/2012 Rohwer
2012/0081762 A1 4/2012 Yamada
2012/0084798 A1 4/2012 Reeves et al.
2012/0086716 A1 4/2012 Reeves et al.
2012/0086717 A1 4/2012 Liu
2012/0089610 A1 4/2012 Agrawal et al.
2012/0089914 A1 4/2012 Holt et al.
2012/0089992 A1 4/2012 Reeves et al.
2012/0096389 A1 4/2012 Flam et al.
2012/0096392 A1 4/2012 Ording et al.
2012/0102432 A1 4/2012 Breedvelt-Schouten et al.
2012/0102543 A1 4/2012 Kohli et al.
2012/0110515 A1 5/2012 Abramoff et al.
2012/0116834 A1 5/2012 Pope et al.
2012/0116835 A1 5/2012 Pope et al.
2012/0120086 A1 5/2012 Dang et al.
2012/0124749 A1 5/2012 Lewman
2012/0130907 A1 5/2012 Thompson et al.
2012/0131445 A1 5/2012 Oyarzabal et al.
2012/0137238 A1 5/2012 Abeln
2012/0151173 A1 6/2012 Shirley et al.
2012/0158744 A1 6/2012 Tseng et al.
2012/0166980 A1 6/2012 Yosef et al.
2012/0192050 A1 7/2012 Campbell et al.
2012/0198322 A1 8/2012 Gulwani et al.
2012/0206363 A1* 8/2012 Kyprianou .......... G06F 3/04886 345/168
2012/0210252 A1 8/2012 Fedoseyeva et al.
2012/0215574 A1 8/2012 Driessnack et al.
2012/0215578 A1 8/2012 Swierz et al.
2012/0229867 A1 9/2012 Takagi
2012/0233150 A1 9/2012 Naim et al.

(56) References Cited

U.S. PATENT DOCUMENTS

2012/0233533 A1 9/2012 Yucel et al.
2012/0234907 A1 9/2012 Clark et al.
2012/0236368 A1 9/2012 Uchida et al.
2012/0239454 A1 9/2012 Taix et al.
2012/0244891 A1 9/2012 Appleton
2012/0246170 A1 9/2012 Iantorno
2012/0254252 A1 10/2012 Jin et al.
2012/0254770 A1 10/2012 Ophir
2012/0260190 A1 10/2012 Berger et al.
2012/0278117 A1 11/2012 Nguyen et al.
2012/0284197 A1 11/2012 Sitrick et al.
2012/0284643 A1 11/2012 Sitrick et al.
2012/0297307 A1 11/2012 Rider et al.
2012/0300931 A1 11/2012 Ollikainen et al.
2012/0303262 A1 11/2012 Alam et al.
2012/0304098 A1 11/2012 Kuulusa
2012/0311496 A1 12/2012 Cao et al.
2012/0311672 A1 12/2012 Connor et al.
2012/0324348 A1 12/2012 Rounthwaite
2013/0015954 A1 1/2013 Thorne et al.
2013/0018952 A1 1/2013 Mcconnell et al.
2013/0018953 A1 1/2013 Mcconnell et al.
2013/0018960 A1 1/2013 Knysz et al.
2013/0024418 A1 1/2013 Sitrick et al.
2013/0024760 A1 1/2013 Vogel et al.
2013/0036369 A1 2/2013 Mitchell et al.
2013/0041958 A1 2/2013 Post et al.
2013/0054514 A1 2/2013 Barrett-Kahn et al.
2013/0055113 A1 2/2013 Chazin et al.
2013/0059598 A1 3/2013 Miyagi et al.
2013/0063490 A1 3/2013 Zaman et al.
2013/0086460 A1 4/2013 Folting et al.
2013/0090969 A1 4/2013 Rivere
2013/0097490 A1 4/2013 Kotler et al.
2013/0103417 A1 4/2013 Seto et al.
2013/0104035 A1 4/2013 Wagner et al.
2013/0111320 A1 5/2013 Campbell et al.
2013/0117268 A1 5/2013 Smith et al.
2013/0158964 A1 6/2013 Hall et al.
2013/0159832 A1 6/2013 Ingargiola et al.
2013/0159907 A1 6/2013 Brosche et al.
2013/0179209 A1 7/2013 Milosevich
2013/0211866 A1 8/2013 Gordon et al.
2013/0212197 A1 8/2013 Karlson
2013/0212234 A1 8/2013 Bartlett et al.
2013/0215475 A1 8/2013 Noguchi
2013/0222249 A1* 8/2013 Pasquero ............ G06F 3/04886 345/168
2013/0238363 A1 9/2013 Ohta et al.
2013/0238968 A1 9/2013 Barrus
2013/0246384 A1 9/2013 Victor
2013/0262527 A1 10/2013 Hunter et al.
2013/0268331 A1 10/2013 Bitz et al.
2013/0297468 A1 11/2013 Hirsch et al.
2013/0307997 A1 11/2013 O'Keefe et al.
2013/0318424 A1 11/2013 Boyd
2013/0339051 A1 12/2013 Dobrean
2014/0002863 A1 1/2014 Hasegawa et al.
2014/0006326 A1 1/2014 Bazanov
2014/0012616 A1 1/2014 Moshenek
2014/0019842 A1 1/2014 Montagna et al.
2014/0033307 A1 1/2014 Schmidtler
2014/0043331 A1 2/2014 Makinen et al.
2014/0046638 A1 2/2014 Peloski
2014/0052749 A1 2/2014 Rissanen
2014/0058801 A1 2/2014 Deodhar et al.
2014/0059017 A1 2/2014 Chaney et al.
2014/0068403 A1 3/2014 Bhargav et al.
2014/0074545 A1 3/2014 Minder et al.
2014/0075301 A1 3/2014 Mihara
2014/0078557 A1 3/2014 Hasegawa et al.
2014/0082525 A1 3/2014 Kass et al.
2014/0095237 A1 4/2014 Ehrler et al.
2014/0098024 A1* 4/2014 Paek ....................... G06F 3/023 345/168
2014/0100884 A1 4/2014 Hamilton et al.
2014/0101527 A1 4/2014 Suciu
2014/0108985 A1 4/2014 Scott et al.
2014/0109012 A1 4/2014 Choudhary et al.
2014/0111516 A1 4/2014 Hall et al.
2014/0115515 A1 4/2014 Adams et al.
2014/0115518 A1 4/2014 Abdukalykov et al.
2014/0129960 A1 5/2014 Wang et al.
2014/0136972 A1 5/2014 Rodgers et al.
2014/0137003 A1 5/2014 Peters et al.
2014/0137144 A1 5/2014 Jarvenpaa et al.
2014/0143252 A1 5/2014 Silverstein et al.
2014/0172475 A1 6/2014 Olliphant et al.
2014/0173401 A1 6/2014 Oshlag et al.
2014/0181155 A1 6/2014 Homsany
2014/0188546 A1 7/2014 Goja
2014/0188748 A1 7/2014 Cavoue et al.
2014/0195933 A1 7/2014 Rao Dv
2014/0214404 A1 7/2014 Kalia et al.
2014/0215303 A1 7/2014 Grigorovitch et al.
2014/0229816 A1 8/2014 Yakub
2014/0240735 A1 8/2014 Salgado
2014/0249877 A1 9/2014 Hull et al.
2014/0257568 A1 9/2014 Czaja et al.
2014/0278638 A1 9/2014 Kreuzkamp et al.
2014/0278720 A1 9/2014 Taguchi
2014/0280287 A1 9/2014 Ganti et al.
2014/0280377 A1 9/2014 Frew
2014/0281868 A1 9/2014 Vogel et al.
2014/0281869 A1 9/2014 Yob
2014/0282417 A1 9/2014 Paveza et al.
2014/0289223 A1 9/2014 Colwell et al.
2014/0297828 A1 10/2014 Voltmer et al.
2014/0304174 A1 10/2014 Scott et al.
2014/0306837 A1 10/2014 Hauck
2014/0310345 A1 10/2014 Megiddo et al.
2014/0324497 A1 10/2014 Verma et al.
2014/0324501 A1 10/2014 Davidow et al.
2014/0325552 A1 10/2014 Evans et al.
2014/0337085 A1 11/2014 Li et al.
2014/0359580 A1 12/2014 Boissy et al.
2014/0365938 A1 12/2014 Black et al.
2014/0372856 A1 12/2014 Radakovitz et al.
2014/0372932 A1 12/2014 Rutherford et al.
2015/0032686 A1 1/2015 Kuchoor
2015/0033131 A1 1/2015 Peev et al.
2015/0033149 A1 1/2015 Kuchoor
2015/0035918 A1 2/2015 Matsumoto et al.
2015/0039387 A1 2/2015 Akahoshi et al.
2015/0046209 A1 2/2015 Choe
2015/0046900 A1 2/2015 Eldridge et al.
2015/0058619 A1 2/2015 Sweet et al.
2015/0067556 A1 3/2015 Tibrewal et al.
2015/0074721 A1 3/2015 Fishman et al.
2015/0074728 A1 3/2015 Chai et al.
2015/0088822 A1 3/2015 Raja et al.
2015/0095752 A1 4/2015 Studer et al.
2015/0100336 A1 4/2015 Ford et al.
2015/0106736 A1 4/2015 Torman et al.
2015/0125834 A1 5/2015 Mendoza Tascon
2015/0142676 A1 5/2015 Mcginnis et al.
2015/0142829 A1 5/2015 Lee et al.
2015/0153943 A1 6/2015 Wang
2015/0154660 A1 6/2015 Weald et al.
2015/0169514 A1 6/2015 Sah et al.
2015/0169531 A1 6/2015 Campbell et al.
2015/0178657 A1 6/2015 Kleehammer et al.
2015/0188964 A1 7/2015 Sharma et al.
2015/0205830 A1 7/2015 Bastide et al.
2015/0212717 A1 7/2015 Nair et al.
2015/0213397 A1 7/2015 Arena
2015/0220491 A1 8/2015 Cochrane et al.
2015/0234887 A1 8/2015 Greene et al.
2015/0242091 A1 8/2015 Lu et al.
2015/0248214 A1 9/2015 Gilger et al.
2015/0249864 A1 9/2015 Tang et al.
2015/0261796 A1 9/2015 Gould et al.
2015/0262121 A1 9/2015 Riel-Dalpe et al.
2015/0278699 A1 10/2015 Danielsson

(56) References Cited

U.S. PATENT DOCUMENTS

2015/0281292 A1 10/2015 Kim et al.
2015/0295877 A1 10/2015 Roman et al.
2015/0310126 A1 10/2015 Steiner et al.
2015/0317590 A1 11/2015 Karlson
2015/0324453 A1 11/2015 Werner
2015/0331846 A1 11/2015 Guggilla et al.
2015/0363478 A1 12/2015 Haynes
2015/0370540 A1 12/2015 Coslovi et al.
2015/0370776 A1 12/2015 New
2015/0370904 A1 12/2015 Joshi et al.
2015/0378542 A1 12/2015 Saito et al.
2015/0378556 A1 12/2015 Ramanathan et al.
2015/0378711 A1 12/2015 Cameron et al.
2015/0378979 A1 12/2015 Hirzel et al.
2015/0379472 A1 12/2015 Gilmour et al.
2016/0012111 A1 1/2016 Pattabhiraman et al.
2016/0018962 A1 1/2016 Low et al.
2016/0026939 A1 1/2016 Schiffer et al.
2016/0027076 A1 1/2016 Jackson et al.
2016/0035546 A1 2/2016 Platt et al.
2016/0041736 A1 2/2016 Schulz
2016/0055134 A1 2/2016 Sathish et al.
2016/0055374 A1 2/2016 Zhang et al.
2016/0057163 A1 2/2016 Boffa et al.
2016/0063435 A1 3/2016 Shah et al.
2016/0068960 A1 3/2016 Jung et al.
2016/0078368 A1 3/2016 Kakhandiki et al.
2016/0088480 A1 3/2016 Chen et al.
2016/0092557 A1 3/2016 Stojanovic et al.
2016/0098574 A1 4/2016 Bargagni
2016/0117308 A1 4/2016 Haider et al.
2016/0170586 A1 6/2016 Gallo
2016/0173122 A1 6/2016 Akitomi et al.
2016/0196310 A1 7/2016 Dutta
2016/0210572 A1 7/2016 Shaaban et al.
2016/0216948 A1 7/2016 Mcpherson et al.
2016/0224532 A1 8/2016 Miller et al.
2016/0224676 A1 8/2016 Miller et al.
2016/0224939 A1 8/2016 Chen et al.
2016/0231915 A1 8/2016 Nhan et al.
2016/0232489 A1 8/2016 Skaaksrud
2016/0246490 A1 8/2016 Cabral
2016/0253061 A1 9/2016 Nitsan et al.
2016/0253982 A1 9/2016 Cheung et al.
2016/0259856 A1 9/2016 Ananthapur Bache et al.
2016/0275150 A1 9/2016 Bourbonnais et al.
2016/0292206 A1 10/2016 Ruiz Velazquez et al.
2016/0299655 A1 10/2016 Migos et al.
2016/0308963 A1 10/2016 Kung
2016/0321235 A1 11/2016 He et al.
2016/0321604 A1 11/2016 Imaeda et al.
2016/0335302 A1 11/2016 Wright et al.
2016/0335303 A1 11/2016 Madhalam et al.
2016/0335604 A1 11/2016 Reminick et al.
2016/0335731 A1 11/2016 Hall
2016/0335903 A1 11/2016 Mendoza Tascon
2016/0344828 A1 11/2016 Hausler et al.
2016/0350950 A1 12/2016 Ritchie et al.
2016/0381099 A1 12/2016 Keslin et al.
2017/0017779 A1 1/2017 Huang et al.
2017/0031967 A1 2/2017 Chavan et al.
2017/0038919 A1 2/2017 Moss et al.
2017/0041296 A1 2/2017 Ford et al.
2017/0052937 A1 2/2017 Sirven et al.
2017/0061342 A1 3/2017 Lore et al.
2017/0061360 A1 3/2017 Rucker et al.
2017/0061820 A1 3/2017 Firoozbakhsh
2017/0063722 A1 3/2017 Cropper et al.
2017/0075557 A1 3/2017 Noble et al.
2017/0076101 A1 3/2017 Kochhar et al.
2017/0090734 A1 3/2017 Fitzpatrick
2017/0090736 A1 3/2017 King et al.
2017/0091337 A1 3/2017 Patterson
2017/0093876 A1 3/2017 Feng et al.
2017/0109499 A1 4/2017 Doshi et al.
2017/0111327 A1 4/2017 Wu
2017/0116552 A1 4/2017 Deodhar et al.
2017/0124042 A1 5/2017 Campbell et al.
2017/0124048 A1 5/2017 Campbell et al.
2017/0124055 A1 5/2017 Radakovitz et al.
2017/0124740 A1 5/2017 Campbell et al.
2017/0126772 A1 5/2017 Campbell et al.
2017/0132296 A1 5/2017 Ding
2017/0132652 A1 5/2017 Kedzlie et al.
2017/0139874 A1 5/2017 Chin
2017/0139884 A1 5/2017 Bendig et al.
2017/0139891 A1 5/2017 Ah-Soon et al.
2017/0139992 A1 5/2017 Morin
2017/0140047 A1 5/2017 Bendig et al.
2017/0140219 A1 5/2017 King et al.
2017/0153771 A1 6/2017 Chu
2017/0161246 A1 6/2017 Klima
2017/0177556 A1 6/2017 Fay et al.
2017/0177888 A1 6/2017 Arora et al.
2017/0185575 A1 6/2017 Sood et al.
2017/0185592 A1 6/2017 Frei et al.
2017/0185668 A1 6/2017 Convertino et al.
2017/0200122 A1 7/2017 Edson et al.
2017/0201428 A1 7/2017 Normandin
2017/0206366 A1 7/2017 Fay et al.
2017/0212924 A1 7/2017 Semlani et al.
2017/0220813 A1 8/2017 Mullins et al.
2017/0221072 A1 8/2017 Athulurutlrumala et al.
2017/0221238 A1 8/2017 Limberger
2017/0228421 A1 8/2017 Sharma et al.
2017/0228445 A1 8/2017 Chiu et al.
2017/0228460 A1 8/2017 Amel et al.
2017/0229152 A1 8/2017 Loganathan et al.
2017/0236081 A1 8/2017 Grady Smith et al.
2017/0242921 A1 8/2017 Rota
2017/0257517 A1 9/2017 Panda
2017/0262786 A1 9/2017 Khasis
2017/0269805 A1 9/2017 Demaris et al.
2017/0270970 A1 9/2017 Ho et al.
2017/0272316 A1 9/2017 Johnson et al.
2017/0272331 A1 9/2017 Lissack
2017/0277620 A1 9/2017 Kadioglu
2017/0277669 A1 9/2017 Sekharan
2017/0285879 A1 10/2017 Pilkington et al.
2017/0285890 A1 10/2017 Dolman
2017/0289619 A1 10/2017 Xu et al.
2017/0301039 A1 10/2017 Dyer et al.
2017/0315683 A1 11/2017 Boucher et al.
2017/0315714 A1 11/2017 Shyamsundar et al.
2017/0315974 A1 11/2017 Kong et al.
2017/0315979 A1 11/2017 Boucher et al.
2017/0316355 A1 11/2017 Shrestha et al.
2017/0322963 A1 11/2017 Ramamurthi et al.
2017/0324692 A1 11/2017 Zhou
2017/0329479 A1 11/2017 Rauschenbach et al.
2017/0344895 A1 11/2017 Roy
2017/0351252 A1 12/2017 Kleifges et al.
2017/0351974 A1 12/2017 Rose et al.
2017/0372442 A1 12/2017 Mejias
2017/0374205 A1 12/2017 Panda
2018/0001127 A1 1/2018 Caouette
2018/0011827 A1 1/2018 Avery et al.
2018/0025084 A1 1/2018 Conlan et al.
2018/0026954 A1 1/2018 Toepke et al.
2018/0032492 A1 2/2018 Altshuller et al.
2018/0032570 A1 2/2018 Miller et al.
2018/0039651 A1 2/2018 Tobin et al.
2018/0055434 A1 3/2018 Cheung et al.
2018/0068470 A1 3/2018 Croft
2018/0075104 A1 3/2018 Oberbreckling et al.
2018/0075115 A1 3/2018 Murray et al.
2018/0075413 A1 3/2018 Culver et al.
2018/0075560 A1 3/2018 Thukral et al.
2018/0081505 A1 3/2018 Ron et al.
2018/0081863 A1 3/2018 Bathla
2018/0081868 A1 3/2018 Willcock et al.
2018/0082072 A1 3/2018 Hosie et al.
2018/0088753 A1 3/2018 Viegas et al.
2018/0088989 A1 3/2018 Nield et al.

(56) References Cited

U.S. PATENT DOCUMENTS

2018/0089299 A1 3/2018 Collins et al.
2018/0095938 A1 4/2018 Monte
2018/0096417 A1 4/2018 Cook et al.
2018/0109760 A1 4/2018 Metter et al.
2018/0121028 A1 5/2018 Kuscher et al.
2018/0121994 A1 5/2018 Matsunaga et al.
2018/0128636 A1 5/2018 Zhou
2018/0129651 A1 5/2018 Latvala et al.
2018/0143967 A1 5/2018 Anbazhagan et al.
2018/0157455 A1 6/2018 Troy et al.
2018/0157467 A1 6/2018 Stachura
2018/0157468 A1 6/2018 Stachura
2018/0157633 A1 6/2018 He et al.
2018/0173715 A1 6/2018 Dunne
2018/0174104 A1 6/2018 Schikora et al.
2018/0181650 A1 6/2018 Komatsuda et al.
2018/0181716 A1 6/2018 Mander et al.
2018/0189734 A1 7/2018 Newhouse et al.
2018/0210936 A1 7/2018 Reynolds et al.
2018/0213286 A1 7/2018 Roman et al.
2018/0225270 A1 8/2018 Bhide et al.
2018/0232422 A1 8/2018 Park et al.
2018/0260371 A1 9/2018 Theodore et al.
2018/0260435 A1 9/2018 Xu
2018/0262705 A1 9/2018 Park et al.
2018/0276417 A1 9/2018 Cerezo Sanchez
2018/0285149 A1 10/2018 Bhandari et al.
2018/0285918 A1 10/2018 Staggs
2018/0293217 A1 10/2018 Callaghan
2018/0293587 A1 10/2018 Oda
2018/0293669 A1 10/2018 Jackson et al.
2018/0329930 A1 11/2018 Eberlein et al.
2018/0330320 A1 11/2018 Kohli
2018/0357047 A1 12/2018 Brown et al.
2018/0357305 A1 12/2018 Kinast et al.
2018/0365429 A1 12/2018 Segal
2018/0367484 A1 12/2018 Rodriguez et al.
2018/0373434 A1 12/2018 Switzer et al.
2018/0373757 A1 12/2018 Schukovets et al.
2018/0374479 A1 12/2018 Hall et al.
2019/0004773 A1 1/2019 Hoberman
2019/0005094 A1 1/2019 Yi et al.
2019/0011310 A1 1/2019 Turnbull et al.
2019/0012306 A1 1/2019 Dvorak
2019/0012342 A1 1/2019 Cohn
2019/0028360 A1 1/2019 Douglas et al.
2019/0034395 A1 1/2019 Curry et al.
2019/0036989 A1 1/2019 Eirinberg et al.
2019/0042628 A1 2/2019 Rajpara
2019/0050445 A1 2/2019 Griffith et al.
2019/0050466 A1 2/2019 Kim et al.
2019/0050812 A1 2/2019 Boileau
2019/0056856 A1 2/2019 Simmons et al.
2019/0065545 A1 2/2019 Hazel et al.
2019/0068703 A1 2/2019 Vora et al.
2019/0073350 A1 3/2019 Shiotani
2019/0079751 A1 3/2019 Foskett et al.
2019/0095413 A1 3/2019 Davis et al.
2019/0097909 A1 3/2019 Puri et al.
2019/0102425 A1 4/2019 Obeidat
2019/0108046 A1 4/2019 Spencer-Harper et al.
2019/0113935 A1 4/2019 Kuo et al.
2019/0114308 A1 4/2019 Hancock
2019/0114589 A1 4/2019 Voss et al.
2019/0123924 A1 4/2019 Embiricos et al.
2019/0130413 A1 5/2019 Nelson et al.
2019/0130611 A1 5/2019 Black et al.
2019/0138583 A1 5/2019 Silk et al.
2019/0138588 A1 5/2019 Silk et al.
2019/0138653 A1 5/2019 Roller et al.
2019/0147030 A1 5/2019 Stein et al.
2019/0155821 A1 5/2019 Dirisala
2019/0166110 A1 5/2019 Miu
2019/0179501 A1 6/2019 Seeley et al.
2019/0199823 A1 6/2019 Underwood et al.
2019/0208058 A1 7/2019 Dvorkin et al.
2019/0213557 A1 7/2019 Dotan-Cohen et al.
2019/0220161 A1 7/2019 Loftus et al.
2019/0236188 A1 8/2019 Mckenna
2019/0238636 A1 8/2019 Li et al.
2019/0243879 A1 8/2019 Harley et al.
2019/0251884 A1 8/2019 Burns et al.
2019/0258461 A1 8/2019 Li et al.
2019/0258706 A1 8/2019 Li et al.
2019/0286839 A1 9/2019 Mutha et al.
2019/0306009 A1 10/2019 Makovsky et al.
2019/0312899 A1 10/2019 Shulman et al.
2019/0324840 A1 10/2019 Malamut et al.
2019/0325012 A1 10/2019 Delaney et al.
2019/0327294 A1 10/2019 Subramani Nadar et al.
2019/0340550 A1 11/2019 Denger et al.
2019/0347077 A1 11/2019 Huebra
2019/0349447 A1 11/2019 Adams et al.
2019/0361879 A1 11/2019 Rogynskyy et al.
2019/0361971 A1 11/2019 Zenger et al.
2019/0364009 A1 11/2019 Joseph et al.
2019/0371442 A1 12/2019 Schoenberg
2019/0377791 A1 12/2019 Abou Mahmoud et al.
2019/0391707 A1 12/2019 Ristow et al.
2020/0005248 A1 1/2020 Gerzi et al.
2020/0005295 A1 1/2020 Murphy
2020/0012629 A1 1/2020 Lereya et al.
2020/0019548 A1 1/2020 Agnew et al.
2020/0019595 A1 1/2020 Azua Garcia
2020/0026352 A1 1/2020 Wang et al.
2020/0026397 A1 1/2020 Wohlstadter et al.
2020/0042648 A1 2/2020 Rao
2020/0050696 A1 2/2020 Mowatt et al.
2020/0053176 A1 2/2020 Jimenez Salgado et al.
2020/0100427 A1 4/2020 Beavers et al.
2020/0117908 A1 4/2020 Pavetic et al.
2020/0125574 A1 4/2020 Ghoshal et al.
2020/0134002 A1 4/2020 Tung et al.
2020/0142546 A1 5/2020 Breedvelt-Schouten et al.
2020/0151630 A1 5/2020 Shakhnovich
2020/0159558 A1 5/2020 Bak et al.
2020/0175094 A1 6/2020 Palmer
2020/0176089 A1 6/2020 Jones et al.
2020/0192646 A1 6/2020 Yerramreddy et al.
2020/0192785 A1 6/2020 Chen
2020/0193388 A1 6/2020 Tran-Kiem et al.
2020/0236110 A1 7/2020 Metzler et al.
2020/0247661 A1 8/2020 Rao et al.
2020/0265112 A1 8/2020 Fox et al.
2020/0279315 A1 9/2020 Manggala
2020/0293337 A1 9/2020 Rangasamy et al.
2020/0293616 A1 9/2020 Nelson et al.
2020/0301678 A1 9/2020 Burman et al.
2020/0301902 A1 9/2020 Maloy et al.
2020/0310835 A1 10/2020 Momchilov
2020/0310888 A1 10/2020 Gopalan et al.
2020/0326824 A1 10/2020 Magahern et al.
2020/0327244 A1 10/2020 Blass et al.
2020/0334019 A1 10/2020 Bosworth et al.
2020/0341947 A1 10/2020 Aziz et al.
2020/0348809 A1 11/2020 Drescher
2020/0349320 A1 11/2020 Owens
2020/0356740 A1 11/2020 Principato
2020/0356873 A1 11/2020 Nawrocke et al.
2020/0372055 A1 11/2020 Joko et al.
2020/0374146 A1 11/2020 Chhabra et al.
2020/0380212 A1 12/2020 Butler et al.
2020/0380449 A1 12/2020 Choi
2020/0387664 A1 12/2020 Kusumura et al.
2020/0401581 A1 12/2020 Eubank et al.
2020/0401583 A1 12/2020 Church et al.
2020/0409949 A1 12/2020 Saxena et al.
2020/0410395 A1 12/2020 Ray et al.
2021/0014136 A1 1/2021 Rath
2021/0019287 A1 1/2021 Prasad et al.
2021/0021603 A1 1/2021 Gibbons
2021/0026598 A1 1/2021 Zinsmeyer et al.
2021/0034058 A1 2/2021 Subramanian et al.
2021/0034443 A1 2/2021 Lowin et al.

(56) References Cited

U.S. PATENT DOCUMENTS

2021/0035069 A1 2/2021 Parikh
2021/0042796 A1 2/2021 Khoury et al.
2021/0049524 A1 2/2021 Nachum et al.
2021/0049555 A1 2/2021 Shor
2021/0055955 A1 2/2021 Yankelevich et al.
2021/0056509 A1 2/2021 Lindy
2021/0065203 A1 3/2021 Billigmeier et al.
2021/0072883 A1 3/2021 Migunova et al.
2021/0073526 A1 3/2021 Zeng et al.
2021/0075870 A1 3/2021 Kempf et al.
2021/0081404 A1 3/2021 Kempf et al.
2021/0084120 A1 3/2021 Fisher et al.
2021/0096852 A1 4/2021 Stump et al.
2021/0117864 A1 4/2021 Weast et al.
2021/0117893 A1 4/2021 Sohum et al.
2021/0124749 A1 4/2021 Suzuki et al.
2021/0124872 A1 4/2021 Lereya
2021/0136027 A1 5/2021 Barbitta et al.
2021/0141923 A1 5/2021 Wu et al.
2021/0149553 A1 5/2021 Lereya et al.
2021/0149688 A1 5/2021 Newell et al.
2021/0149925 A1 5/2021 Mann et al.
2021/0150489 A1 5/2021 Haramati et al.
2021/0157978 A1 5/2021 Haramati et al.
2021/0158214 A1 5/2021 Witt et al.
2021/0165782 A1 6/2021 Deshpande et al.
2021/0166196 A1 6/2021 Lereya et al.
2021/0166339 A1 6/2021 Mann et al.
2021/0173682 A1 6/2021 Chakraborti et al.
2021/0174006 A1 6/2021 Stokes
2021/0192126 A1 6/2021 Gehrmann et al.
2021/0203549 A1 7/2021 Snehashis et al.
2021/0232484 A1 7/2021 Keneally et al.
2021/0248311 A1 8/2021 Helft et al.
2021/0257065 A1 8/2021 Mander et al.
2021/0264220 A1 8/2021 Wei et al.
2021/0271726 A1 9/2021 Trainor
2021/0273957 A1 9/2021 Boyer et al.
2021/0281428 A1 9/2021 Kempf et al.
2021/0304020 A1 9/2021 Kaplan
2021/0326519 A1 10/2021 Lin et al.
2021/0328888 A1 10/2021 Rath
2021/0342145 A1 11/2021 Miller et al.
2021/0342785 A1 11/2021 Mann et al.
2021/0357579 A1 11/2021 Lereya et al.
2021/0365446 A1 11/2021 Srivastava et al.
2021/0374197 A1 12/2021 Chauhan
2021/0382611 A1 12/2021 Gan
2021/0397585 A1 12/2021 Seward
2022/0011732 A1 1/2022 Hall
2022/0066847 A1 3/2022 Liu et al.
2022/0099454 A1 3/2022 Decrop et al.
2022/0103589 A1 3/2022 Shen et al.
2022/0114044 A1 4/2022 Singh
2022/0121325 A1 4/2022 Roberts et al.
2022/0121478 A1 4/2022 Chivukula et al.
2022/0122183 A1 4/2022 Jacob et al.
2022/0129283 A1 4/2022 Sharma et al.
2022/0138004 A1 5/2022 Nandakumar et al.
2022/0147934 A1 5/2022 Chandrashekar et al.
2022/0191251 A1 6/2022 Gavish et al.
2022/0206864 A1 6/2022 Nadathur et al.
2022/0221591 A1 7/2022 Smith et al.
2022/0222427 A1 7/2022 Mann et al.
2022/0229928 A1 7/2022 Shachar et al.
2022/0237550 A1 7/2022 Jennings et al.
2022/0245328 A1 8/2022 Tsabba
2022/0261288 A1 8/2022 Viswanathan et al.
2022/0291666 A1 9/2022 Cella et al.
2022/0292180 A1 9/2022 Chauhan
2022/0300850 A1 9/2022 Mendez et al.
2022/0308918 A1 9/2022 Pandey et al.
2022/0335362 A1 10/2022 Nikain et al.
2022/0343258 A1 10/2022 Wilde et al.
2022/0351564 A1 11/2022 Sahani et al.
2022/0357905 A1 11/2022 Dohmae
2022/0358190 A1 11/2022 Baghani et al.
2022/0375145 A1 11/2022 Herath et al.
2022/0382522 A1 12/2022 Heynemann Nascentes Da Silva et al.
2022/0413846 A1 12/2022 Clarke et al.
2023/0004832 A1 1/2023 Sahasi et al.
2023/0004900 A1 1/2023 Gleave
2023/0014233 A1 1/2023 Xiang et al.
2023/0016946 A1 1/2023 Wouhaybi et al.
2023/0035600 A1 2/2023 Holzman et al.
2023/0075183 A1 3/2023 Copty et al.
2023/0081880 A1 3/2023 Mathur et al.
2023/0083891 A1 3/2023 Achin et al.
2023/0093470 A1 3/2023 Dvornik et al.
2023/0107316 A1 4/2023 Ripa et al.
2023/0108808 A1 4/2023 Lerman
2023/0113369 A1 4/2023 Wang et al.
2023/0142774 A1 5/2023 Hashemi et al.
2023/0153651 A1 5/2023 Bi et al.
2023/0153724 A1 5/2023 Thampy et al.
2023/0171241 A1 6/2023 Amichay et al.
2023/0188516 A1 6/2023 Danilov et al.
2023/0230006 A1 7/2023 Bosch et al.
2023/0244379 A1* 8/2023 Chen .................... G06F 3/0482
2023/0259390 A1 8/2023 Howley et al.
2023/0259839 A1 8/2023 Manalo et al.
2023/0281023 A1 9/2023 Bienfait et al.
2023/0281040 A1 9/2023 Cao
2023/0316382 A1 10/2023 Faricy et al.
2023/0385085 A1 11/2023 Singh
2023/0393832 A1 12/2023 Touati et al.
2023/0396641 A1 12/2023 Hebbagodi et al.
2023/0419161 A1 12/2023 Dines
2024/0046142 A1 2/2024 Marks et al.
2024/0053727 A1 2/2024 Timisescu et al.
2024/0054035 A1 2/2024 Bhargav
2024/0054526 A1 2/2024 Horwitz et al.
2024/0078724 A1 3/2024 Brehmer et al.
2024/0169519 A1 5/2024 Tjon
2024/0250977 A1 7/2024 Shulman et al.
2024/0283759 A1 8/2024 Adams
2024/0345807 A1 10/2024 Duggal et al.
2024/0361995 A1 10/2024 Somasundaram et al.
2024/0370708 A1 11/2024 Raghavan et al.
2024/0403328 A1 12/2024 Hecht et al.
2025/0028743 A1 1/2025 Massoudian et al.
2025/0063083 A1 2/2025 Grinberg et al.
2025/0130705 A1 4/2025 Kimhi et al.
2025/0173026 A1* 5/2025 Lee ...................... G06T 19/006
2025/0245030 A1 7/2025 Cyjon et al.
2025/0251847 A1 8/2025 Pham

FOREIGN PATENT DOCUMENTS

CN 107123424 A 9/2017
CN 107422666 A 12/2017
CN 107623596 A 1/2018
CN 107885656 A 4/2018
CN 108717428 A 10/2018
CN 112929172 A 6/2021
DE 102013104892 A1 11/2014
EP 3443466 B1 12/2021
JP H0756821 A 3/1995
KR 1020150100760 A 9/2015
KR 1020220016276 A 2/2022
WO 2004100015 A2 11/2004
WO 2006116580 A2 11/2006
WO 2008109541 A1 9/2008
WO 2014088393 A1 6/2014
WO 2017202159 A1 11/2017
WO 2018023798 A1 2/2018
WO 2018042424 A1 3/2018
WO 2020139865 A1 7/2020
WO 2020187408 A1 9/2020
WO 2020215123 A1 10/2020
WO 2021096944 A1 5/2021
WO 2021144656 A1 7/2021
WO 2021161104 A1 8/2021

(56) References Cited

FOREIGN PATENT DOCUMENTS

| | | | |
|---|---|---|---|
| WO | 2021183312 | A1 | 9/2021 |
| WO | 2021220058 | A1 | 11/2021 |
| WO | 2022153122 | A1 | 7/2022 |
| WO | 2023186048 | A1 | 10/2023 |

OTHER PUBLICATIONS

Anupam et al., "Personalizing the Web Using Site Descriptions," In: Proceedings of the Tenth International Workshop on Database and Expert Systems Applications, Sep. 1999, 7 pages.

Aylward, Grant, "Drag-and-Drop AI Enables Digital Workforce Deployment at Scale Share," Blue Prism, Mar. 19, 2020, Retrieved from <https://www.blueprism.com/resources/ blog/drag-and-drop-ai-enables-digital-workforce-deployment-at-scale/>, 10 pages.

Baarslag et al., "Negotiation as an Interaction Mechanism for Deciding App Permissions," In: Proceedings of the 2016 CHI Conference Extended Abstracts on Human Factors in Computing Systems, 2016, pp. 2012-2019.

Bahrebar et al., "A Novel Type-2 Fuzzy Logic for Improved Risk Analysis of Proton Exchange Membrane Fuel Cells in Marine Power Systems Application," Energies, Mar. 22, 2018, vol. 11, No. 721, pp. 1-16.

Barai et al., "Image Annotation System Using Visual and Textual Features," In: Proceedings of the 16th International Conference on Distributed Multi-media Systems, 2010, 8 pages.

Basic Walkthrough, Aug. 9, 2019, Retrieved from <https://www.youtube.com/watch?v=VpbgWyPf74g>, 16 pages.

Breitgand et al., "Serverless Data Analytics Platform: D3.1 Intital specs of the Serverless Compute and Execution Engine," CloudButton, Jul. 22, 2019, Retrieved from <https://cloudbutton.eu/docs/deliverables/CloudButton_D3.1_Public.pdf>, 56 pages.

Chen et al., "Artificial Intelligence in Education: a Review," IEEEAccess, Apr. 2020, vol. 8, pp. 75264-75278.

Demonstracion en espanol de Monday.com, Published Feb. 20, 2019, Retrieved from <https://www.youtube.com/watch?v=zOqydTgof1A>, 53 pages.

Desmedt et al., "Function-Based Access Control (FBAC) From Access Control Matrix to Access Control Tensor," In: Proceedings of the 8th ACM CCS International Workshop on Managing Insider Security Threats, 2016, 12 pages.

Donath, Judith, "Interfaces Make Meaning," Chapter 3 from the Social Machine: Designs for Living Online, 2014, pp. 41-76.

Dorn et al., "Efficient Full-Field Vibration Measurements and Operational Modal Analysis Using Neuromorphic Event-Based Imaging," Journal of Engineering Mechanics, Jul. 1, 2018, vol. 144, No. 7, 25 pages.

Features, daPulse, Nov. 2021, Retrieved from <web.archive.org/web/20140918184211/https://dapulse.com/features>, 22 pages.

Freund, Karl, "SiMa.ai Creates Drag-and-Drop Platform for Building AI Workflows," Forbes, Sep. 12, 2023, Retrieved from <https://www.forbes.com/sites/karlfreund/2023/09/12/simaai-creates-drag-and-drop-platform-for-building-ai-workflows/?sh=789de8466046>, 6 pages.

Gutwin et al., "Supporting Informal Collaboration in Shared-Workspace Groupware," Journal of Universal Computer Science, 2008, vol. 14, No. 9, pp. 1411-1434.

High Level Overview, daPulse, 2016, Retrieved from <https://web.archive.org/web/20161104170936/https://dapulse.com>, 12 pages.

Hupfer et al., "Introducing collaboration into an application development environment," In: Proceedings of the 2004 ACM Conference on Computer Supported Cooperative Work, Nov. 2004, vol. 6, No. 3, pp. 21-24.

International Search Report and Written Opinion in PCT/IB2020/000024, mailed Jun. 9, 2020, 10 pages.

International Search Report and Written Opinion in PCT/IB2020/000658, mailed Nov. 11, 2020, 8 pages.

International Search Report and Written Opinion in PCT/IB2020/000974, mailed May 3, 2021, 15 pages.

International Search Report and Written Opinion in PCT/IB2021/000090, mailed Jul. 27, 2021, 12 pages.

International Search Report and Written Opinion in PCT/IB2021/000297, mailed Oct. 12, 2021, 17 pages.

International Search Report and Written Opinion in PCT/IB2023/061991, mailed Feb. 26, 2024, 6 pages.

International Search Report and Written Opinion in PCT/IB2023/061992, mailed Mar. 19, 2024, 7 pages.

International Search Report and Written Opinion in PCT/IB2023/061994, mailed Apr. 25, 2024, 11 pages.

International Search Report and Written Opinion in PCT/IB2024/055803, mailed Sep. 30, 2024, 13 pages.

Ionescu et al., "A chat-centric collaborative environment for web-based real-time collaboration," 2015 IEEE 10th Jubilee International Symposium on Applied Computational Intelligence and Informatics, May 21-23, 2015, pp. 105-110.

Kantorovitz, Isaiah, "Lexical Analysis Tool," May 2004, Retrieved from <https://dl.acm.org/doi/pdf/10.1145/997140.997147>, vol. 39, No. 5, pp. 66-74.

Kollmann, Franz, "Realizing Fine-Granular Read and Write Rights on Tree Structured Documents," in: the Second International Conference on Availability, Reliability and Security, 2007, 7 pages.

Larson, Stephen, "Introducing Data Mining Concepts Using Microsoft Excel's Table Analysis Tools," Oct. 2015, Retrieved from <https://dl.acm.org/doi/pdf/10.5555/2831373.2831394>, pp. 127-129.

Lins et al., "Artificial Intelligence as a Service," Business & Information Systems Engineering, vol. 63, 2021, pp. 441-456.

List et al., "An Evaluation of Conceptual Business Process Modelling Languages," In: Proceedings of the 2006 ACM symposium on Applied Computing, Apr. 2006, pp. 1532-1539.

Monday.com Walkthrough 2018/All Features, Platforms & Thoughts, Transcription Provided, Mar. 1, 2018, pp. 1-55.

Ni et al., "Asynchronous Event-Based Visual Shape Tracking for Stable Haptic Feedback in Microrobotics," IEEE Transactions on Robotics, vol. 28, No. 5, Oct. 1, 2012, pp. 1081-1089.

Oey et al. "Developing integrated performance dashboards with Power BI—a case study in a medium-size Manufacturer." 2021 International Conference on Information Management and Technology (ICIMTech). vol. 1. IEEE, (2021): 265-270.

Pedersen et al., "Tivoli: an electronic whiteboard for informal workgroup meetings," Conference on Human Factors in Computing Systems: Proceedings of the INTERACT '93 and CHI '93 conference on Human factors in computing systems, Apr. 24-29, 1993, pp. 391-398.

Peltier, J., "Clustered and Stacked Column and Bar Charts," Peltier Technical Services, Inc., Aug. 2011, 128 pages.

Pivot table, Wikipedia, Jul. 2021, Retrieved from <https://en.wikepedia .org/w/index.php?title=Pivottable&oldid=857163289>, 5 pages.

Rodrigo, A., "Project Management with Monday.com: a 101 Introduction," Envato Tuts+, Jul. 22, 2019, Retrieved from <https://business.tutsplus.com/tutorials/project-management-with-mondaycom--cms-33586>, 11 pages.

Singh et al., "A Theoretical Framework of a BIM-based Multi-Disciplinary Collaboration Platform," Automation in Construction, Nov. 2011, vol. 20, pp. 134-144.

Sreenath et al., "Agent-based service selection," Journal of Web Semantics 1.3, Oct. 2003, 29 pages.

Stancu et al., "SecCollab-Improving Confidentiality for Existing Cloud-Based Collaborative Editors," In: 2017 21st International Conferences on Control Systems and Computer Science, 2017, pp. 324-331.

Stohr, E., "Workflow Automation: Overview and Research Issues," Information Systems Frontiers, 2001, pp. 281-296.

Sun et al., "Geoweaver: Advanced Cyberinfrastructure for Managing Hybrid Geoscientific AI Workflows," International Journal of Geo-Information, Feb. 2020, vol. 9, 20 pages.

Switch Presenter While Using ShowMyPC, ShowMyPC, Aug. 2016, Retrieved from <The Wayback Machine>, 1 page.

Using Filters in Overview, Published Mar. 7, 2017, Retrieved from <https://www.youtube.com/watch?v=hycANhz7gww> 1 page.

Veenendaal, A. "How to Use Generative AI for Document Extraction & Processing." SS&C Blue Prism. (2023): 1-8.

(56) References Cited

OTHER PUBLICATIONS

Wilson et al., “Beyond Social Graphs: User Interactions in Online Social Networks and their Implications,” ACM Transactions on the Web, Nov. 2012, vol. 6, No. 4, 31 pages.
Yamada et al., “A Software Tag Generation System to Realize Software Traceability,” 2010 Asia Pacific Software Engineering Conference, pp. 423-432.
Zhang et al. “Artificial intelligence in recommender systems.” Complex & intelligent systems 7.1 (2021): 439-457.
Zhang et al., “Integrating semantic NLP and logic reasoning into a unified system for fully-automated code checking,” Automation in Construction, 2017, vol. 73, 2017, pp. 45-57.

* cited by examiner 1002
1004a
1006
1008
1004X
1004b
1010
1012
1014
1016
1018
1020
1022
1024
1026
1028

SYSTEMS AND METHODS FOR PROGRESSIVE UI SEGMENTATION FOR PRECISION SELECTION

PRIORITY

This application claims the benefit of U.S. Provisional Application No. 63/763,309, filed on Feb. 26, 2025, which is incorporated by reference in its entirety.

TECHNICAL FIELD

This disclosure relates to user interface technology, and more specifically, to a method and system for facilitating precise input selection within a user interface through iterative binary segmentation and user input.

BACKGROUND

Effective user input to computing devices usually depends on the accuracy and precision of the user to select an appropriate key in a keyboard, keypad, or other interactive element. User precision tends to diminish when using keyboards having small keys, because the risk of incorrect key selection increases as key size decreases. Thus, in many modern user interfaces, especially those on smaller screens or devices controlled without a traditional pointer (such as a mouse), or in cases where activating such controllers can be problematic, precise selection of elements can be challenging. Furthermore, one or more impairments or disabilities of the user can further reduce the user's precision when using a keyboard. These difficulties can compromise the user's experience and reduce the efficiency of the user-machine interface operation. Improved user interfaces are needed to enable users to make precise selections more accurately, consistently, and effortlessly.

SUMMARY

Some disclosed embodiments may include systems, methods, and non-transitory computer readable media containing instructions for user interface control via control option segmentation. User interface control via control options segmentation may include outputting first signals for causing at least two distinct sets of control options to be presented in at least two distinct selectable regions of a display, wherein the at least two distinct sets of control options include a first plurality of control options displayed in a first distinct selectable region of the at least two distinct selectable regions and a second plurality of control options displayed in a second distinct selectable region of the at least two distinct selectable regions; receiving a selection of the second distinct selectable region; in response to receipt of the selection of the second distinct selectable region, outputting second signals for modifying the display to partition the second distinct selectable region into at least two additional distinct selectable regions including a third plurality of control options that are caused to be displayed in a third distinct selectable region of the at least two additional distinct selectable regions and a fourth plurality of control options that are caused to be displayed in a fourth distinct selectable region of the at least two additional distinct selectable regions; receiving a selection of the fourth distinct selectable region; in response to receipt of the selection of the fourth distinct selectable region, outputting third control signals for modifying the display to partition the fourth distinct selectable region into at least two further distinct selectable regions including one or more fifth control options that are caused to be displayed in a fifth distinct selectable region of the at least two further distinct selectable regions and one or more sixth control options that are caused to be displayed in a sixth distinct selectable region of the at least two further distinct selectable regions.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
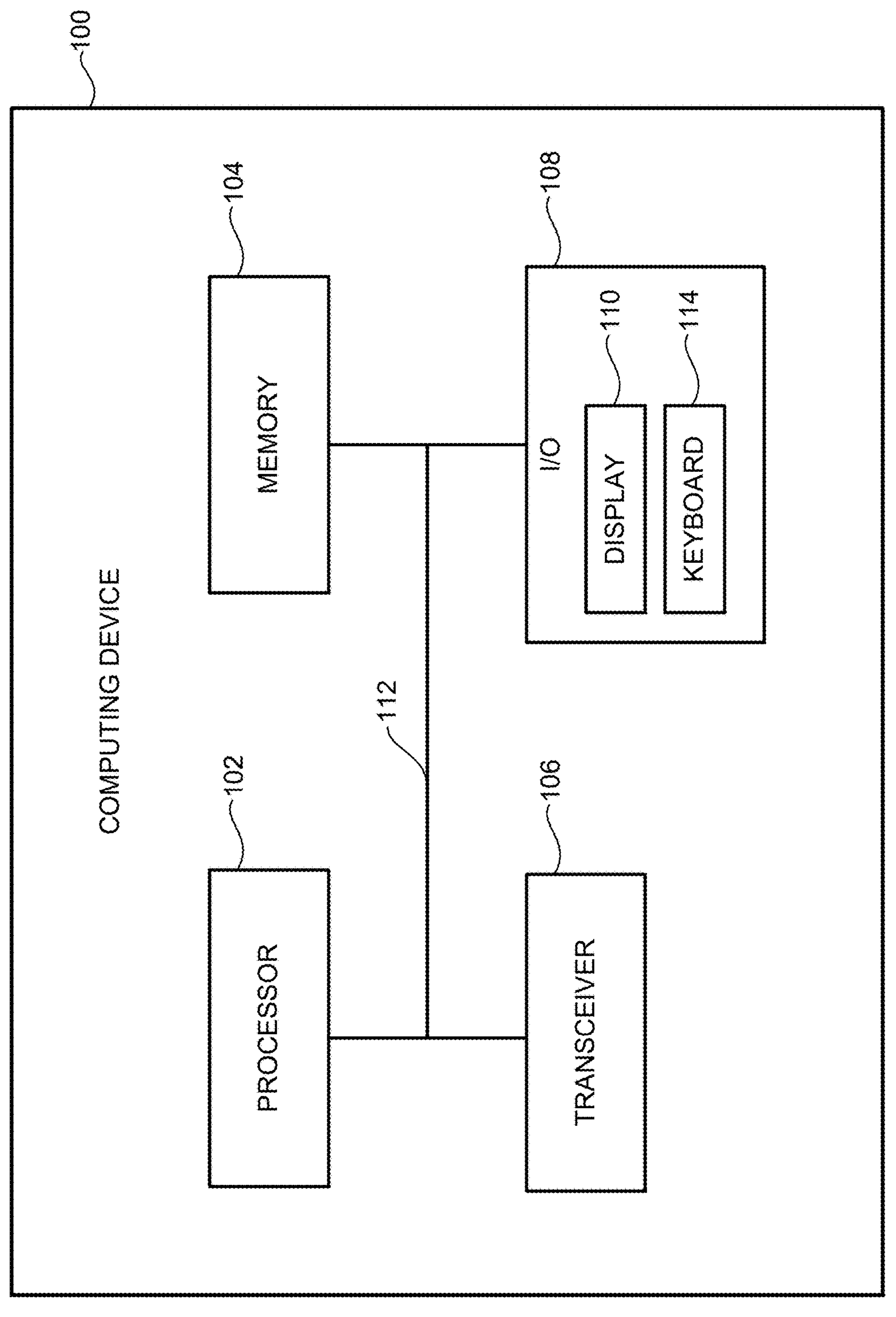
FIG. 1 is an exemplary schematic diagram of a computing device, consistent with some disclosed embodiments.

The following detailed description includes references to the accompanying drawings. Wherever possible, the same reference numbers are used in the drawings and the description to refer to the same or similar parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Various terms used in the specification and claims may be defined or summarized differently when discussed in connection with differing disclosed embodiments. It is to be understood that the definitions, summaries, and explanations of terminology in each instance apply to all instances, even when not repeated, unless the transitive definition, explanation, or summary would result in inoperability of an embodiment. It is also to be understood that once a term is defined herein, in the absence of an inherent inconsistency, that definition applies to all other uses of the term herein. Moreover, the exemplary embodiments of the figures and their description are not to be considered definitions of claim terms, but rather are non-limiting examples used to illustrate specific embodiments.

Throughout, this disclosure mentions "embodiments" and "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure employs open-ended permissive language, indicating for example, that some embodiments "may" employ, involve, or include specific features. The use of the term "may," and other open-ended terminology, is intended to indicate that although not every embodiment may employ the specific disclosed feature, at least one embodiment employs the specific disclosed feature.

Some embodiments may involve a computing device. A computing device as used herein may include any type of device capable of executing instructions using at least one processor. Such a computing device may include a smartphone, a tablet, a smartwatch, a personal digital assistant, a desktop computer, a laptop computer, an IoT device, a dedicated terminal, a wearable computing device, a client device, a server, and/or any other electronic device that enables computation. A computing device may include at least one processor, at least one memory, a transceiver, and an input/output unit, all interconnected via one or more buses.

As used herein, at least one processor may include any physical device or group of devices having electric circuitry that performs a logic operation on an input or inputs. For example, the at least one processor may include one or more integrated circuits (IC), including application-specific integrated circuits (ASIC), microchips, microcontrollers, microprocessors, all, or part of a central processing unit (CPU), graphics processing unit (GPU), digital signal processors (DSP), field-programmable gate arrays (FPGA), servers, virtual servers, or other circuits suitable for executing instructions or performing logic operations. In some embodiments, the at least one processor may include a remote processing unit (e.g., a "cloud computing" resource) accessible via a communications network.

As used herein, at least one memory may include a Random Access Memory (RAM), a Read-Only Memory (ROM), a hard disk, an optical disk, a magnetic medium, a flash memory, other permanent, fixed, or volatile memory, or any other mechanism capable of storing instructions. Such a memory may be pre-loaded with instructions for execution by at least one processor. In some embodiments, the at least one memory may include a remote storage (e.g., "cloud" storage) accessible via a communications network.

In some embodiments, a computing device may include a communications device capable of exchanging data using a wired and/or wireless communications network. A communications device may include any element whether employed in hardware, software, or a combination of hardware and software that is capable of sending and/or receiving data over a communications network. Such a communications network may include one or more of a digital communications network, an analog communication network, and/or any other communications network configured to convey data. Some examples of communications networks may include the Internet, a private data network, a virtual private network using a public network, a Wi-Fi network, a LAN, or WAN network, and/or any combination thereof. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LET (BLE), Wi-Fi, near field communications (NFC), or other suitable communication methods that provide a medium for exchanging data and/or information between separate entities.

Differing embodiments of this disclosure involve systems, methods, and/or computer readable media containing instructions. A system refers to at least two interconnected or interrelated components or parts that work together to achieve a common objective, function, or subfunction. A method refers to at least two steps, actions, or techniques to be followed to complete a task or a sub-task, to reach an objective, or to arrive at a next step. Computer-readable media containing instructions refers to any storage mechanism that contains program code instructions, for example to be executed by a computer processor. Examples of computer-readable media are further described elsewhere in this disclosure. Instructions may be written in any type of computer programming language, such as an interpretive language (e.g., scripting languages such as HTML and JavaScript), a procedural or functional language (e.g., C or Pascal that may be compiled for converting to executable code), an object-oriented programming language (e.g., Java or Python), a logical programming language (e.g., Prolog or Answer Set Programming), and/or any other programming language. Instructions executed by at least one processor may include implementing one or more program code instructions in hardware, in software (including in one or more signal processing and/or application-specific integrated circuits), in firmware, or in any combination thereof, as described earlier. Causing a processor to perform operations may involve causing the processor to calculate, execute, or otherwise implement one or more arithmetic, mathematic, logic, reasoning, or inference steps. As a shorthand, this disclosure may describe some features in connection with only one of a system, method, and/or computer readable medium. It is to be understood that the disclosure of a feature in one is a disclosure of the feature in all.

In some embodiments, one or more neural networks may be configured to analyze inputs and generate corresponding outputs. Some non-limiting examples of such neural networks may include shallow artificial neural networks, deep artificial neural networks, feedback artificial neural networks, feed-forward artificial neural networks, autoencoder artificial neural networks, probabilistic artificial neural networks, time-delay artificial neural networks, convolutional artificial neural networks, recurrent artificial neural networks, long/short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using backpropagation, using gradient descent, using stochastic gradient descent (SGD), using mini-batch gradient descent, and so forth. In some examples, an artificial neural network may be created from two or more other artificial neural networks by combining the two or more other artificial neural networks into a single artificial neural network.

Some disclosed embodiments may include and/or access a data structure or data. A data structure consistent with the present disclosure may include any collection of data values and relationships among them. The data may be stored linearly, horizontally, hierarchically, relationally, non-relationally, unidimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database, or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, servers that may be owned or operated by the same or different entities. Thus, the term "data structure" as used herein in the singular is inclusive of plural data structures.

Structured data may include any collection of data values and relationships among them. The data may be stored linearly, horizontally, hierarchically, relationally, non-relationally, unidimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. As used herein, the term "data structure" may include a data pool or may be included in a data pool. A data pool may include a data structure, a data set, a database, a data lake, a data pool, or any other form of information storage whether distributed or undistributed and whether structured or unstructured. It is further to be understood that the term "data structure" as used herein in the singular is inclusive of plural data structures. A data structure may also include any hardware, software, firmware, or combination thereof for storing and facilitating the retrieval of information.

Some disclosed embodiments involve a keyboard. A keyboard refers to an input interface having physical or virtual keys for selecting and/or entering data (e.g., text). Thus, as used herein, a keyboard may or may not include a physical board. Data may be entered via a keyboard, for example, into long- or short-term memory of a computing device. A keyboard may include an arrangement of keys which a user may actuate to generate signals for controlling a device or system. A key of a keyboard refers to a discrete input element that may be actuated by a user. Actuation of a key may result in one or more signals, instructions, or characters being provided to the device or system. Each key of a keyboard may correspond to one or more different letters, numbers, symbols, and/or special functions. In some embodiments, a key may include a button, switch, lever, or other interactive element. A physical keyboard refers to a hardware device with physical keys that a user presses or touches to input data. Physical keyboards may include mechanical keyboards where each key may be associated with a mechanical switch, membrane keyboards including pressure pads, chiclet keyboards, ergonomic keyboards, and/or gaming keyboards (e.g., with customizable lighting and/or programmable keys). A keyboard may provide a standard (e.g., QWERTY) arrangement of alphanumeric keys, one or more function keys (e.g., F1-F12), a numeric keypad, multimedia keys (e.g., shortcuts for controlling computer settings), and/or a connectivity key to establish a wireless connection with a computing device. A physical keyboard may include a memory buffer for storing values associated with keystrokes in advance of transmitting the values to a computing device. A virtual keyboard may include a software-based keyboard that may appear on a touchscreen and/or screen-based interface. The virtual keyboard may include representations of one or more keys, which when accessed by a user may allow the user to input data. A user may access the representations of the one or more keys by touching, pressing, tapping, swiping on, clicking on, selecting with a gesture or an eye movement, or interacting with the representations in any other manner. For instance, smart TVs and gaming console devices may include a virtual keyboard. A virtual keyboard may include a keyboard displayed on a touchscreen, an on-screen keyboard (e.g., as an accessibility feature), and/or a projected keyboard (e.g., using laser light to present a keyboard on any flat surface). In some embodiments, a virtual keyboard may include an image of a keyboard provided in an augmented reality or virtual reality environment. A virtual keyboard may be configured to store and/or transmit values associated with virtual keystrokes in a memory associated with the computing device presenting the virtual keyboard. By way of another example, a virtual keyboard may be projected in the form of light on a surface or may be presented in holographic form or via a heads up display or through smart glasses where key selection may occur audibly, through gestures, or through eye movement and/or eye gaze.

By way of a non-limiting example, reference is made to FIG. 1 illustrating an exemplary schematic diagram of a computing device 100, consistent with some disclosed embodiments. Computing device 100 may include at least one processor 102, at least one memory 104 (e.g., a non-transitory computer readable medium), a transceiver 106, and an input/output (I/O) unit 108. At least one processor 102, at least one memory 104, transceiver 106, and input/output unit 108 may be interconnected via bus 112. In some embodiments, input/output unit 108 may include a display 110 and/or a keyboard 114. In some embodiments, keyboard 114 may be a physical keyboard in communication with processor 102 via a wired and/or wireless communications channel. In some embodiments, display 110 may display a virtual keyboard. Display 110 may include one or more touch sensitive surfaces, permitting computing device 100 to receive inputs from a user, and present outputs to a user. Computing device 100 may be configured to perform one or more of the operations disclosed herein.

Figure 2:
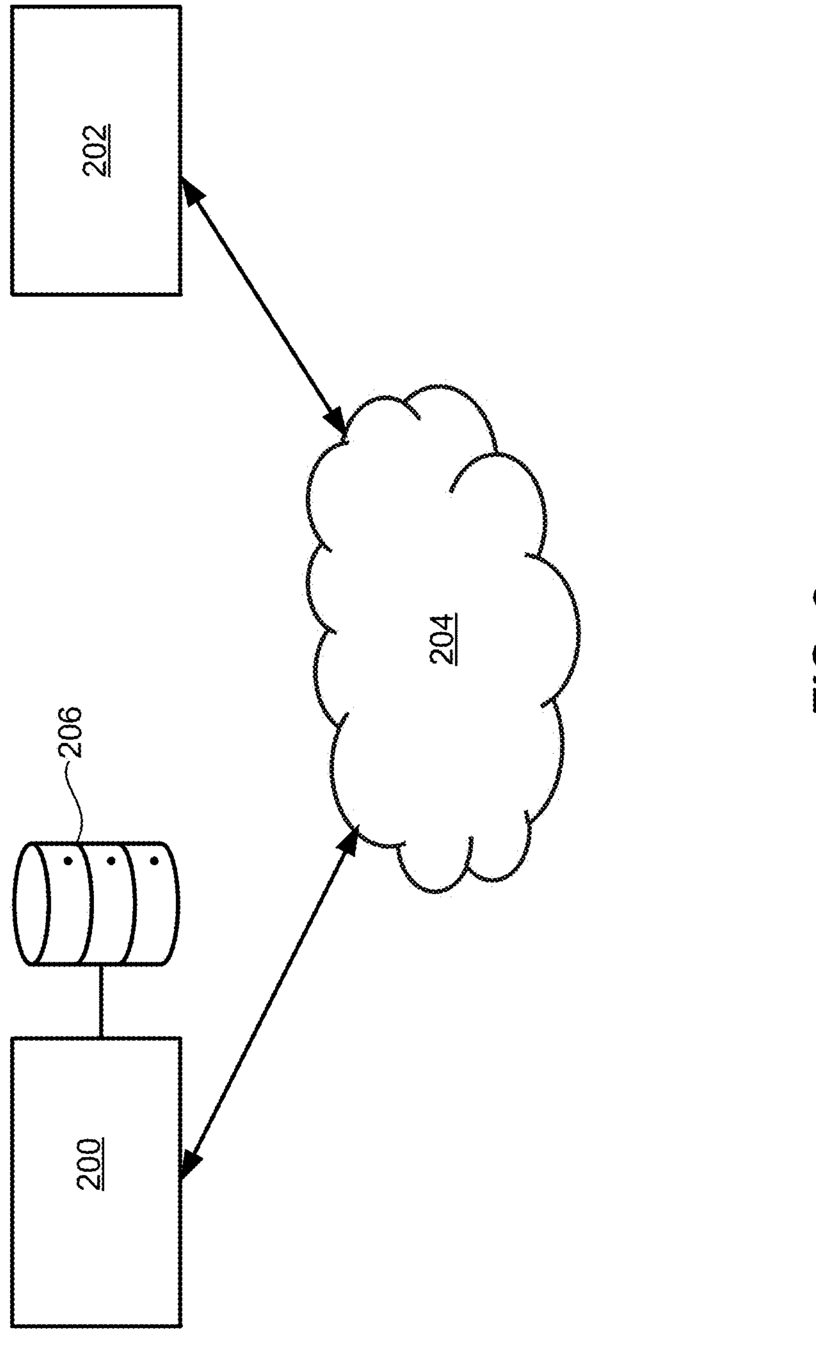
FIG. 2 is an exemplary schematic diagram of a first computing device in communication with a second computing device over a communications network, consistent with some disclosed embodiments.

By way of another non-limiting example, reference is made to FIG. 2 illustrating an exemplary schematic diagram of a first computing device 200 in communication with a second computing device 202 over a communications network 204, consistent with some disclosed embodiments. First and second computing devices 200 and 202 may correspond to different instances of computing device 100 and may exchange data via network 204. In some embodiments, at least some of the data exchanged via network 204 may be stored in a data store 206 (e.g., a data structure). In some embodiments, first computing device 200 may be a server device and second computing device 202 may be a client device. In some embodiments, first computing device 200 may provide a cloud service in conjunction with data storage 206. Computing devices 200 and 202 may be configured to perform one or more of the operations disclosed herein, e.g., in a distributed manner via network 204.

Some disclosed embodiments address the need for precise selection on a user interface by graphically dividing the interface into two or more distinct sections. Upon initial implementation, the user may be prompted to choose between these two or more sections based on the location of the desired interface element. Upon receiving the user's selection, the chosen section may then be divided into two smaller sub-sections, and this process of division may be repeated iteratively. In each iteration, the area of interest may be divided into an inactive portion and an active portion, narrowing the selection area until the desired element is isolated and selected by the user. This method of successive binary division continues until the user has precisely identified the required user interface portion. The method, system, or computer readable medium may be designed to work with various input mechanisms, such as touchscreens, cursor controls, eye-tracking, or gesture controls, making it adaptable to multiple technology platforms.

By way of a non-limiting example, disclosed embodiments may include a graphical user interface for selecting one or more keys of a virtual and/or physical keyboard. When a plurality of selectable options appear on the screen, and the system recognizes that a user wishes to make a selection (e.g., to type a character), the system may visually divide the portion of the screen containing the selectable options into two distinct selectable regions. The user then selects one of these regions, after which the system repeats the process for the selected region.

For example, when a virtual keyboard is presented on screen, the keyboard may be divided into two halves (e.g., the left half containing the keys QWERTY, etc., and right half containing the keys YUIOP, etc.). Alternatively, the keyboard may remain visible while two overlaying regions represent the selectable divisions. The user selects the region containing the target key, prompting the system to further divide that region into two additional distinct selectable regions. Subsequently, the process repeats iteratively until only the individual key representing the desired letter (target key) remains for selection. This procedure may significantly simplify character input, particularly in constrained or non-traditional input environments.

The efficiency of user interface selection methods can be compared by analyzing the number of steps required to reach a target selection. In the case of a smart TV on-screen keyboard, the traditional method relies on arrow-based navigation using a remote control. This requires the user to move a selection box across a grid of characters, pressing directional buttons to navigate row by row or column by column until the desired character is reached. Each movement corresponds to a separate user input, making the selection process highly dependent on the distance between the starting position and the target key. If we assume a common smart TV keyboard layout of six rows and ten columns, the average number of movements needed to reach a character from a default starting point would be the sum of half the number of rows and half the number of columns, or approximately eight movements. Once the target key is reached, an additional confirmation press may be required to finalize the selection, resulting in a total of about nine steps per character. For a five-letter word, this results in approximately forty-five individual user actions, which can be time-consuming and cumbersome.

In contrast, Progressive UI Segmentation methods described herein significantly reduce the number of required interactions by adopting a binary selection approach. Instead of navigating through every row and column, the system divides the selectable area into two regions and prompts the user to choose between them. Each subsequent selection further halves the remaining area, iteratively narrowing down the choices until only a single option remains, where the narrowing to a single control option may be considered convergence of a progressive UI segmentation process. This approach follows a logarithmic progression, where the total number of required selections is approximately the logarithm (base 2) of the total number of selectable options. Applying this to a sixty-character keyboard, the number of steps needed to reach a single character is about six. When extended to selecting a five-letter word, this method requires around thirty user actions, which is roughly one-third fewer steps compared to traditional remote navigation.

In progressive UI segmentation, presented control options may be divided or further subdivided based on each progressive selection of a region of the user interface. Based on the user selection of a region, the partitioning of the region may be determined or accomplished based on several different methods, including equal-area or equal control option based methods, shape-based methods, probabilistic methods, heuristic methods, or any other method that may progressively narrow control options toward convergence or simplify user interaction (e.g., reducing the number of user inputs or selections). A progressive UI segmentation method may include a subset assignment criterion, where control options associated with the selected region are divided into subsets based on the partitioning (e.g., the method of partitioning) of the selected region. An assignment criterion may be consistent over iterations of UI segmentation or may change from one iteration to the next. As the UI is segmented based on a user selection, the number of presented control options may reduce or narrow (e.g., toward convergence).

In the context of progressive UI segmentation, convergence may refer to a state or outcome of a segmentation process in which the user interface becomes simplified or stabilized, such that further subdivision of selectable regions of the UI (e.g., distinct selectable regions) for the refinement of control options is no longer necessary. For example, convergence may be reached upon a distinct selectable region presenting only a single control option, which may be associated with a single control function (e.g., action, instruction, operation). Convergence may be defined by various metrics based on a method by which regions of the UI are partitioned, such as spatially (e.g., a region contains one control option), probabilistically (e.g., a single control option has a predicted probability of selection greater than a threshold), temporally (e.g., a segmentation process "time out" after a time-based threshold determining convergence and restarting the progressive UI segmentation process), interactively (e.g., a user selecting a region displaying only a single control option), or any other convergence metric that indicates that further segmentation of distinct selectable regions or refinement of control options is no longer necessary.

The advantages of this method become more apparent as the selection grid grows larger. Since arrow-based navigation requires a linear increase in steps as more characters are introduced, it scales inefficiently for larger input spaces. In contrast, Progressive UI Segmentation continues to operate logarithmically, meaning that even as the number of selectable options increases, the additional steps required remain relatively low. This results in a more efficient selection process, reducing user fatigue and improving overall user experience, especially in constrained environments where traditional selection methods are slow or impractical. By implementing this segmentation technique, the interaction process can be made not only faster but also more accessible for users with physical limitations, as it minimizes the number of precise motor actions required to make a selection.

In a similar manner, the innovations disclosed herein may be applied to any user interface requiring the selection of display elements, such as icons, menu options, or other interactive elements (such as gaming consoles). As such, the disclosed innovations may have broad applicability in the fields of consumer electronics, accessibility technology, virtual and augmented reality interfaces, and more. Additionally, since each time a choice can be received for one of only two choices, the disclosed innovations may enable control for any UI interface by individuals with disabilities, without requiring physical or mental effort. As another example, the innovations disclosed herein may be utilized by eye pattern recognition or brainwave reading devices trained to allocate a directional gaze or a first thought for the first input and a second gaze or thought for the second.

In some embodiments, an artificial intelligence (AI) agent may be recruited for the selection process and for interpreting signals, such as an AI system that analyzes and derives meaning from human behaviors, inputs, and/or signals to act based on inferred intent, context, and/or learned patterns. Such analysis of human behaviors and speech may include processing speech, text, gestures, facial expressions, and/or other forms of human interaction. For example, such an AI agent may be configured with computing device 200 and/or data storage 206 and may be accessible via network 204 in FIG. 2.

Some disclosed embodiments involve systems, methods, and computer readable medium for user interface control via control option segmentation. User interface control refers to the methods, mechanisms, or processes by which a user interacts with, manipulates, or otherwise directs the operation of a computing device or software application through visible, audible, tactile, or other sensory elements. User interface control may include receiving user input and mapping the user input to a corresponding function, action or change within the system. Examples of user interface control may include: selecting a region of a user interface that presents a key on a virtual keyboard to generate a character input, navigating a menu on a smart TV using a remote control, selecting a display region associated with an icon on a smartphone screen via touch input, or issuing a voice command (e.g., "open settings") to a control device.

A control option refers to an element (e.g., an icon, a symbol, a screen area for capture or zooming in) that may be presented in or associated with a selectable region of a user interface (e.g., a distinct selectable region). A control option may be associated with one or more control functions or may represent available control functionalities (e.g., parameters, commands, or modes) that may be displayed, grouped, or hierarchically organized within a user interface. A control function associated with a control option may be executed based on the selection of a distinct selectable region, where a distinct selectable region may refer to a user-selectable region of a user interface that, when selected, triggers or corresponds to an action command function, or input recognized by a computing device. A control function associated with a control option may be atomic (i.e., a single irreducible input) (e.g., the letter 'A' on a keyboard) or compound (i.e., a higher-level action) (e.g., 'Save File'). A control option may be presented visually (e.g., via a display), audibly (e.g., via speech prompts), tactilely (e.g., via haptic interfaces), or via any modality that permits user recognition and selection. A control function associated with a control option may correspond to a discrete action (e.g., 'Enter,' 'Play,' 'Delete'), a continuous function (e.g., volume adjustment), or hierarchical selections (e.g., menus and submenus). Exemplary control options may include: (1) keyboard control options, such as: the 'A' key, the spacebar, the 'Enter' key, (2) menu/software application control options, such as: the 'Save' command in a file menu, the 'Undo' option in an editing application, the 'Settings' button in a mobile application, (3) device/media control options, such as: a 'Play' button on a streaming application, the 'Volume Up' option on a remote control, a toggle switch for 'Wi-Fi On/Off,' (4) touchscreen control options, such as: the 'Send' button in a messaging application, a specific application icon (e.g., 'Camera'), or (5) virtual reality (VR)/augmented reality (AR) accessibility control options, such as: a virtual 'Confirm' button floating in 3-dimensional space, a gaze-activated 'Yes' option on an accessibility interface, a gesture-driven 'Swipe Left' action.

A set refers to a grouping, collection, or aggregation of elements that are treated as a unit according to some common property, rule, or organizing principle. The elements or items of a set may include objects, symbols, values, control options, or other definable items. A set may be finite or infinite in scope. A set may include a plurality of items. In some embodiments, a set may include a single item. A set may be used to organize related control options or enable structured partitioning or interaction with display regions. A set of control options refers to a set as previously defined, which may include one or more control options that are presented together within a user interface (e.g., within a distinct selectable region), based on which a user may determine or make a selection of a distinct selectable region of a user interface.

A selection of a distinct selectable region may result in the partitioning of the distinct selectable region into two or more partitioned distinct selectable regions, and a set of control options presented in or associated with the distinct selectable region may be distributed into two or more subsets, each subset associated with a partitioned distinct selectable region. For example, a distinct selectable region may present or be associated with a plurality of control options. This distinct selectable region may be partitioned into two partitioned distinct selectable regions, and each partitioned distinct selectable region may present or be associated with a subset of the plurality of control options.

A set of control options may include a logical, probabilistic, or structural grouping of control options at a given stage of interaction. A set of control options does not necessarily limit the number of control options in the set. Exemplary sets of control options may include: a keyboard's left half after segmentation (i.e., each letter is a control option, the left half being a set), a menu displaying {'Save,' 'Print,' 'Export'} as three options, a touchscreen showing a set of application icons {Messages, Camera, Maps, Settings}, or a streaming application showing a set of thumbnails for recommended movies.

A plurality of control options refers to two or more control options. A plurality of control options may be structured (e.g., organized based on a logical or structural grouping) or unstructured (e.g., control options simply existing together as more than one option). An exemplary plurality of control options may include: the letters 'A,' 'B,' and 'C' presented as three separate options on a keyboard, the commands 'Copy' and 'Paste' shown together in a menu, two or more radio buttons (e.g., 'Yes'/'No') on a form, or several virtual objects in an augmented reality (AR) interface that each may be associated with a selectable region.

Control option segmentation refers to the process of dividing a set of available control options (e.g., elements of a user interface (UI) that are selectable through a distinct selectable region) into subsets based on the partitioning of a user interface (e.g., partitioning distinct selectable regions of a user interface). Control option segmentation may allow for a simplification of or reduction of time to complete a selection process. Control option segmentation may occur iteratively, where each step may reduce the number of available choices until a final target option is isolated for selection (e.g., until convergence). Control option segmentation may include various modes of partitioning of a distinct selectable region, such as spatial partitioning (e.g., dividing screen regions based on area or shapes), logical partitioning (e.g., grouping menu items), temporal partitioning (e.g., sequential presentation), probabilistic probabilistic (e.g., based on user selection history, user preferences), or a combination of these modes of presentation. Examples of partitioning regions of a user interface for control option segmentation may include splitting a virtual keyboard into two halves (e.g., left vs. right), then further splitting the chosen half, dividing a set of 20 menu items into two groups of 10 for the user to choose between, overlaying two highlighted regions (e.g., top vs. bottom of the screen) for user selection, further segmenting the chosen region, or sequentially presenting, based on prior user choices, a smaller subset of options from a larger pool.

User interface control via control option segmentation refers to a method or system in which a user manipulates or navigates a computer interface by progressively partitioning or narrowing down a set of control options through segmentation or iterative segmentation (e.g., partitioning based on user selection of a region of the user interface). User interface control via control option segmentation may include a user making successive binary or multi-way choices of distinct selectable regions of a user interface that reduce the potential choices for control options until the desired control option is isolated, such that an associated control function may be executed. User interface control via control option segmentation may transform user interaction into a series of simplified decisions, which may reduce cognitive and motor load associated with user interface control and may improve precision of user interface control. User interface control via control option segmentation may allow for greater performance of user interface control in constrained environments (e.g., small screens, accessibility devices, remote navigation). Examples of user interface control via control option segmentation may include: (1) for keyboard input: selecting letters on a virtual keyboard by progressively halving the key set spatially (e.g., left and right partitions), then further subdividing until convergence, where a remaining region may contain a single key and be highlighted, (2) for smart TV navigation: choosing a movie title from a large catalog by first splitting options alphabetically (e.g., 'A' through 'M' and 'N' through 'Z' partitions), then narrowing further until the specific title remains, (3) for a gaming console: navigating menus by choosing between two halves of the option list at each step until the target function is reached, (4) for an accessibility use case: a user with limited mobility may select an icon by directing gaze left or right to halve the available icons, then continuing until the correct one is highlighted, or (5) for a virtual reality (VR) or augmented reality (AR) interface: partitioning a 3-dimensional menu space into two zones, with user gestures selecting zones until the region with the desired object or tool is isolated.

By way of nonlimiting examples, FIGS. 3-11B illustrate examples of user interface control via control option segmentation.

Some disclosed embodiments involve outputting first signals for causing at least two distinct sets of control options to be presented in at least two distinct selectable regions of a display. Outputting first signals may be implemented by at least one processor (e.g., processor 102 of FIG. 1). A distinct selectable region refers to a discrete, identifiable portion of a user interface that is visually, audibly, tactilely, or otherwise perceptibly distinguished from other portions of the interface and that is further configured to enable user selection of the distinct selectable region by providing input. This input may be recognized by the system as a user selection of a distinct selectable region or an indication of the selection of a distinct selectable region. A distinct selectable region may present or be associated with one or more control options. A distinct selectable region may be a region that is separated or differentiated from other or adjacent regions (e.g., distinct selectable regions separated or differentiated by boundaries, colors, highlighting, spacing, shading, modality, or any combination of these). A distinct selectable region may enable or allow the user to provide input (e.g., a touch, click, gesture, gaze, speech, thought signal) to indicate a choice or selection of the distinct selectable region. A distinct selectable region may be a display area, interface area, or any other structural or organizational element of a user interface through which one or more control options may be presented to the user, such that a user may choose or select a distinct selectable region based on one or more presented or associated control options of that distinct selectable region. Exemplary distinct selectable regions may include: (1) regions of a keyboard, such as: the left and right halves of a keyboard interface, a highlighted quadrant containing {'Q', 'W', 'E', 'R', 'T', 'Y'}; (2) regions of a menu or application, such as: a submenu region containing file operations {'Save', 'Open', 'Close'}, a toolbar region with icons for drawing tools; (3) regions of a touchscreen or mobile display, such as: a rectangular area of the screen displaying 'Accept' versus a separate area displaying 'Decline,' a tile-based home screen, where each tile (e.g., application icon) is a distinct selectable region; (4) regions of a media device, such as: a segmented remote-control interface (e.g., where one area controls playback and another controls volume), or a streaming interface showing separate thumbnail boxes (e.g., each representing a selectable title); (5) regions for virtual reality (VR)/augmented reality (AR) for accessibility, such as: a floating button in a 3-dimensional space marked 'Next' versus a distinct and nearby 'Back' button, a gaze-activated left-side region versus right-side region, a tactile Braille surface divided into raised zones (e.g., each zone corresponding to an available user selection or choice).

A signal for causing at least one distinct set of control options to be presented in at least one distinct selectable region of a display refers to information, data, or instructions that are generated, transmitted, or processed by a computing device that, when received by a subsystem of a display, causes the rendering, activation, or presentation of interface elements. A signal for causing at least one distinct set of control options to be presented in at least one distinct selectable region of a display may result in multiple groupings of control options (e.g., buttons, keys, menu commands) to be presented (i.e., at least two distinct sets of control options presented, at least three distinct sets of control options presented). A signal for causing at least one distinct set of control options to be presented in at least one distinct selectable region of a display may also result in multiple, separate, and identifiable portions of the display to be presented, where each region (e.g., a distinct selectable region, at least two distinct selectable regions, at least three distinct selectable regions) may be associated with one or more distinct sets of control options.

Exemplary embodiments of a signal for causing at least one distinct set of control options to be presented in at least one distinct selectable region of a display may include digital rendering commands, API calls, encoded data packets, hardware-level voltage signals, or software-level instructions. Exemplary signals for causing at least one distinct set of control options to be presented in at least one distinct selectable region of a display may include: (1) software rendering signals, such as a smartphone OS outputting drawing commands to render a top region set (e.g., {'Wi-Fi', 'Bluetooth', 'Airplane Mode'}) and a bottom region set (e.g., {'Home', 'Back', 'Recent Applications'}), (2) graphics API/OS-level signals, such as a game console GPU receiving signals to render a left side panel set (e.g., {'Items', 'Inventory', 'Map'}) and a right side panel set (e.g., {'Chat', 'Friends', 'Settings'}), (3) hardware or electrical signals, such as a display controller receiving voltage or pixel update signals to illuminate a left half display set (e.g., {'Q', 'W', 'E', 'R', 'T'}, {Keys 'A' through 'M'}) and a right half display set (e.g., {'Y', 'U', 'I', 'O', 'P'}, {Keys 'N' through 'Z'}), (4) network-delivered signals, such as a cloud gaming service streaming display data that presents an upper screen region set (e.g., {'Play', 'Pause', 'Stop'}) and a lower screen region set (e.g., {'Volume Up', 'Volume Down', 'Mute'}), (5) VR/AR spatial signals, such as a VR headset receiving signals from a rendering engine to display a floating left panel set (e.g., {'Yes', 'No', 'Maybe'}) and a floating right panel set (e.g., {'Save', 'Cancel', 'Retry'}), or (6) accessibility signals, such as a screen reader system generating tactile feedback signals to a haptic display, including an upper tactile zone set (e.g., {'0', '1', '2', '3', '4'}) and a lower tactile zone set (e.g., {'5', '6', '7', '8', '9'}).

Exemplary hierarchical categories of signals for causing at least one distinct set of control options to be presented in at least one distinct selectable region of a display may include:

(1) hardware-level signals, which refers to physical or electrical signals that directly control the state of the display hardware, such as voltages, currents, or pixel-driving instructions (e.g., voltage waveforms driving LCD pixels to illuminate regions with a set of icons, refresh cycle signals updating the left and right halves of an e-ink display, GPU frame buffer signals that distinguish between rendering region A and region B), (2) firmware/driver-level signals, which refers to low-level software instructions or driver commands that manage communication between the operating system and hardware (e.g., display driver commands to render a toolbar in one region and a menu in another, device firmware signaling the display sub-system to show separate input panels, GPU shader instructions rendering distinct sets of UI textures in different screen regions), (3) operating system-level signals, which refers to system-level signals, including API or system call outputs, that may instruct the operating system's display compositor to render regions and control options (e.g., windowing system calls dividing the display into a left region (file options) and right region (edit options), OS notification manager signaling the top banner region for alerts while the bottom region shows navigation controls, touchscreen OS signals causing segmented on-screen keyboards), (4) application-level signals, which refers to higher-level application commands or rendering instructions that describe how UI elements should be displayed (e.g., a mobile application outputting signals for a top region set (e.g., {'Camera', 'Gallery', 'Settings'}) and a bottom region set (e.g., {'Accept', 'Cancel'}), a web browser rendering HTML/CSS regions where separate button sets are displayed in sidebars, a video game engine rendering control menus on the left and right heads-up display (HUD) panels), (5) network-level signals, which refer to data or instructions transmitted over a network that, when received by a client device, cause presentation of UI regions and control options (e.g., cloud server sending UI update packets to a thin client with a region 1 set (e.g., {'Play', 'Pause', 'Stop'}) and a region 2 set (e.g., {'Volume Up', 'Down', 'Mute'}), remote desktop streaming where separate toolbars are transmitted as distinct selectable regions, multiplayer game server sending UI overlays to left and right display panels), or (6) multimodal/accessibility signals, which refer to signals that adapt UI presentation across modalities (e.g., visual, auditory, tactile) to ensure accessibility (e.g., haptic signals to a braille device with an upper zone set (e.g., {Letters 'A' through 'M'}) and a lower zone set (e.g., {Letters 'N' through 'Z'}), audio output signals presenting menu prompts in left and right stereo channels, eye-tracking or brain-computer interface (BCI) signals mapping gaze and focus to distinct selectable screen regions).

Outputting first signals for causing at least two distinct sets of control options to be presented in at least two distinct selectable regions of a display refers to at least one signal that instructs or otherwise causes a display system to render or present at least two different groupings (i.e., distinct sets) of interface elements (e.g., control options) in at least two separate, identifiable, and selectable areas (i.e., distinct selectable regions) of the user interface. The at least two distinct sets of control options to be presented in at least two distinct selectable regions of the display refers to a situation where at least two sets of control options exist and at least two distinct selectable regions exist. When at least two distinct sets of control options are presented in at least two distinct selectable regions of the display, each distinct set of control options may be presented in a separate distinct selectable region. When at least two distinct sets of control options are presented in at least two distinct selectable regions of the display, the union of each of the distinct sets of control options may have collective, complete, or meaningful coverage of selectable items presented by the display. A union of distinct sets of control options refers to the set containing all control options that belong to each of the distinct sets of control options. A union of distinct selectable regions refers to a single area that encompasses space, boundaries, or content included in the distinct selectable regions. The first signals may include digital instructions, rendering commands, or communication signals that ultimately control the portion of the system or interface responsible for visually, audibly, tactilely, or otherwise perceptibly conveying information and control options to the user. Each set of control options of the at least two distinct sets of control options may be presented in a distinct separate region of the at least two distinct selectable regions of the display, which may enable or allow users to differentiate and/or interact with them independently. Examples of outputting first signals for causing at least two distinct sets of control options to be presented in at least two distinct selectable regions of a display may include a predictive text keyboard outputting first signals to display a left region and a right region of the predictive text keyboard, a smart TV interface outputting first signals to show a bottom region set (e.g., {'Play', 'Pause', 'Stop'}) and a side region set (e.g., {'Volume Up', 'Volume Down', 'Mute'}), a phone UI outputting signals to display a top region set (e.g., {'Notifications', 'Messages', 'Settings'}) and a bottom region set (e.g., {'Home', 'Back', 'Recent Applications'}), a word processor outputting signals to present a left toolbar region set (e.g., {'Bold', 'Italic', 'Underline'}) and a right toolbar region set (e.g., {'Insert Table', 'Insert Image', 'Insert Chart'}), a VR/AR headset outputting first signals to render a left floating panel set (e.g., {'Yes', 'No', 'Maybe'}) and a right floating region set (e.g., 'Save', 'Cancel', 'Retry')), or an adaptive display outputs first signals to provide an upper half region set (e.g., {'0', '1', '2', '3', '4'}) and a lower half region set (e.g., {'5', '6', '7', '8', '9'}).

Figure 3:
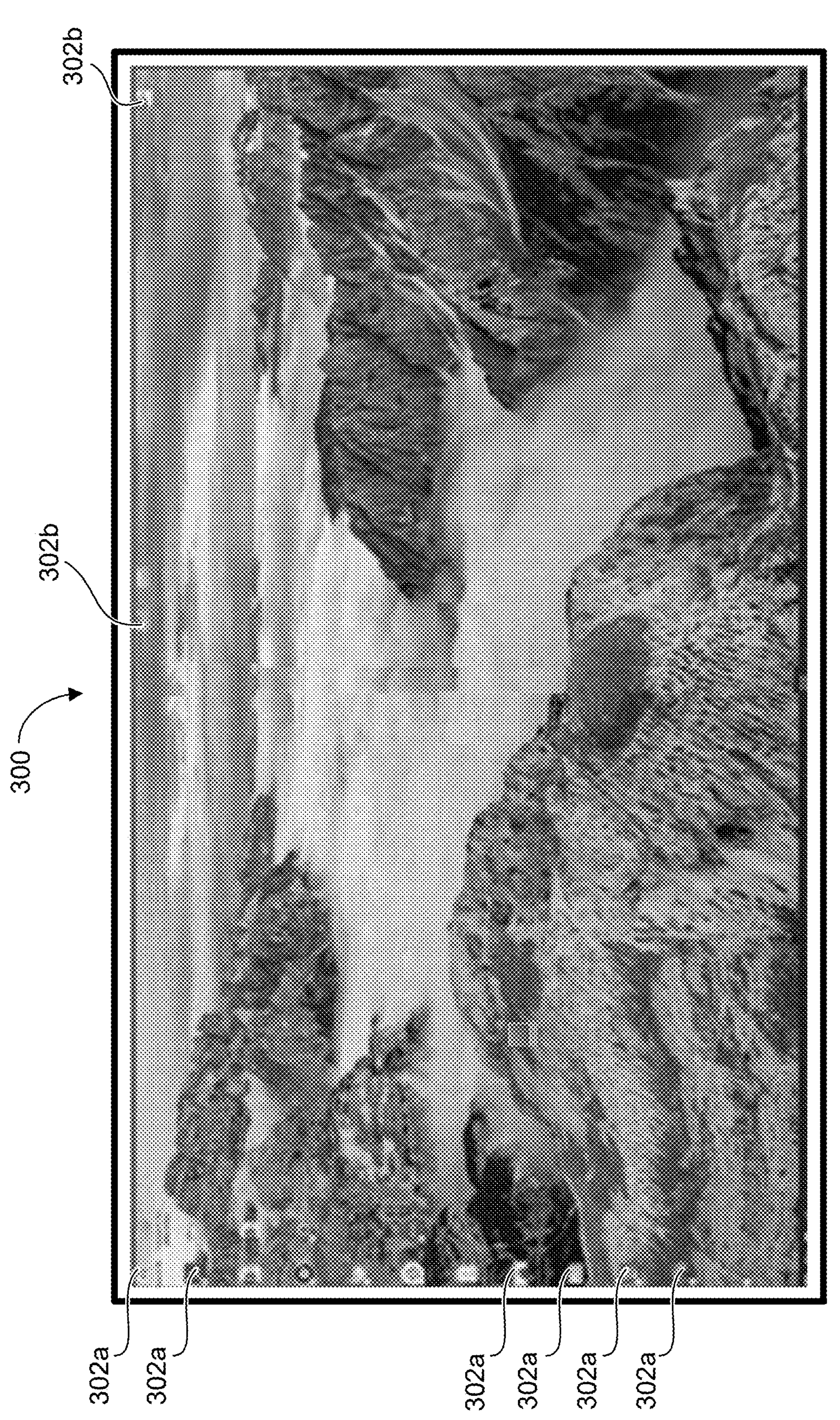
FIG. 3 illustrates a screen shot of a user interface for controlling a software application via control option segmentation, consistent with some disclosed embodiments.
Figure 4A:
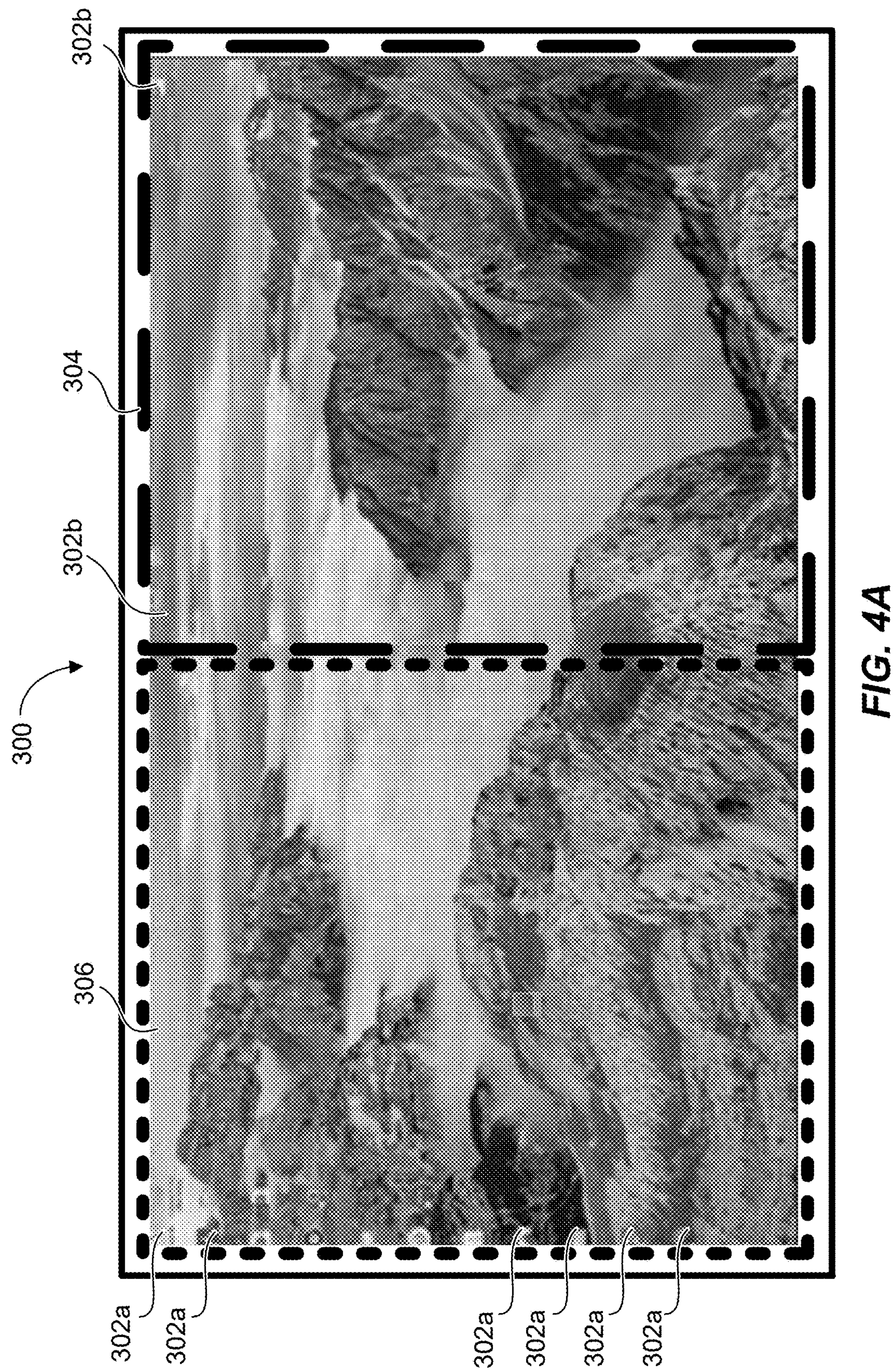
FIGS. 4A and 4B illustrate the user interface of FIG. 3 after a first partitioning, before and after the receipt of a first selection, consistent with some disclosed embodiments.

By way of a nonlimiting example, FIG. 3 and FIG. 4A illustrate an example of outputting first signals for causing at least two distinct sets of control options to be presented in at least two distinct selectable regions of a display. For example, in FIG. 3, display 300 displays a plurality of control options (e.g., control option 302*a*, control option 302*b*), and in FIG. 4A, display 300 displays first distinct selectable region 304 and second distinct selectable region 306. Signals (e.g., first signals) may be output to cause the display 300 to be partitioned into first distinct selectable region 304 and second distinct selectable region 306, where each of first distinct selectable region 304 and second distinct selectable region 306 present multiple control options (e.g., first distinct selectable region 304 presents control option 302*b*, second distinct selectable region 306 presents control option 302*a*). The multiple control options in each of first distinct selectable region 304 and second distinct selectable region 306 each form an example of a distinct set of control options. The dashed lines at the borders of first distinct selectable region 304 and second distinct selectable region 306 in FIG. 4A may indicate that these distinct selectable regions are available to the user for selection. These dashed lines may be presented to the user to provide visual emphasis between the distinct selectable regions. Additionally, these dashed lines may not be presented to the user, or another form of visual emphasis may be presented to the user to provide visual distinction between distinct selectable regions. Similarly, the dashed lines (e.g., at the border of distinct selectable regions) presented in FIGS. 5A, 6A, 7A, 8A, and 9A may represent a form of visual distinction of distinct selectable regions available for selection to the user of display 300. Additionally, and similarly, the dashed lines may not be presented to the user, or another form of visual emphasis may be presented to the user to provide visual distinction between distinct selectable regions. Further, for FIGS. 4A-9B, any of the dashed line borders, solid borders, or shading may be in a color (e.g., red, green) to provide visual emphasis or distinction between distinct selectable regions.

Figure 4B:
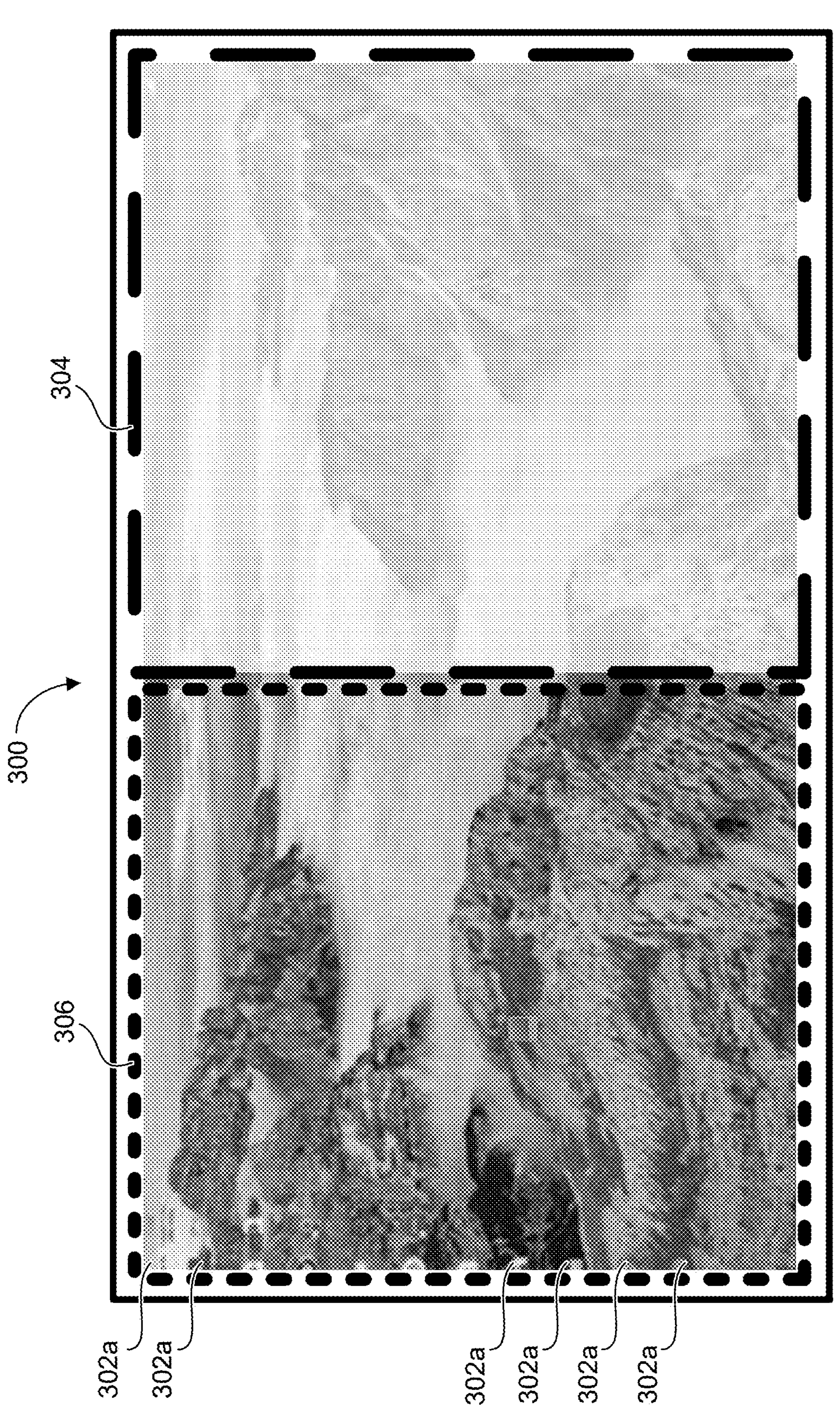

Comparatively, FIGS. 4B, 5B, 6B, 7B, 8B, and 9B may illustrate display 300 upon or after receiving a selection of a distinct selectable region, but before partitioning the selected distinct selectable region. Further, FIGS. 4B, 5B, 6B, 7B, 8B, and 9B may present dashed lines after receiving a selection and before partitioning the selected region, where the unselected region is indicated by a shading of display 300 in the associated unselected region (e.g., shading of first distinct selectable region 304 in FIG. 4B). After receiving the selection and upon, during, or after the processing of output signals for partitioning display 300, the dashed lines associated with a formerly presented (e.g., formerly presented for selection) and unselected distinct selectable region may be modified to be a solid line surrounding the unselected region. Each of FIGS. 5A-9B may present regions with a solid black border, which may indicate a region of display 300 that was previously available for user selection and not selected (e.g., a prior-presented or a prior-selectable distinct selectable region). For example, the region of display 300 corresponding to first distinct selectable region 304 of FIGS. 4A and 4B is illustrated as shaded and with a solid black border in FIG. 5A and is not available for user selection. Shading of a region or a solid black border around a prior-presented or a prior-selectable distinct selectable region may be presented to the user as a visual indicator or distinction. In some embodiments, another visual emphasis or indicator may be used to distinguish prior-presented or prior-selectable regions from currently presented distinct selectable regions.

Figure 10:
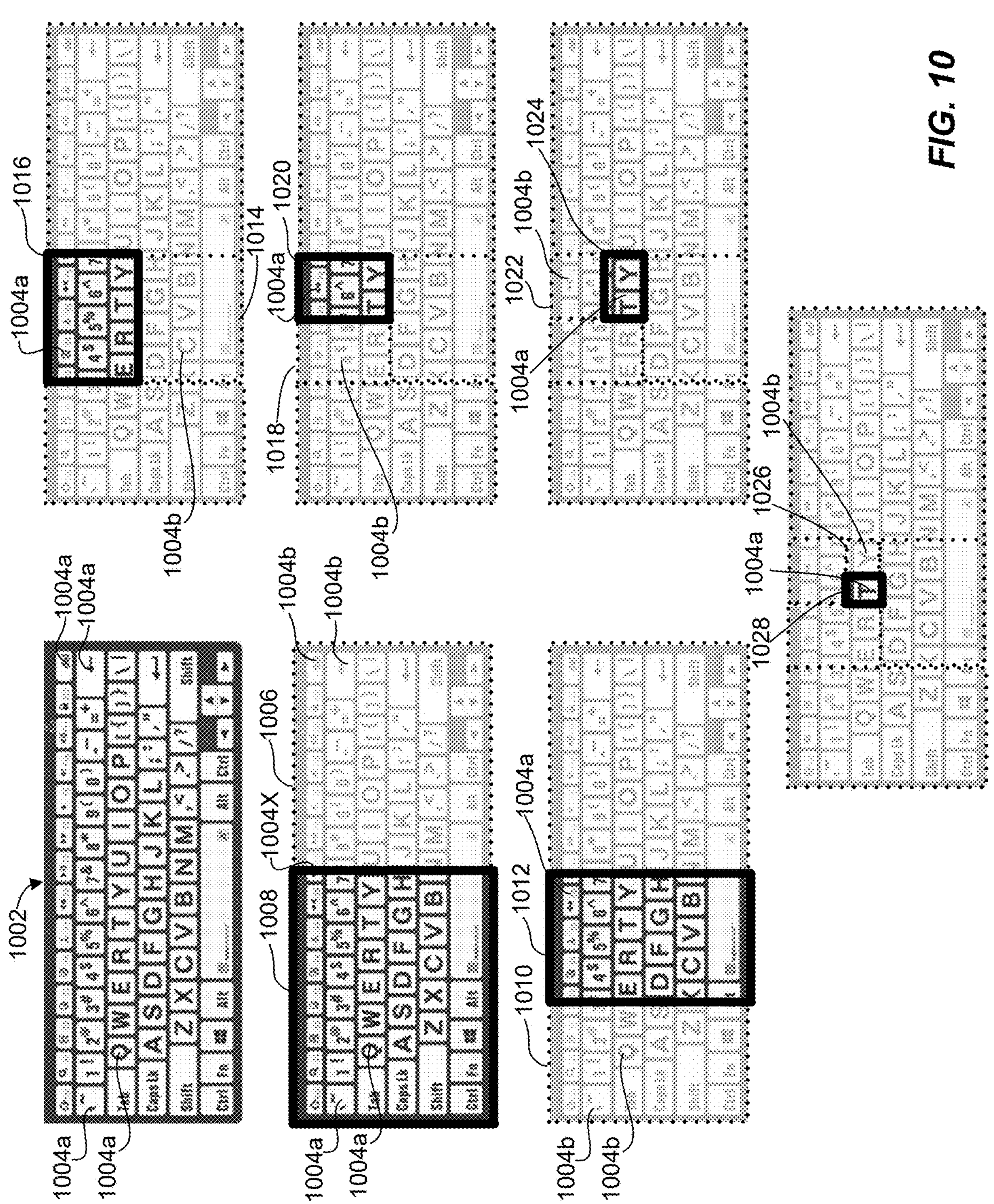
FIG. 10 illustrates successive partitioning of a virtual keyboard, consistent with some disclosed embodiments.

By way of a nonlimiting example, FIG. 10 illustrates an example of outputting first signals for causing at least two distinct sets of control options to be presented in at least two distinct selectable regions of a display. For example, in FIG. 10, keyboard 1002 contains an arrangement of keys, where each key (e.g., key 1004*a*, key 1004*b*, key 1004X) represents a control option of keyboard 1002. Keyboard 1002 may be a virtual keyboard or another type of keyboard that is presented by a display. Signals (e.g., first signals) may be output to cause keyboard 1002 to be partitioned into first distinct selectable region 1006 and second distinct selectable region 1008. Each key 1004*b* presented in first distinct selectable region 1006 may form a first distinct set of control options. Each key 1004*a* presented in second distinct selectable region 1008 may form a second distinct set of control options. In some exemplary embodiments, each key that is presented in both first distinct selectable region 1006 and second distinct selectable region 1008 (e.g., key 1004X) may be assigned to both the first and the second distinct sets of control options. In some exemplary embodiments, each key that is presented in both first distinct selectable region 1006 and second distinct selectable region 1008 may be assigned to only one of the first and the second distinct sets of control options (e.g., key 1004X). A prior-selected region of keyboard 1002 may be represented by a solid blackline border, where a prior-selected region may later present partitioned regions that are available for user selection. A prior-unselected region of keyboard 1002 may be represented by a dotted border around or a shading of the prior-unselected region, which may not be available for future user selection during an iteration of UI segmentation. Further, for FIG. 10, any of the dotted borders, solid borders, or shading may be in a color (e.g., red, green) to provide visual emphasis or distinction between distinct selectable regions.

Figure 11A:
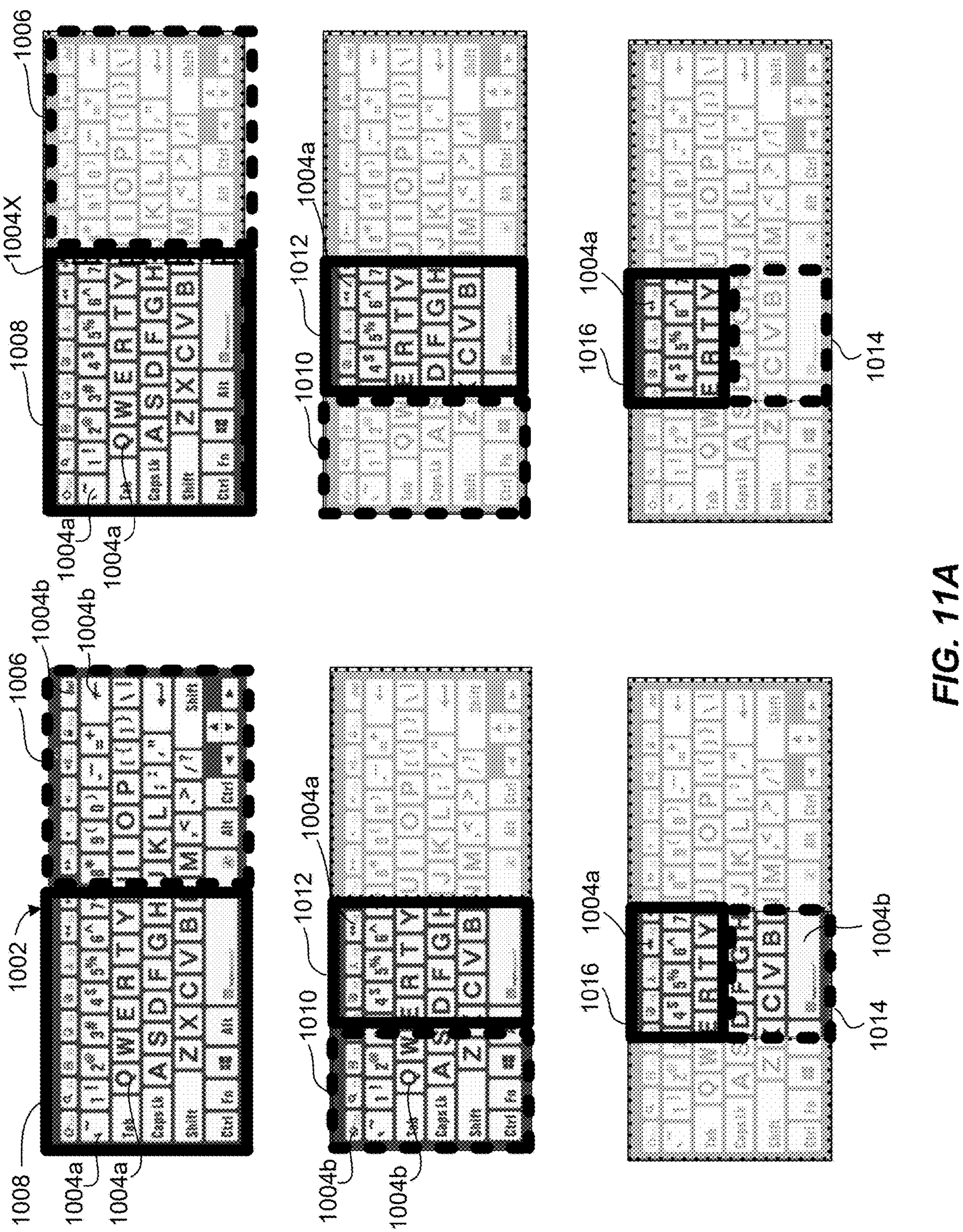
FIGS. 11A and 11B illustrate an alternative approach in which two distinct selectable regions persist at each step, consistent with some disclosed embodiments.

By way of a nonlimiting example, FIG. 11A illustrates an example of outputting first signals for causing at least two distinct sets of control options to be presented in at least two distinct selectable regions of a display. For example, in FIG. 11A, keyboard 1002 contains an arrangement of keys, where each key (e.g., key 1004*a*, key 1004*b*, key 1004*x*) represents a control option of keyboard 1002. Keyboard 1002 may be a virtual keyboard or another type of keyboard that is presented by a display. Signals (e.g., first signals) may be output to cause keyboard 1002 to be partitioned into first distinct selectable region 1006 and second distinct selectable region 1008. Each key 1004*b* presented in first distinct selectable region 1006 may form a first distinct set of control options. Each key 1004*a* presented in second distinct selectable region 1008 may form a second distinct set of control options. In some exemplary embodiments, each key 1004X that is presented in both first distinct selectable region 1006 and second distinct selectable region 1008 may be assigned to both the first and the second distinct sets of control options. In some exemplary embodiments, each key 1004X that is presented in both first distinct selectable region 1006 and second distinct selectable region 1008 may be assigned to only one of the first and the second distinct sets of control options. For FIGS. 11A and 11B, a prior-unselected region of keyboard 1002 may be represented by a dotted border around or a shading of the prior-unselected region, which may not be available for future user selection during an iteration of UI segmentation. For FIGS. 11A and 11B, a distinct selectable region may be represented by a solid blackline border or a dashed border, where shading of the distinct selectable region may indicate that the user does not select this region (e.g., first distinct selectable region 1006 that is unshaded in the first step and shaded in the second step, due to not being selected). The unshaded region that remains unshaded after selection may be partitioned into distinct selectable regions that are available for user selection (e.g., second distinct selectable region 1008 that is partitioned into third distinct selectable region 1010 and fourth distinct selectable region 1012). The newly presented or partitioned distinct selectable regions may be presented with a solid blackline or dashed border (e.g., third distinct selectable region 1010 and fourth distinct selectable region 1012). Further, for FIGS. 11A and 11B any of the dashed line borders, solid borders, dotted borders, or shading may be in a color (e.g., red, green) to provide visual emphasis or distinction between distinct selectable regions.

In some disclosed embodiments, the at least two distinct sets of control options include at least three distinct sets of control options to be presented in at least three distinct selectable regions of the display, which refers to a situation where more than two sets of control options may exist and more than two distinct selectable regions may exist. In this situation, each of the at least three distinct sets of control options may be presented in an associated distinct selectable region of the at least three distinct selectable regions of the display. Moreover, in this situation, the union of each of the at least three distinct sets of control options may have collective, complete, or meaningful coverage of selectable items. Further, the union of each of the at least three distinct selectable regions of the display may have collective, complete, or meaningful coverage of the display or the selectable portion of the display.

In some disclosed embodiments, the at least two distinct sets of control options include a first plurality of control options displayed in a first distinct selectable region of the at least two distinct selectable regions and a second plurality of control options displayed in a second distinct selectable region of the at least two distinct selectable regions. This arrangement refers to the organization of user interface elements such that different groupings of control options, which may include pluralities of control options, may be presented within their own separate, identifiable, and selectable region of a display. Each distinct selectable region may serve as a selectable container for a particular set of options, and the separation may allow for ease of distinguishing and interacting with different groupings of control options. This arrangement may also refer to a situation in which two or more distinct set of control options exist and two or more distinct selectable regions exist, which includes—at a minimum-a first plurality of control options and a second plurality of control options, where the first plurality of control options is presented in a first of the distinct selectable regions and the second plurality of control options is presented in a second of the distinct selectable regions. This arrangement may also refer to presenting control options in two partitioned regions of a user interface, where each region may contain multiple options, and which may enable precise and efficient user selection (e.g., through iterative selection of partitioned regions). Each of the first plurality of control options and second plurality of control options may include at least two control options. The first plurality of control options and the second plurality of control options may or may not have overlap. Overlap refers to a situation in which pluralities or sets of control options share one or more common control options, such that a given control option may belong to multiple pluralities or sets of control options simultaneously. Overlap may include partial or complete overlap of control options in different pluralities or sets of control options. In some exemplary embodiments, the union of the first plurality of control options and the second plurality of control options may have collective, complete, meaningful coverage of selectable items, where a union of pluralities of control options is a set that contains all control options contained in at least one of the pluralities of control options. In some exemplary embodiments, the union of the first plurality of control options and the second plurality of control options may have partial coverage of selectable items. In some exemplary embodiments, the union of first of the distinct selectable regions and the second of the distinct selectable regions may have collective, complete, or meaningful coverage of the display. In some exemplary embodiments, the union of the first of the distinct selectable regions and the second of the distinct selectable regions may have partial coverage of the display. Displaying a first plurality of control options in a first of the distinct selectable regions and a second plurality of control options in a second of the distinct selectable regions may enable or allow for effective control option segmentation and/or efficient iterative or segmented selection (e.g., iterative partitioning and associating subsets of control options with partitions).

By way of a nonlimiting example, FIG. 4A illustrates an example in which the at least two distinct sets of control options include a first plurality of control options displayed in a first distinct selectable region of the at least two distinct selectable regions and a second plurality of control options displayed in a second distinct selectable region of the at least two distinct selectable regions. For example, in FIG. 4A, display 300 displays first distinct selectable region 304 and second distinct selectable region 306. Each of first distinct selectable region 304 and second distinct selectable region 306 displays a plurality of control options, where each control option 302*b* contained within first distinct selectable region 304 is included in the first plurality of control options and each control option 302*a* contained within second distinct selectable region 306 is included in the second plurality of control options.

By way of a nonlimiting example, FIG. 10 illustrates an example in which the at least two distinct sets of control options include a first plurality of control options displayed in a first distinct selectable region of the at least two distinct selectable regions and a second plurality of control options displayed in a second distinct selectable region of the at least two distinct selectable regions. For example, in FIG. 10, keyboard 1002 contains an arrangement of keys, where each key (e.g., key 1004*a*, key 1004*b*, key 1004X) represents a control option of keyboard 1002. Keyboard 1002 may be a virtual keyboard or another type of keyboard that is presented by a display. Each key 1004*b* presented in first distinct selectable region 1006 may form the first plurality of control options. Each key 1004*a* presented in second distinct selectable region 1008 may form the second plurality of control options. In some exemplary embodiments, each key 1004X that is presented in both first distinct selectable region 1006 and second distinct selectable region 1008 may be assigned to both the first plurality of control options and the second plurality of control options. In some exemplary embodiments, each key 1004X that is presented in both first distinct selectable region 1006 and second distinct selectable region 1008 may be assigned to only one of the first plurality of control options and the second plurality of control options.

By way of a nonlimiting example, FIG. 11A illustrates an example in which the at least two distinct sets of control options include a first plurality of control options displayed in a first distinct selectable region of the at least two distinct selectable regions and a second plurality of control options displayed in a second distinct selectable region of the at least two distinct selectable regions. For example, in FIG. 11A, keyboard 1002 contains an arrangement of keys, where each key (e.g., key 1004*a*, key 1004*b*, key 1004X) represents a control option of keyboard 1002. Keyboard 1002 may be a virtual keyboard or another type of keyboard that is presented by a display. Each key 1004*b* presented in first distinct selectable region 1006 may form the first plurality of control options. Each key 1004*a* presented in second distinct selectable region 1008 may form the second plurality of control options. In some exemplary embodiments, each key 1004X that is presented in both first distinct selectable region 1006 and second distinct selectable region 1008 may be assigned to both the first plurality of control options and the second plurality of control options. In some exemplary embodiments, each key 1004X that is presented in both first distinct selectable region 1006 and second distinct selectable region 1008 may be assigned to only one of the first plurality of control options and the second plurality of control options.

In some disclosed embodiments, the first plurality of control options and the second plurality of control options collectively include all characters of an alphabet. An alphabet refers to any finite, predefined, or standardized set of symbols or characters used to represent elements of a language, system, or domain, where the set may include letters, numbers, punctuation, or other symbolic representation, and each symbol may be distinct or uniquely identifiable and individually selectable. The complete coverage of every character in the alphabet may ensure that no character is omitted and may allow or enable the user to select any character in the alphabet through interaction with the first plurality of control options and/or the second plurality of control options through their respective distinct selectable regions. The division of an alphabet into multiple sets may organize or segment the alphabet to increase ease or precision of user selection of a character of the alphabet, and the union of multiple pluralities collectively including all characters of the alphabet may guarantee full access to all characters of the alphabet. For example, first plurality of control options may contain at least one selectable character of an alphabet or a set of selectable characters of the alphabet that does not include all the characters of the alphabet. The second plurality of control options may contain at least one selectable character of the alphabet, and the selectable characters of the alphabet not included in the first plurality of control options. As a result, the combination of the first plurality of control options and the second plurality of control options includes every character of the alphabet.

For example, the first plurality of control options may include letters 'A' through 'M,' and the second plurality of control options may include letters 'N' through 'Z,' of the English language alphabet. As another example, the first plurality of control options may include {'Alpha', 'Beta', 'Gamma', 'Delta', 'Epsilon', 'Zeta', 'Eta', 'Theta'} of the Greek alphabet and the second plurality of control options may include {'Iota', 'Kappa', 'Lambda', 'Mu', 'Nu', 'Xi', 'Omicron', 'Pi', 'Rho', 'Sigma', 'Tau', 'Upsilon', 'Phi', 'Chi', 'Psi', 'Omega'}, or the first plurality of control options may include 'A' through 'M' of the Braille alphabet and the second plurality of control options may include 'N' through 'Z' of the Braille alphabet.

By way of a nonlimiting example, FIG. 10 illustrates an example of the first plurality of control options and the second plurality of control options collectively include all characters of an alphabet. For example, in FIG. 10, keyboard 1002 contains all letters of the English alphabet. First distinct selectable region 1006 may be associated with a first plurality of control options including each key 1004*b* displayed within first distinct selectable region 1006. Second distinct selectable region 1008 may be associated with the second plurality of control options including each key 1004*a* displayed within second distinct selectable region 1008. First distinct selectable region 1006 and second distinct selectable region 1008 encompass the entirety of the letters of the English alphabet, where each of these letters is associated with a key of keyboard 1002 (e.g., key 1004*a*, key 1004*b*, key 1004X). The first plurality of control options associated with first distinct selectable region 1006 and the second plurality of control options associated with second distinct selectable region 1008 may encompass every character of the English alphabet.

By way of a nonlimiting example, FIG. 11A illustrates an example of the first plurality of control options and the second plurality of control options collectively include all characters of an alphabet. For example, in FIG. 11A, keyboard 1002 contains all letters of the English alphabet. First distinct selectable region 1006 may be associated with a first plurality of control options including each key 1004*b* displayed within first distinct selectable region 1006. Second distinct selectable region 1008 may be associated with the second plurality of control options including each key 1004*a* displayed within second distinct selectable region 1008. First distinct selectable region 1006 and second distinct selectable region 1008 encompass the entirety of the letters of the English alphabet, where each of these letters is associated with a key of keyboard 1002 (e.g., key 1004*a*, key 1004*b*, key 1004X). The first plurality of control options associated with first distinct selectable region 1006 and the second plurality of control options associated with second distinct selectable region 1008 may encompass every character of the English alphabet.

In some disclosed embodiments, the first plurality of control options and the second plurality of control options collectively include at least a number of control options as a language associated with the user interface. This refers to the union of the first plurality of control options and the second plurality of control options having one or more control options in a language associated with the user interface.

A language associated with the user interface refers to any structured system of symbols, characters, commands, or representations that the user interface employs to enable communication, interaction, or control between a user and the system. Exemplary languages associated with the user interface may include natural language (i.e., alphabets, characters, or words, used in written or spoke communication) (e.g., English, Spanish, Mandarin), symbolic or formal language (i.e., abstract symbol systems designed for technical or computational purposes) (e.g., mathematical notation, programming languages, markup languages), or domain-specific or application-defined language (i.e., custom sets of icons, emojis, signs, gestures, or other symbolic representations relevant to the interface's intended purpose) (e.g., emoji sets in messaging apps, CAD drawing icons, musical notation in a score editor). The language associated with the user interface may provide rules of units of representation that the interface supports. The language associated with the user interface may be contextual, such that the same interface may use different languages depending on user settings, regional preferences, or application domain. The language associated with the user interface may include verbal, visual, numeric, symbolic, or gestural systems.

Control options as a language associated with the user interface refers to selectable elements, commands, or symbols that are expressed, represented, or organized according to a particular language relevant to the operation or presentation of the user interface. Control options as a language associated with the user interface may allow the user to express, enter, or manipulate content within the rules of the language system of a language associated with the user interface. Control options as a language associated with the user interface may include characters, symbols, icons, words, phrases, strings of characters, numerals, commands, or other units of representation that are meaningful within the language system. Control options as a language associated with the user interface may be arranged in sets, subsets, or sequences that correspond to the conventions of the associated language and may support the formation of higher-order expressions, which may include sentences, equations, or code structures. Each of the first plurality of control options and the second plurality of control options includes one or more control options in a language associated with the user interface. Moreover, the combination or union of the control options included in the first and second plurality of control options collectively includes some or all of the control options in the language associated with the user interface.

For example, in the case of a natural language such as English, the control options may include the alphabetic characters {'A', 'B', 'C', . . . , 'Z'} along with punctuation marks and numerals. In a programming language such as Python, the control options may include reserved keywords (e.g., 'if', 'else', 'while'), operators, and syntactic symbols. In a numeric system, the control options may include the digits {'0'-'9'} and mathematical operators. In a symbolic language such as emoji, the control options may include selectable graphical symbols. In a musical notation system, the control options may include symbols such as musical notes, clefs, or any other type of musical notation. Collectively, these control options may define the building blocks that the user may select or may combine when interacting with the user interface in the context of a particular language.

Figure 11B:
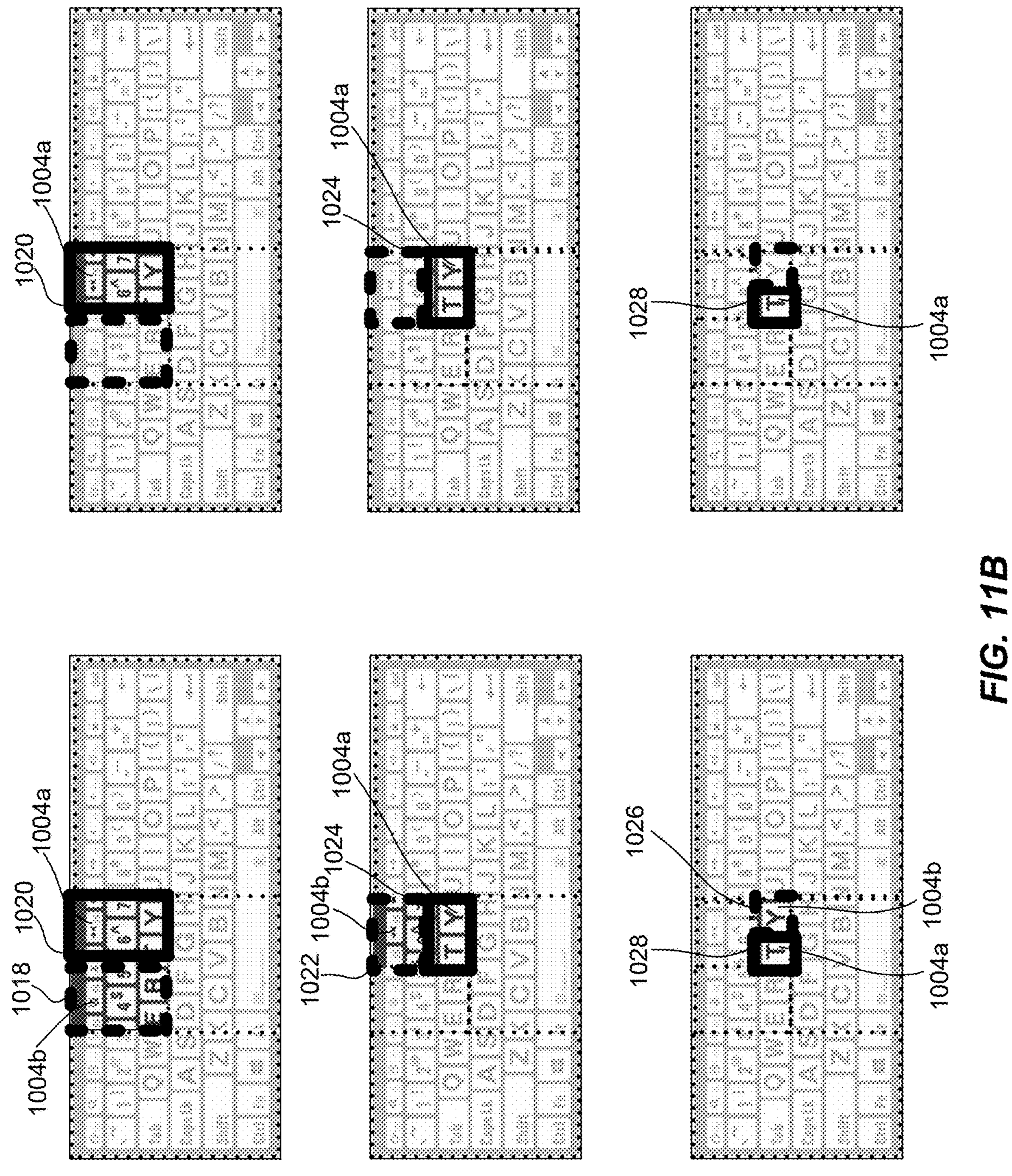

By way of nonlimiting examples, FIGS. 10-11B illustrate examples where the first plurality of control options and the second plurality of control options collectively include at least a number of control options as a language associated with the user interface. For example, in FIG. 10 and FIG. 11A, keyboard 1002 contains an arrangement of keys, where each key (e.g., key 1004*a*, key 1004*b*, key 1004X) represents a control option of keyboard 1002. Keyboard 1002 may be a virtual keyboard or another type of keyboard that is presented by a display. The display may be a user interface that is associated with the English language. Each key 1004*b* presented in first distinct selectable region 1006 may form the first plurality of control options. Each key 1004*a* presented in second distinct selectable region 1008 may form the second plurality of control options. In this example, the first plurality of control options and the second plurality of control options collectively include at least the entire alphabet of the English language.

In some disclosed embodiments, the control options include at least one of an icon associated with running a software application, a screen area capturable as a screen shot, a screen area selected for zooming in, or a keyboard key. An icon associated with running a software application refers to a graphical symbol displayed in a user interface that visually represents a software application currently executing or available for execution, which may serve as a selectable control option for interacting with the application. Exemplary icons associated with running a software application may include a thumbnail preview of a web browser in a taskbar, the application dock icon for Microsoft Word on macOS (i.e., showing Microsoft Word is active), or an active tab icon in a browser representing a running website or application. A screen area capturable as a screen shot refers to a defined region of the display that, when selected, may initiate an operation to capture the visual content currently displayed within that region, across the entire distinct selectable region, across a portion of the display, or across the entire screen. A screen area capturable as a screen shot may refer to a portion of a display that may be recorded, duplicated, or saved as a static digital image representing the visual content presented within that area at a given time. A screen area capturable as a screen shot may correspond to all or part of a display, may be bounded or defined by the system or the user, and may include visible content, interface elements, or underlying graphical layers rendered to the display. Exemplary screen areas capturable as a screen shot may include a full-screen capture (i.e., the entire display area is captured, including application windows, icons, and menus), a window capture (i.e., a specific window and only the content of that window is captured as a screen shot, excluding other windows), a region capture (i.e., a defined portion of the screen and only that region is captured), or a UI-defined capture (i.e., an application or a tool provides a selectable area or button that, when activated captures a predefined region of the display). Exemplary screen areas capturable as a screen shot may additionally include a button labeled 'Capture Screen' in a collaboration tool, a highlighted region the user draws to define the screenshot boundaries, or a toolbar icon (e.g., a camera symbol) that triggers a screenshot capture. A screen area selected for zooming in refers to a portion or region of the display that functions as a distinct selectable region containing a control option associated with a control function for magnifying the content within the user interface, thereby enlarging the visual representation of the displayed elements. A screen area selected for zooming in may refer to a distinct portion of the display that a user identifies or highlights in order to enlarge its contents, which may increase visibility, detail, or focus of the displayed information within that portion. The selection of the screen area selected for zooming in may be performed directly or indirectly. Zooming in may result in a magnified presentation of graphical, textual, or interactive elements contained in the selected screen area. Exemplary screen areas selected for zooming in may include a user-defined region for zooming in, a predefined region for zooming in, touch gestures for zooming in (e.g., double-tap, pinch-to-zoom), assistive zoom tools, application-specific screen areas selected for zooming in, a magnifying glass icon in a PDF viewer toolbar, a pinch-to-zoom region on a touchscreen map application, or a zoom control overlay on an image editor window. A keyboard key refers an actuatable region or portion of a physical or virtual keyboard input device that, when pressed, tapped, or otherwise actuated by a user, generates a corresponding signal. This signal may be associated with the entry of a character, the execution of a command, navigation within the interface, or the invocation of a system or application-specific function. A keyboard key may refer to a physical or virtual key within a keyboard input system that, when activated, transmits a corresponding character, command, or control signal into the user interface. Keyboard keys may be mechanical, capacitive, or software-rendered (such as on a touchscreen). Keyboard keys may form a means of interaction between the user and a computer system. Exemplary keyboard keys may include a key for character entry, a key for command invocation (e.g., 'Enter' key, 'Return' key), a key for navigation (e.g., an arrow key), a key for system-level functions (e.g., the 'F5' key), a virtual key, a special modifier key (e.g., the 'Shift' key used to capitalize a character input), the 'Enter' key for submitting a form, the 'A' key for entering the letter 'A' into a text field, or a virtual keyboard key on a smartphone touch screen.

Some disclosed embodiments involve receiving a selection of the second distinct selectable region. Receiving a selection of a distinct selectable region refers to detecting, registering, or otherwise being provided with an input from a user or automated process indicating a choice or activation of a particular screen or user interface region. The selection may be direct (e.g., clicking or tapping on the option) or indirect (e.g., voice command, gesture, or external device input). The selection may be communicated through various modalities, such as touch input, mouse click, keyboard entry, voice command, gesture, or programmatic instruction. Examples of receiving a selection may include detecting a mouse click on a button in a graphical interface, registering a finger tap on a touchscreen element, interpreting a voice command (e.g., "select option two") as a selection event, or receiving a keyboard shortcut (e.g., 'Ctrl'+'C') that selects a copy function.

Further, a selection may be received by or based on a user's gaze, which may refer to a process in which a user's visual attention or eye movement is detected, tracked, or interpreted to determine a selection of a distinct selectable region displayed at a user interface. This may include detecting a user's gaze direction, a time of fixation, or other eye motion, which may involve using one or more sensors (e.g., an eye tracker, camera, infrared emitted/detector), mapping a user's gaze to a region of the user interface, or determining that a particular distinct selectable region corresponds to the user's intended selection. Determining that a distinct selectable region corresponds to a user's intended selection may be based on gaze-related metrics, such as dwell time, gaze stability, or probabilistic inference. For instance, a dwell time threshold may be defined for the system, and upon determining that a user's gaze is directed to a particular distinct selectable region and that the user's gaze has been directed at the particular distinct selectable region for at least the dwell time threshold (e.g., equal to the dwell time threshold, just after surpassing the dwell time threshold), selecting the particular distinct selectable region.

Receiving a selection of a distinct selectable region refers to detecting, registering, or interpreting a user's choice or activation of a region of a user interface, where the region of the user interface may present one or more control options (e.g., one control option, a plurality of control options). Distinct selectable regions may be presented simultaneously (e.g., all distinct selectable regions may be available for selection or presenting their associated control options at the same time) or sequentially (e.g., only a subset of the distinct selectable regions may be available for selection or presenting their associated control options at a given time). Examples of receiving a selection of a distinct selectable region may include: menu selection (e.g., a user selects a drop-down menu containing one or more commands), keyboard input (e.g., the user selects a region of the keyboard containing one or more keys), touchscreen interface (e.g., the user selects a region of the touchscreen containing one or more applications), graphical toolbar (e.g., the user selects a region with a draw a shape control, which may include or present a plurality of shape controls, such as line, circle, or rectangle), or voice interaction (i.e., a spoken command received may select a region containing a group of one or more control options). The received selection of a distinct selectable region may be a received selection of the second distinct selectable region.

By way of a nonlimiting example, FIG. 4B illustrates receiving a selection of the second distinct selectable region. For example, in FIG. 4B, second distinct selectable region 306 presented by display 300 is selected. This results in a change of visual emphasis between first distinct selectable region 304, which was not selected, and second distinct selectable region 306, which was selected (e.g., shading, differing borders). Additionally, since second distinct selectable region 306 was selected, only the plurality of control options displayed in second distinct selectable region 306 are still presented in second distinct selectable region 306 selectable by the user.

By way of nonlimiting examples, FIG. 10 and FIG. 11A illustrate receiving a selection of the second distinct selectable region. For example, in FIG. 10 and FIG. 11A, second distinct selectable region 1008 of keyboard 1002 is selected. For an exemplary virtual keyboard, this may result in a change of visual emphasis between first distinct selectable region 1006, which was not selected, and second distinct selectable region 1008, which was selected (e.g., shading, differing borders). Additionally, for keyboard 1002, since second distinct selectable region 1008 was selected, only the plurality of control options (e.g., represented by each of key 1004*a* presented in second distinct selectable region 1008) in second distinct selectable region 1008 are available for selection by the user.

In some disclosed embodiments, receiving a selection of the second distinct selectable region causes the first distinct selectable region to disappear from the display. Disappearing refers to removal, hiding, collapse, or otherwise rendering non-visible the first distinct selectable region from the display, so that it is no longer actively displayed or presented to the user (e.g., the first distinct selectable region no longer displays its prior contents or control options). For example, if the display presents two distinct selectable regions (e.g., the first distinct selectable region and the second distinct selectable region), when a user selects the second distinct selectable region, the first distinct selectable region disappears from the display, after which only the second distinct selectable region is presented by the display (e.g., the partitioned distinct selectable regions resulting from the partitioning of the second distinct selectable region). As an additional example, if the display presents multiple distinct selectable regions, when a user selects one of the multiple distinct selectable regions, all distinct selectable regions except for the one selected distinct selectable region disappear from the display. As a further example, a user's selection of a particular distinct selectable region may trigger the automatic hiding or removal of all unselected distinct selectable regions, causing only the selected region to be presented for further interaction or observation. In some embodiments, when presenting multiple distinct selectable regions, selection of a subset of the multiple distinct selectable regions may cause the non-selected distinct selectable regions to be hidden or removed from the display, resulting in the presentation of only the selected subset of the multiple distinct selectable regions.

In some disclosed embodiments, receiving a selection of the second distinct selectable region causes the second distinct selectable region to be displayed with a visual emphasis over the first distinct selectable region on the display. Visual emphasis may involve highlighting, enlarging, bolding, brightening, outlining, changing color, adding animation, or otherwise making the second distinct selectable region more visually prominent or distinguishable. In some disclosed embodiments, the visual emphasis includes changing a relative intensity between the first distinct selectable region and the second distinct selectable region. In some disclosed embodiments, the visual emphasis includes an enlarged graphical property. In some disclosed embodiments, the visual emphasis includes an increase in brightness. In response to receiving a selection of the second distinct selectable region of the display, which may include receiving a selection of the second distinct selectable region (e.g., based on its contents, such as the second plurality of control options), the system enhances the visual presentation of the second distinct selectable region relative to the first distinct selectable region. For example, the second distinct selectable region may be highlighted or displayed in greater intensity as compared to the first distinct selectable region. When the second distinct selectable region is displayed with a visual emphasis over the first distinct selectable region of the display, the first distinct selectable region may remain visible but is de-emphasized in comparison to the second distinct selectable region.

For example: (1) selecting the 'QWERTY' keys region (second region) may cause that region to highlight in color or enlarge slightly, while the 'numeric keys' region (first region) remains dimmed, (2) selecting the 'Messages' panel (second region) causes it to appear in the foreground with a shadow or glow, while the 'Contacts' panel (first region) remains visible but less prominent, (3) clicking on a 'Sales Data' chart region (second region) may cause that chart to zoom or become outlined, while a 'Marketing Data' chart region (first region) becomes semi-transparent, (4) selecting the 'Inventory' HUD region (second region) highlights it with a glowing border while the 'Mini-map' HUD region (first region) is muted or slightly transparent, or (5) selecting the 'Zoom controls' region (second region) causes it to appear slightly larger or more opaque while the 'map' region (first region) becomes slightly dimmed.

By way of a nonlimiting example, FIG. 4B illustrates receiving a selection of the second distinct selectable region causes the second distinct selectable region to be displayed with a visual emphasis over the first distinct selectable region. For example, in FIG. 4B, second distinct selectable region 306 of display 300 is selected, which causes first distinct selectable region 304 of display 300 to be displayed with less visual emphasis, such that second distinct selectable region 306 is displayed with a visual emphasis over first distinct selectable region 304.

By way of nonlimiting examples, FIG. 10 and FIG. 11A illustrate receiving a selection of the second distinct selectable region causes the second distinct selectable region to be displayed with a visual emphasis over the first distinct selectable region. For example, in FIG. 10 and FIG. 11A, keyboard 1002 may be a virtual keyboard, where second distinct selectable region 1008 of keyboard 1002 is selected, causing first distinct selectable region 1006 of keyboard 1002 to be displayed with less visual emphasis. This causes second distinct selectable region 1008 to be displayed with visual emphasis over first distinct selectable region 1006.

By way of a nonlimiting example, FIG. 4B illustrates the visual emphasis includes changing a relative intensity between the first distinct selectable region and the second distinct selectable region. For example, in FIG. 4B, second distinct selectable region 306 of display 300 is selected, which causes first distinct selectable region 304 of display 300 to be displayed with less intensity relative to second distinct selectable region 306, by way of changing the relative intensity of first distinct selectable region 304 and second distinct selectable region 306.

By way of nonlimiting examples, FIG. 10 and FIG. 11A illustrate the visual emphasis includes changing a relative intensity between the first distinct selectable region and the second distinct selectable region. For example, in FIG. 10 and FIG. 11A, keyboard 1002 may be a virtual keyboard, where second distinct selectable region 1008 of keyboard 1002 is selected, causing first distinct selectable region 1006 of keyboard 1002 to be displayed with less intensity relative to second distinct selectable region 1008. This may be done by changing the relative intensity of first distinct selectable region 1006 and second distinct selectable region 1008.

In some disclosed embodiments, the selection of the distinct selectable regions is received by associating a first actuatable portion of a UI control device with one of the presented distinct selectable regions and a second actuatable portion of a UI control device with another one of the presented distinct selectable regions and having a user physically actuating one of the portions. An actuatable portion of a UI control device refers to any component, interface, or part of a hardware or software input device that can be manipulated, pressed, toggled, or otherwise engaged by a user to send a command, input, or selection to a system. An actuatable portion of a UI control device may include a discrete mechanism that a user can operate to interact with the user interface or display. Examples of an actuatable portion of a UI control device may include a button on a physical keyboard or computer mouse, a joystick lever on a gaming controller, a touch-sensitive area on a touchscreen or touchpad, a pedal or switch on specialized input devices (e.g., accessibility devices), or a virtual button rendered on a display that responds to a finger or stylus tap or press. A user physically actuating one of the portions of a UI control device refers to the user performing a deliberate action to engage, press, manipulate, or otherwise operate the actuatable portion of a UI control device, which may thereby cause the system to register an input or selection. Examples of a user physically actuating one of the portions of a UI control device may include pressing a key on a keyboard, clicking a mouse button, pushing a joystick forward or to a side, tapping a virtual button on a touchscreen, or pressing a pedal or a switch on an accessibility device.

The selection of the distinct selectable regions received by associating a first actuatable portion of a UI control device with one of the presented distinct selectable regions and a second actuatable portion of a UI control device with another one of the presented distinct selectable regions refers detection of a user's selection of one or more distinct selectable regions presented by the display or a user interface by mapping those regions to an actuatable portion of a UI control device. A user may physically actuate one of the actuatable portions, and the system may register the selection corresponding to the distinct selectable region associated with that actuatable portion. Associating an actuatable portion of a UI control device with a presented selectable region may be enabled by:

(1) mapping input signals to regions of the display, where the coordinates of a touchscreen or touchpad may be mapped to distinct selectable regions such that when an area of the touchscreen or touchpad are actuated a distinct selectable region mapped to the coordinates of the actuation signal may be selected, (2) event binding, where a physical or virtual button may be bound to a presented selectable region, such that when the button is actuated, the selection of the presented selectable region is triggered, (3) layered control assignments, where one or more keys of a keyboard may be assigned to a distinct selectable region, such that then a key is pressed, the distinct selectable region is selected, (4) contextual dynamic association, where the actuatable portion of the UI control device may change in its association with distinct selectable regions based on the distinct selectable regions and control options presented in the display, such that when a user physically actuates a portion of the UI control device, the system determines the selected distinct selectable region at system runtime, (5) proximity or spatial linking, where a stylus or pointing device may interact with a distinct selectable region, when the stylus or pointing device are brought within a threshold distance of the distinct selectable region presented by the display, such that a user may select a distinct selectable region by pointing to a distinct selectable region, or (6) identifier-based association, where each actuatable portion and each selectable region has a unique identifier, such that when the actuatable portion of a UI control device is actuated, the system may use identifiers to determine which distinct selectable region to activate.

Examples that may involve the selection of the distinct selectable regions by associating a first actuatable portion of a UI control device with one of the presented distinct selectable regions and a second actuatable portion of a UI control device with another one of the presented distinct selectable regions include: (1) a two-button controller: on a split-screen interface with a left and right panel, the left button selects the left region and the right button selects the right region; the user presses the right button to select the right panel, (2) pedal-based accessibility device: two foot pedals correspond to two halves of a virtual keyboard; pressing the left pedal selects the left side partition and pressing the right pedal selects the right side partition, (3) game controller with triggers: the left trigger corresponds to a first menu option, and the right trigger corresponds to a second menu region; pressing one trigger selects the corresponding region, or (4) touch-enabled device with multi-touch zones: one touch-sensitive region corresponds to the top half of a screen and another to the bottom half; touching the top zone selects the top region.

By way of nonlimiting examples, FIGS. 10-11B illustrate the selection of the distinct selectable regions is received by associating a first actuatable portion of a UI control device with one of the presented distinct selectable regions and a second actuatable portion of a UI control device with another one of the presented distinct selectable regions and having a user physically actuating one of the portions. For example, in FIGS. 10-11B, keyboard 1002 may be a physical keyboard with actuatable keys or keyboard 1002 may be a virtual keyboard displayed by an actuatable touchscreen. Keyboard 1002 may be the UI control device. As an example, the selection of first distinct selectable region 1006 may be received by a user actuating a key on the right side of keyboard 1002 or key 1004*b* presented in first distinct selectable region 1006. In this example, the right side of keyboard 1002 or the keys presented in first distinct selectable region 1006 may be the first actuatable portion of the UI control device. Further, the selection of second distinct selectable region 1008 may be received by a user actuating a key on the left side of keyboard 1002 or a key 1004*a* presented in second distinct selectable region 1008. In this example, the left side of keyboard 1002 or the keys presented in second distinct selectable region 1008 may be the second actuatable portion of the UI control device.

In some disclosed embodiments, the selection of the distinct selectable regions is received indirectly. Receiving the selection of the distinct selectable regions indirectly refers to registering or acknowledging a user's or process's selection of a particular region or regions of a user interface without the user directly interacting with that region via conventional physical input methods (e.g., touch, click, or press). Instead, the selection is inferred, mediated, or determined through an intermediate mechanism, device, or signal that represents the user's choice. Receiving the selection of the distinct selectable regions indirectly may include capturing selections where the input is proxied, interpreted, or derived, rather than directly applied to the selection region itself. Examples of receiving the selection of the distinct selectable regions indirectly may include: (1) eye tracking, where a user looks at a specific region of a screen, and the system detects and registers that gaze as a selection of the region, (2) brain-computer interface (BCI), where neural signals corresponding to a thought or intention are interpreted by a system to select a region of a virtual keyboard or menu, (3) voice command, where the user may say "select top-right menu," and the system translates the command into a selection of the corresponding region, (4) gesture recognition, where a user may wave their hand in front of a camera or perform a motion that the system maps to a specific region of the interface, or (5) external device proxy, where a foot pedal or a separate controller is mapped so that pressing it corresponds to selecting a region elsewhere on the display, without the user touching that region directly.

In some disclosed embodiments, receiving indirectly includes receiving a remote indication from a user. Receiving the selection of the distinct selectable regions indirectly via a remote indication from a user refers to obtaining and/or registering a user's selection, input, or command without direct physical interaction with the selectable region, based on a signal, message, or input sent from a separate or remote device operated by the user. The remote indication may serve as a proxy to indicate the user's choice, enabling interaction from a distance or through an intermediary system. Examples of the selection of the distinct selectable regions indirectly via a remote indication from a user may include receiving a remote indication from a remote control, a smart phone as a remote input, a networked game controller, a voice command via a smart speaker, or an assistive accessibility device.

In some disclosed embodiments, receiving indirectly includes determining that the indication is associated with one of the at least two distinct sets of control options. An indication refers to any signal, action, or expression that conveys information, intent, or state to a system, device, or user interface. An indication may originate from a user (e.g., a gesture, click, or spoken command), from the system itself (e.g., a visual highlight, an audio cue, or haptic feedback), or from an external source (e.g., a network message or sensor reading). An indication may include a selection. An indication may be user-driven, system-driven, indirect, or implicit. Receiving the selection of the distinct selectable regions indirectly includes determining that the indication is associated with one of the at least two distinct sets of control options refers to inferring or identifying which group of control options a user intends to select or indicate, based on indirect input or signals, rather than direct physical interaction with the control operations themselves. Examples of receiving the selection of the distinct selectable regions indirectly that include determining that the indication is associated with one of the at least two distinct sets of control options may include: (1) eye-tracking on a virtual keyboard, where the system may detect the user's gaze in the left half of the keyboard and determines that the selection or indication is associated a region containing the 'first set of keys' (e.g., letters 'A' through 'M'), (2) voice command, where a user may say 'select the number keys,' and the system interprets that instructions to associate the selection or indication with the numeric keypad region, (3) remote control navigation, where the user may press a left arrow on a remote, and the system may infer the selection or indication as corresponding to the left panel region of a split-screen menu, (4) gesture recognition, where a hand swipe to the right in front of a sensor may be interpreted as a selection or indication of a region containing the 'second set of icons' on the interface, or (5) brain-computer interface (BCI), where neural signals are processed, and the system may determine that the intended selection or indication corresponds to a region containing one of the available sets of control options on a virtual interface.

In some disclosed embodiments, receiving indirectly includes initiating the output of signals for partitioning of the selected distinct selectable region, which refers to transmitting signals based on the indirect receipt of a selection, such that the distinct selectable region that was determined to be selected based on the indirectly received selection is divided into two or more partitioned distinct selectable regions. The partitioning of a distinct selectable region based on the indirect receipt of a selection of a distinct selectable region may involve the division of a plurality of control options associated with the selected distinct selectable region. This may include the partitioned distinct selectable regions each being associated with a subset of the plurality of control options. This may enable a user to select or activate a distinct selectable region and reduce the number of presented control options, based on an indirect input, signal, or inference, rather than requiring the user to directly manipulate the display or user interface. A system, for example, may translate the indirect indication into a selection event for a distinct selectable region, which may result in the division of the corresponding set of control options and subsequent presentation of the divided control options in newly presented, partitioned distinct selectable regions. Examples of receiving the selection of distinct selectable regions indirectly that include initiating the output of signals for partitioning the selected distinct selectable region may include: (1) eye-tracking, where a user's gaze may linger on the left half of a virtual keyboard, and the system may interpret this and automatically highlight or select the region containing 'first set of keys' (e.g., the letters on the left side of the keyboard, {'Q', 'W', 'E', 'R', 'T', 'Y'}, letters 'A' through 'M') and subsequently divide this region, such that a portion of the 'first set of keys' is represented in the divided regions, (2) voice command, where the user may say "open the numeric keypad," and the system may recognize the command and initiate selection of the numeric keypad region and subsequently partition the numeric keypad region, (3) remote control, where pressing a 'left panel select' button on a remote causes the system to select the region corresponding to the set of icons displayed in the left portion of a menu, then the system may output signals that cause this region to be split into two or more regions, (4) brain-computer interface (BCI), where neural activity indicating the user's intent may be interpreted, and the system may initiate the selection of the region including the target set of virtual keys without physical interaction, then the system may partition this region and reduce the amount of keys presented in the newly presented partitions, or (5) gesture recognition, where a right-hand swipe may be interpreted as choosing the right-hand menu panel, and the system may highlight or select that panel automatically, then split the right-hand menu panel into a top-right-hand menu panel and a bottom-right-hand menu panel.

Some disclosed embodiments involve, in response to receipt of the selection of the second distinct selectable region, outputting second signals for modifying the display to partition the second distinct selectable region into at least two additional distinct selectable regions. In response to a user's selection of the second distinct selectable region, which may present the second plurality of control options, signals or instructions may be generated to cause the partitioning of the second distinct selectable region into two or more distinct selectable regions. Further, the second distinct selectable region may present the second plurality of control options, and due to the partitioning of the second distinct selectable region, the second plurality of control options may be distributed across the two or more distinct selectable regions resulting from the partitioning of the second distinct selectable region. The two additional distinct regions may occupy display areas not previously occupied, or they may overlap with or be presented in regions previously used for display. The at least two additional distinct selectable regions may be created by further dividing the second distinct selectable region associated with the second plurality of control options into smaller sub-regions, where each sub-region may be a distinct selectable region. For example, a user may select the right half of a keyboard containing the letters 'N' through 'Z,' and the system may divide this right half of the keyboard into two smaller regions: one smaller region containing the letters 'N' through 'R' and the other smaller region containing letters 'S' through 'Z,' where each smaller region is individually or separately selectable, and the letters may represent control options. Additional examples may include: (1) a menu interface, where the user selects the 'Settings' panel in a split-screen display, and the system partitions this panel into 'Display Settings' and 'Audio Settings,' which may allow the user to choose between the regions presenting these subsets of menu options, (2) a touchscreen map, where a user taps a region labeled 'North Zone' on a map, and the system subdivides this region into 'Northwest' and 'Northeast' zones, which may enable more precise selection of map regions, or (3) a gaming console interface, where a player selects the 'Items' category in a menu, and the system partitions it into 'Tools' and 'Food,' where each is now associated with a newly presented distinct selectable region.

Partitioning of a distinct selectable region refers to dividing, subdividing, or segmenting an existing region of a user interface—which is itself distinct and selectable—into two or more new, distinct and selectable subregions that each may present a subdivided set of control options that may be associated with a control function. The partitioning may be based on various criteria including: number of control options per partition, spatial layout of control options, probability of partitioned distinct selectable region selection, or functional or categorical grouping. Partitioning of a distinct selectable region may refer to dividing a previously defined distinct selectable region into two or more distinct selectable regions, each of which may be individually selected by a user. A distinct selectable region may be associated with a plurality of control options or a set of control options, and each subset of control options resulting from the partitioning of the distinct selectable region may be associated with a newly presented, partitioned distinct selectable region on the display. Partitioning of a distinct selectable regions may include visual or functional subregions that the user may interact with individually. Iterative partitioning of distinct selectable regions may allow for the narrowing of control options toward convergence (e.g., a single control option associated with a distinct selectable region) or allow for precise selection of a region associated with a control option, through one or more iterative partitions. Each partition of the distinct selectable region may be associated with a subset of the control options (e.g., at least a portion of the control options, overlapping subsets, distinct subsets). Partitioning of a distinct selectable region may enable or allow the user interface to narrow down user choices or control options incrementally, which may enable or allow for more precise user input and interaction. Examples of partitioning a distinct selectable region may include: (1) a virtual keyboard may show keys 'A' through 'Z'; the user selects the right half containing 'N' through 'Z'; the system partitions this right half into two regions: 'N' through 'R' and 'S' through 'Z', so the user can next select between these regions presenting smaller sets of letters, (2) a 'Settings' menu may be selected and partitioned into 'Display Settings' and 'Audio Settings,' allowing the user to focus on one region associated with a settings category at a time, (3) a user may tap on a 'North Zone' region of a map; the system partitions this area into 'Northwest' and 'Northeast,' enabling more precise map region selection, (4) selecting an 'Items' category divides the region into 'Tools' and 'Food' subcategories for finer selection by subdividing 'Items' regions, or (5) a user may select a 'Movies' region in a streaming application; the system partitions it into 'Action' and 'Comedy' sections for subsequent selection in the 'Action' or 'Comedy' regions.

Figure 5A:
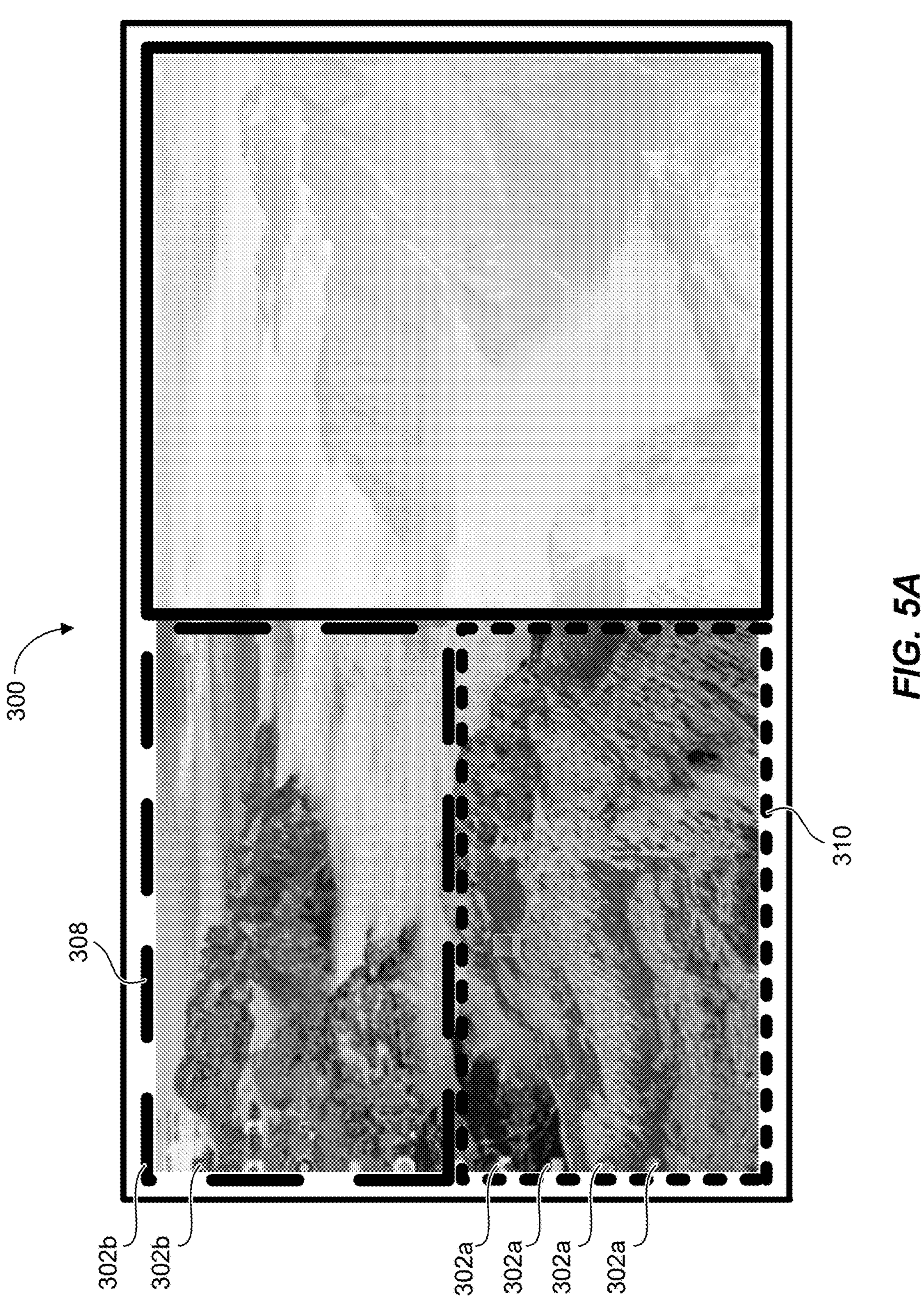
FIGS. 5A and 5B illustrate the user interface of FIG. 3 after a second partitioning, before and after the receipt of a second selection, consistent with some disclosed embodiments.

By way of a nonlimiting example, FIG. 4B and FIG. 5A illustrate in response to receipt of the selection of the second distinct selectable region, outputting second signals for modifying the display to partition the second distinct selectable region into at least two additional distinct selectable regions. For example, in FIG. 4B, second distinct selectable region 306 of display 300 is selected and contains a plurality of control options, representing the second plurality of control options, where each control option 302*a* presented in second distinct selectable region 306 is included in the plurality of control options. In response to the selection of second distinct selectable region 306, signals may be output to partition second distinct selectable region 306, which may involve dividing or splitting the plurality of control options presented in second distinct selectable region 306. In FIG. 5A, third distinct selectable region 308 and fourth distinct selectable region 310 are presented by display 300. Third distinct selectable region 308 and fourth distinct selectable region 310 may result from the partitioning of second distinct selectable region 306 or the signals output in response to the selection of second distinct selectable region 306. Third distinct selectable region 308 and fourth distinct selectable region 310 collectively contain the second plurality of control options. The second plurality of control options may be divided into subsets based on the partitioning of second distinct selectable region 306, such that third distinct selectable region 308 contains part of the second plurality of control options and fourth distinct selectable region 310 contains the remaining portion of the second plurality of control options.

By way of nonlimiting examples, FIGS. 10 and 11A illustrate in response to receipt of the selection of the second distinct selectable region, outputting second signals for modifying the display to partition the second distinct selectable region into at least two additional distinct selectable regions. For example, in FIGS. 10 and 11A, second distinct selectable region 1008 of keyboard 1002 is selected and contains a plurality of control options, representing the second plurality of control options, where each control option is represented by key 1004*a*. Each key 1004*a* presented in second distinct selectable region 1008 is included in the second plurality of control options. In response to the selection of second distinct selectable region 1008, signals may be output to partition second distinct selectable region 1008, which may involve dividing or splitting the plurality of control options presented in second distinct selectable region 1008. Third distinct selectable region 1010 and fourth distinct selectable region 1012 are presented by keyboard 1002. Third distinct selectable region 1010 and fourth distinct selectable region 1012 may result from the partitioning of second distinct selectable region 1008 or the signals output in response to the selection of second distinct selectable region 1008. Third distinct selectable region 1010 and fourth distinct selectable region 1012 collectively contain the second plurality of control options. The second plurality of control options may be divided into subsets based on the partitioning of second distinct selectable region 1008, such that third distinct selectable region 1010 contains part of the second plurality of control options and fourth distinct selectable region 1012 contains the remaining portion of the second plurality of control options.

In some disclosed embodiments, the partitioning occurs based on equal numbers of selectable options in each region. For example, a region may be partitioned into two or more partitioned regions, and an associated set or collection of options may be divided or split as a result. The associated divided set or collection of options may be divided equally into new subsets of options. The new subsets of options may be associated with the two or more partitioned regions, such that each newly presented region contains the same number of options. The options may include control options, a set of control options, a subset or control options, or a plurality of control options. The two or more regions may include distinct selectable regions. The options may be partitioned such that each of the two or more regions contains, presents, displays, or is otherwise associated with the same number of distinct options. The partition based on equal numbers of selectable options in each region may balance the distribution of selectable options to facilitate efficient navigation or selection by a user. Partitioning based on equal numbers of selectable options in each region may be used in iterative or binary selection or indication schemes. Examples of partitioning based on equal numbers of selectable options in each region may include: dividing the 26 letters of a virtual keyboard into two regions of 13 keys each, a dropdown menu with 5 options is partitioned into two regions (e.g., {'New', 'Open', 'Save', 'Export', 'Close'} partitioned into {'New', 'Open'. 'Save'} and {'Save', 'Export' 'Close'}), a home screen displaying 12 application icons is partitioned into 3 selectable regions of 4 icons each, or a map with 8 points of interest is divided into two regions containing 4 points each so that the user can choose which half to focus on before further zooming in.

In some disclosed embodiments, the partitioning occurs based on equal region size. For example, a display area, interface section, distinct selectable region, or any other region of the user interface may be divided into two or more sub-regions such that each resulting region occupies approximately the same physical area, space, or portion of the display. Partitioning based on equal region size may allow for spatial equality, and the number of control options or selectable options in each partition may be different for each partition. Partitioning based on equal region size may allow for maintaining visual balance, consistent interaction targets, or predictable navigation for the user. Examples of partitioning based on equal region size may include: (1) a sidebar menu covering 200 pixels of screen width is divided into two regions that are 100 pixels wide, regardless of whether one region has more items than the other, (2) a home screen displays 12 application icons in a 3-by-4 grid, partitioning by equal region size splits the screen into top and bottom halves, each containing 6 icons, or (3) a map is divided into left and right halves of equal area for zoom or focus purposes, regardless of how many points of interest fall into each half.

Figure 5B:
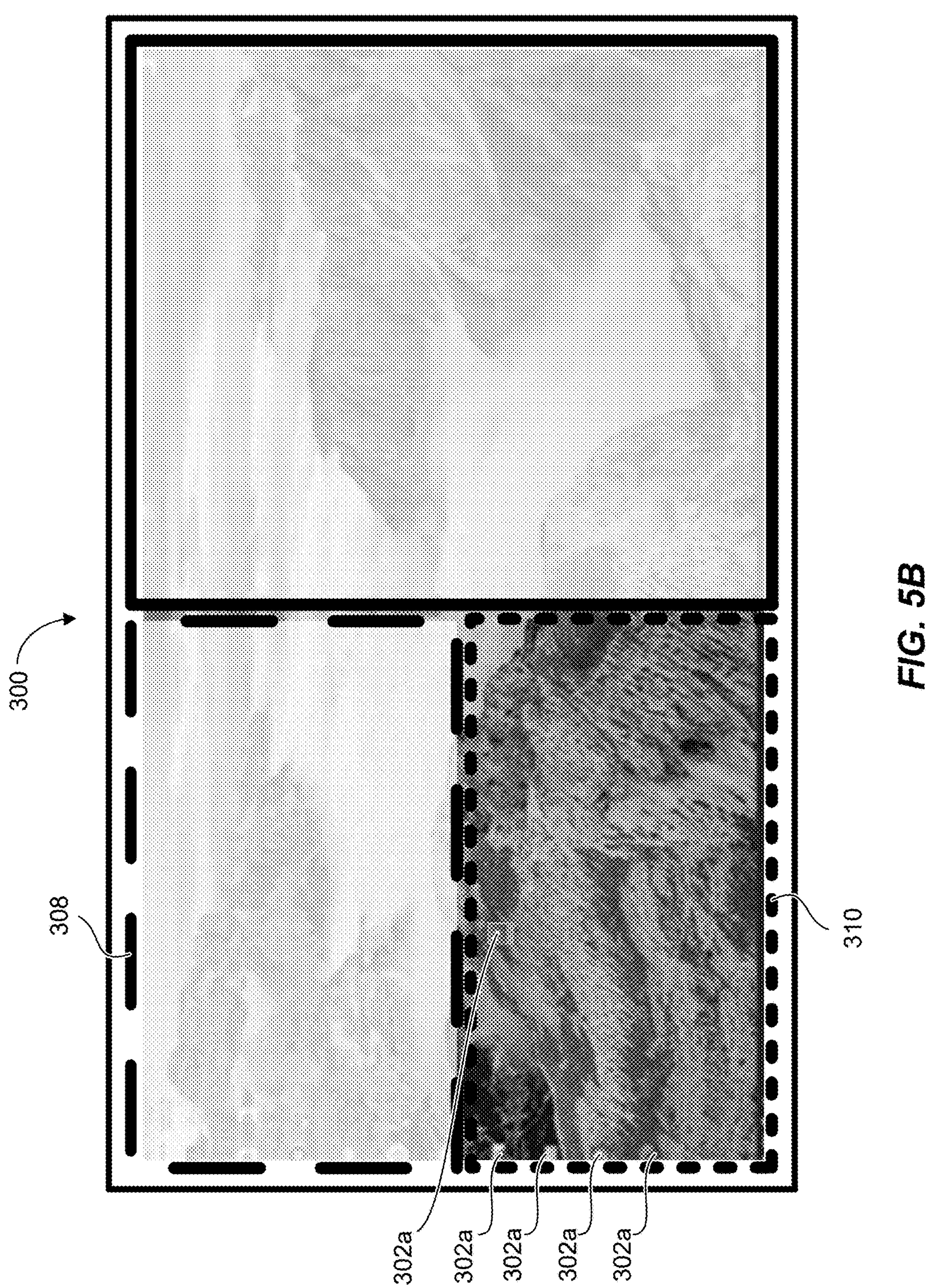
Figure 6A:
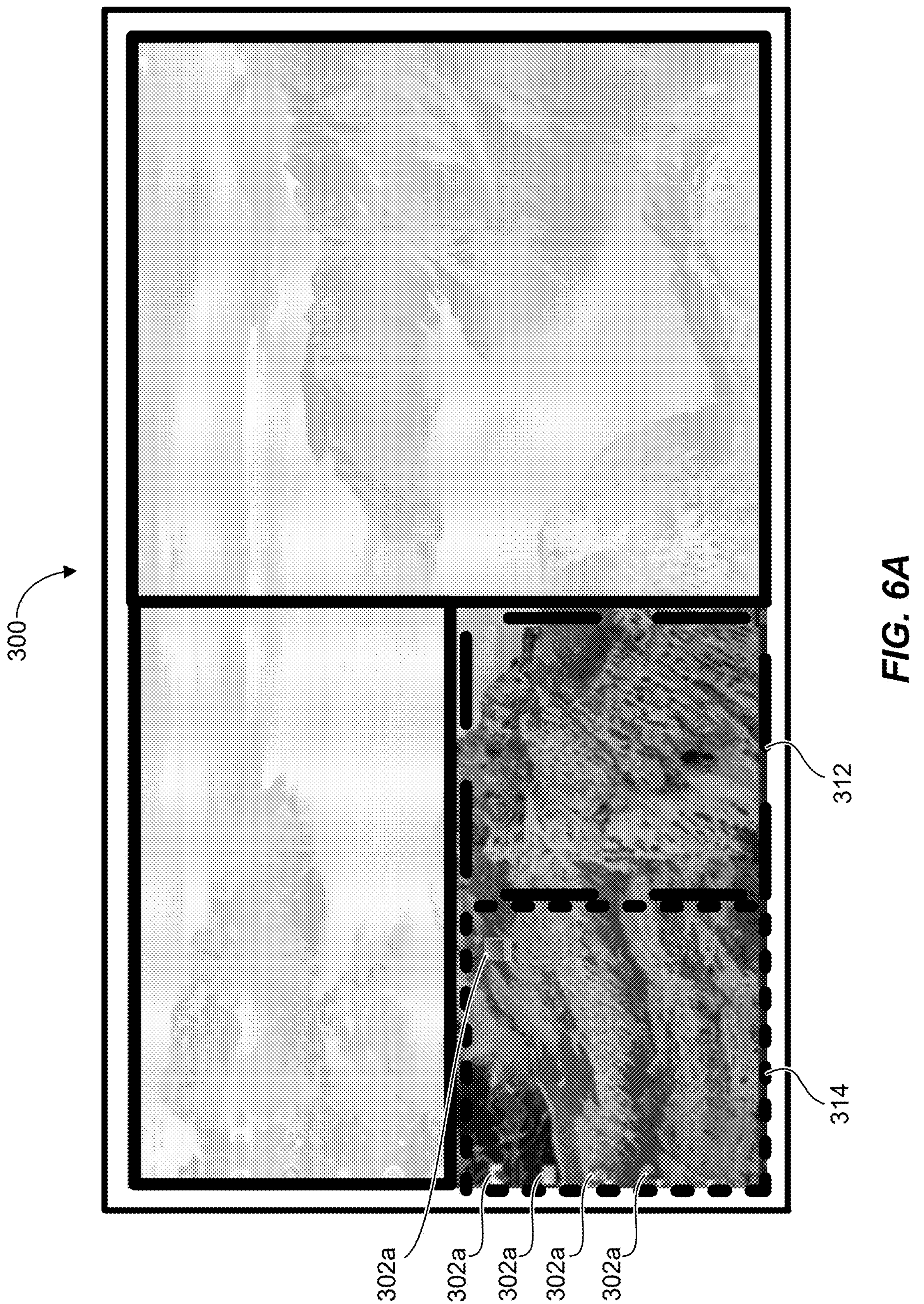
FIGS. 6A and 6B illustrate the user interface of FIG. 3 after a third partitioning, before and after the receipt of a third selection, consistent with some disclosed embodiments.
Figure 6B:
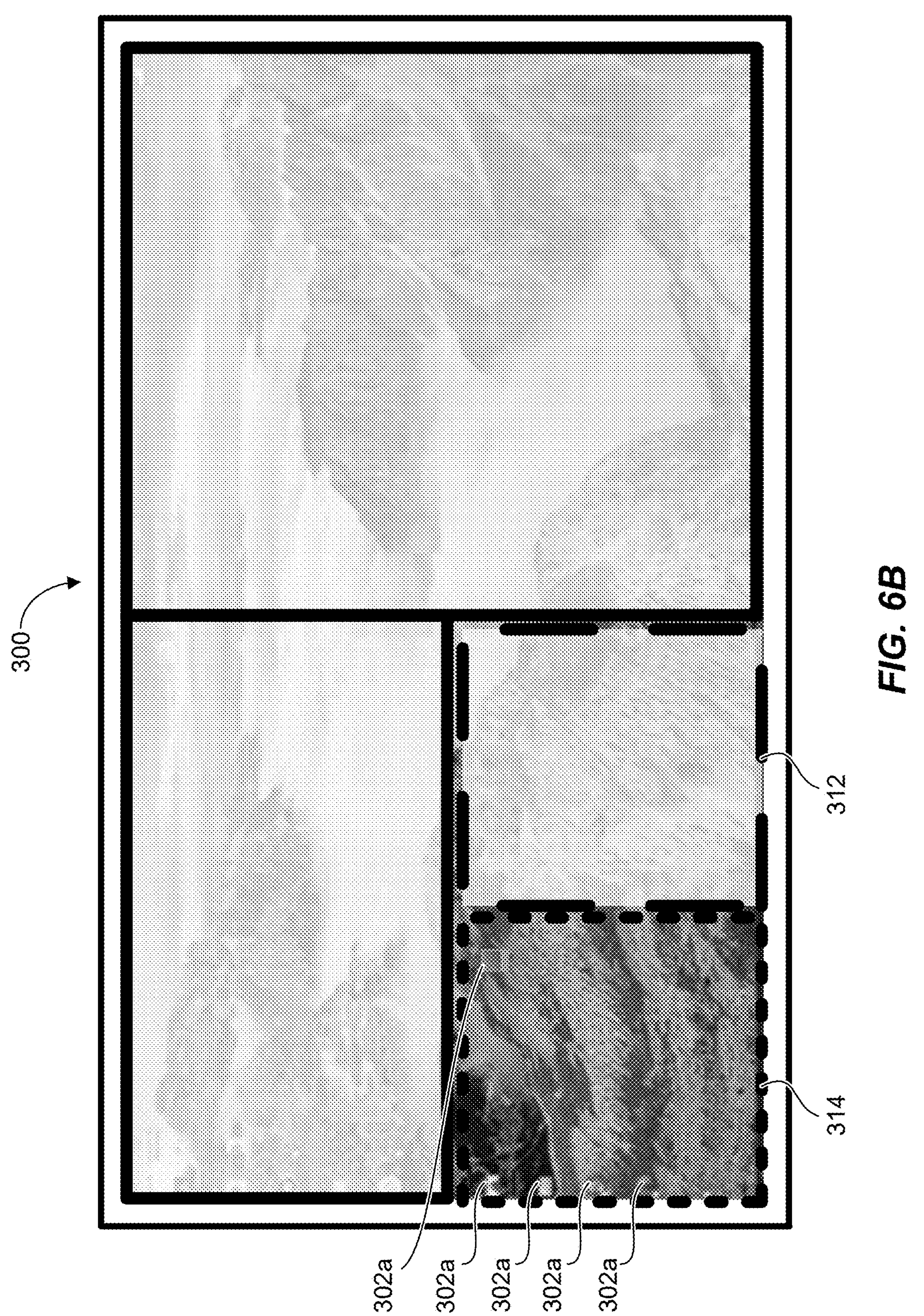
Figure 7A:
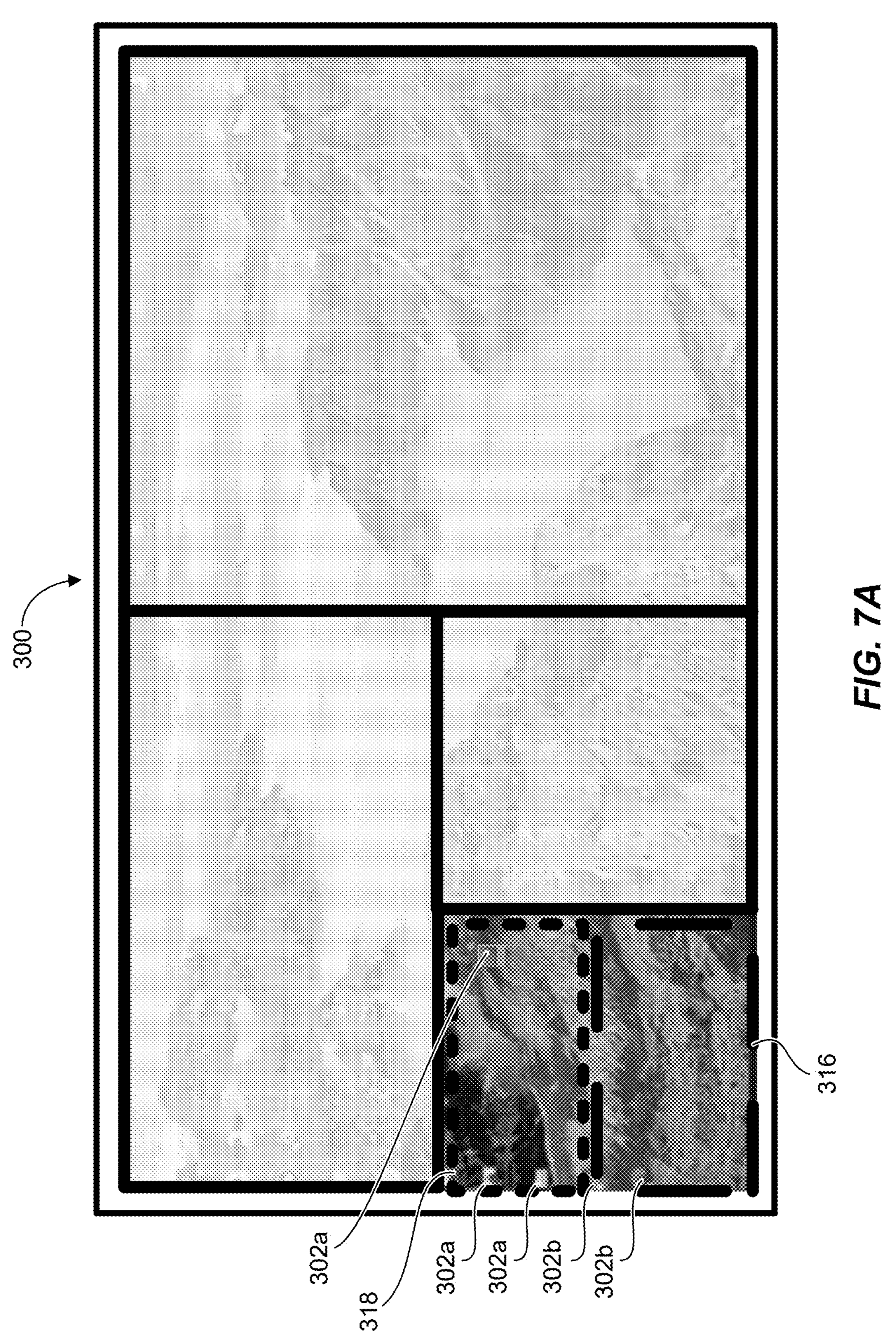
FIGS. 7A and 7B illustrate the user interface of FIG. 3 after a fourth partitioning, before and after the receipt of a fourth selection, consistent with some disclosed embodiments.
Figure 7B:
Figure 8A:
FIGS. 8A and 8B illustrate the user interface of FIG. 3 after a fifth partitioning, before and after the receipt of a fifth selection, consistent with some disclosed embodiments.
Figure 8B:
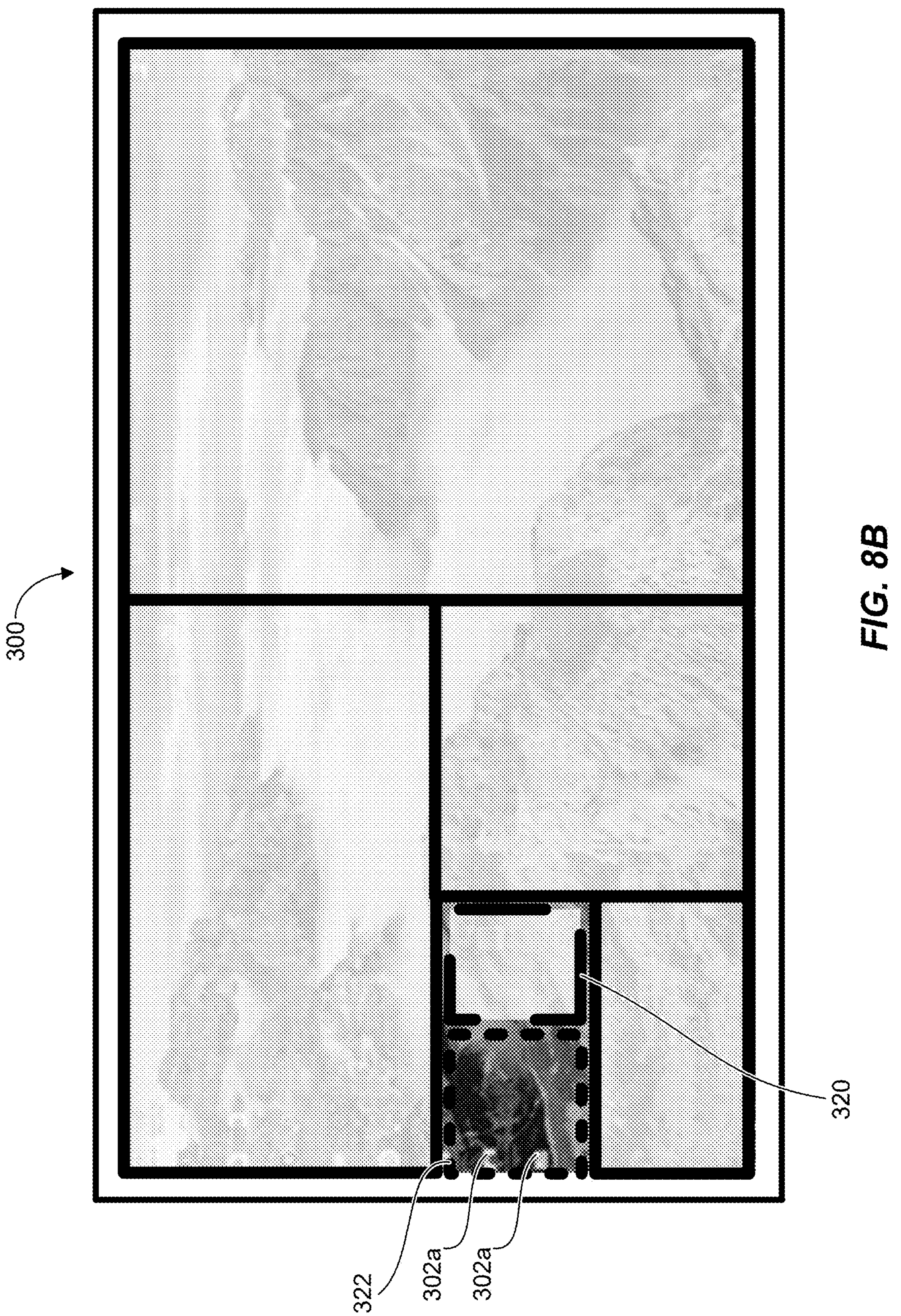
Figure 9A:
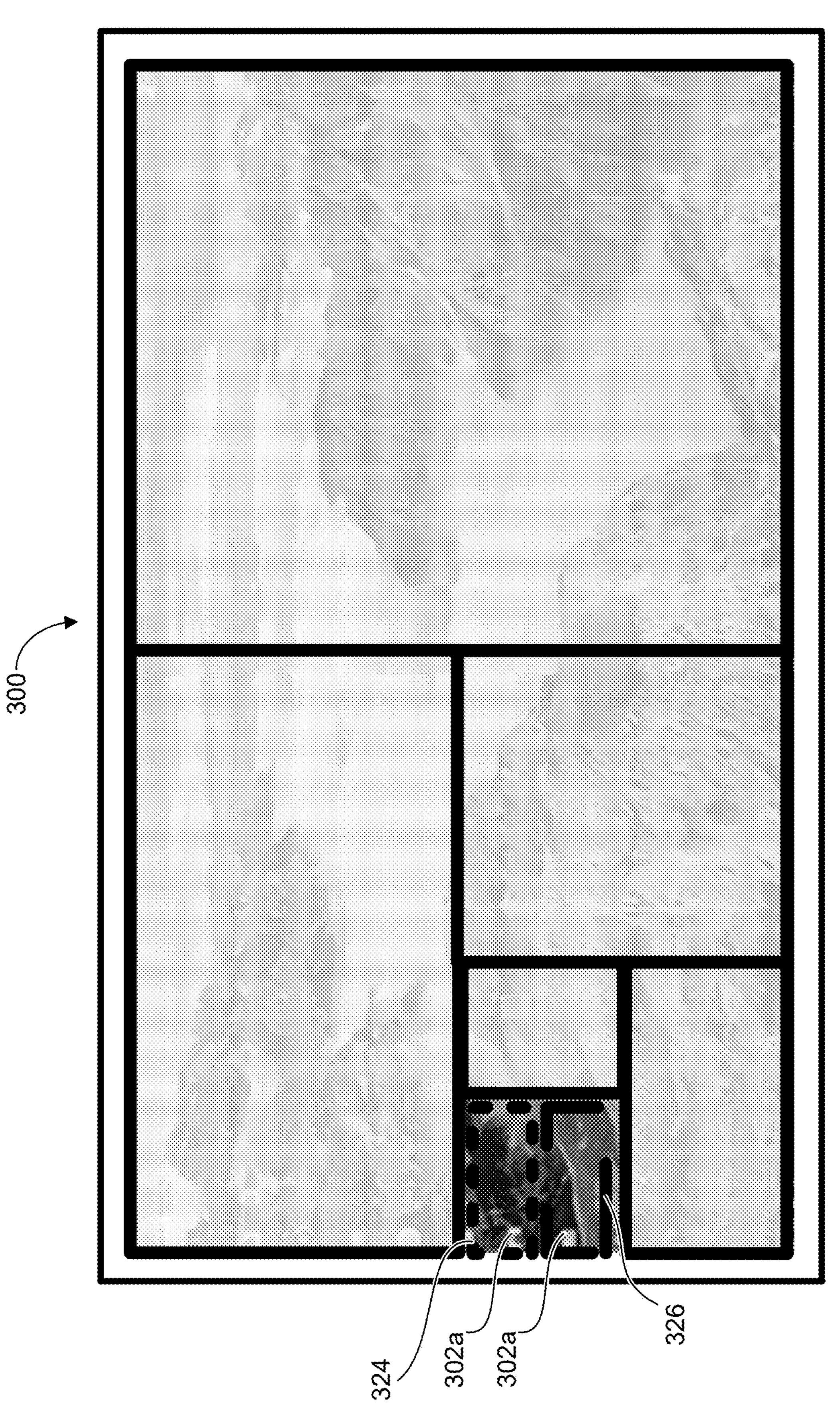
FIGS. 9A and 9B illustrate the user interface of FIG. 3 after a sixth partitioning, before and after the receipt of a sixth selection, consistent with some disclosed embodiments.
Figure 9B:
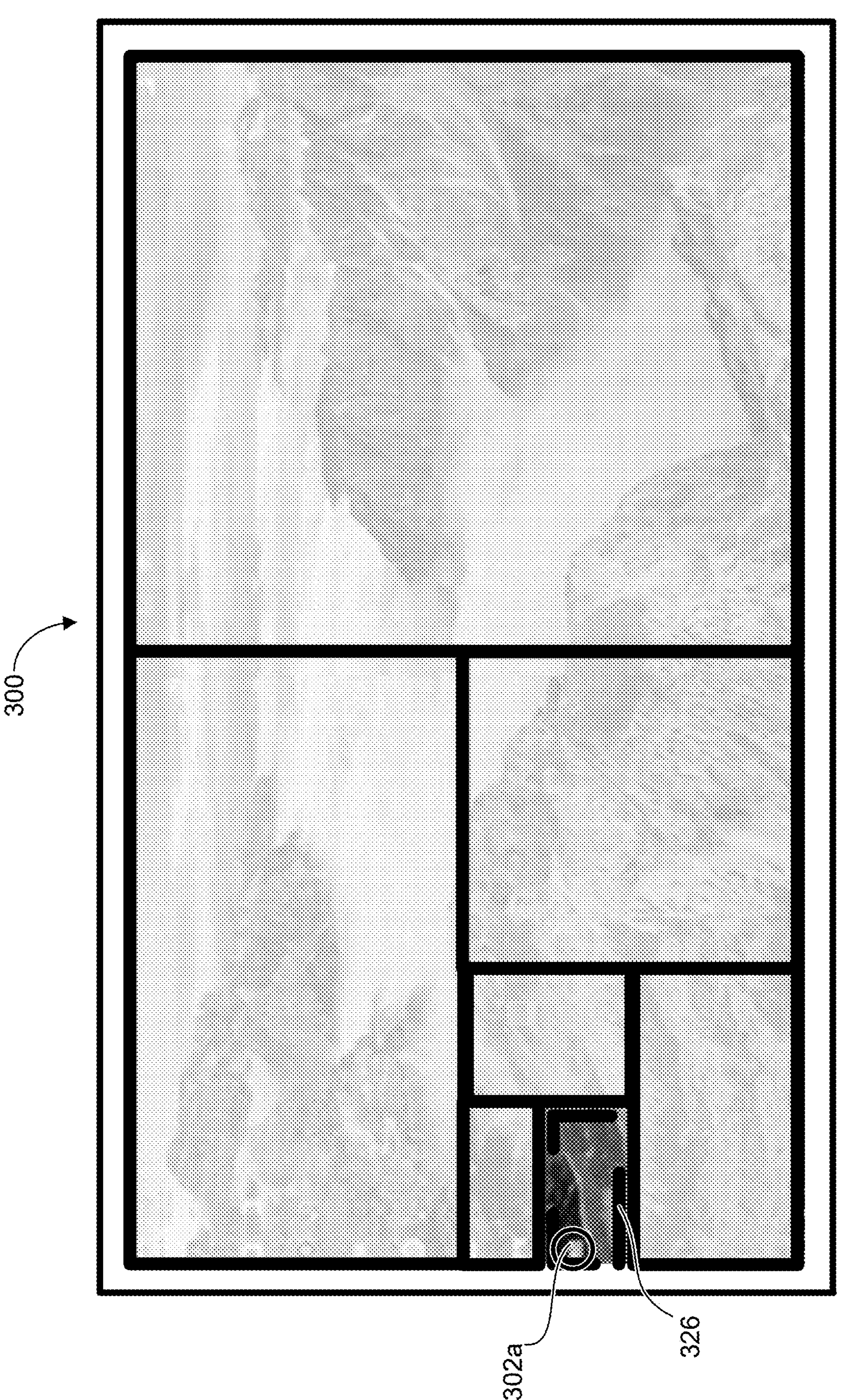

By way of nonlimiting examples, FIG. 4A, FIG. 5A, FIG. 6A, FIG. 7A, FIG. 8A, and FIG. 9A illustrate the partitioning occurs based on equal region size. For example, in FIG. 4A, display 300 is partitioned into first distinct selectable region 304 and second distinct selectable region 306, where first distinct selectable region 304 and second distinct selectable region 306 occupy the same amount of space on display 300. For example, as shown in FIG. 5A, second distinct selectable region 306 (e.g., shown in FIGS. 4A-4B) of display 300 is partitioned into third distinct selectable region 308 and fourth distinct selectable region 310, where third distinct selectable region 308 and fourth distinct selectable region 310 occupy the same amount of space on display 300. For example, as shown in FIG. 6A, fourth distinct selectable region 310 (e.g., shown in FIGS. 5A-5B) of display 300 is partitioned into fifth distinct selectable region 312 and sixth distinct selectable region 314, where fifth distinct selectable region 312 and sixth distinct selectable region 314 occupy the same amount of space on display 300. For example, as shown in FIG. 7A, sixth distinct selectable region 314 (e.g., shown in FIGS. 6A-6B) of display 300 is partitioned into seventh distinct selectable region 316 and eighth distinct selectable region 318, where seventh distinct selectable region 316 and eighth distinct selectable region 318 occupy the same amount of space on display 300. For example, as shown in FIG. 8A, eighth distinct selectable region 318 (e.g., shown in FIGS. 7A-7B) of display 300 is partitioned into ninth distinct selectable region 320 and tenth distinct selectable region 322, where ninth distinct selectable region 320 and tenth distinct selectable region 322 occupy the same amount of space on display 300. For example, as shown in FIG. 9A, tenth distinct selectable region 322 (e.g., shown in FIGS. 8A-8B) of display 300 is partitioned into eleventh distinct selectable region 324 and twelfth distinct selectable region 326, where eleventh distinct selectable region 324 and twelfth distinct selectable region 326 occupy the same amount of space on display 300.

In some disclosed embodiments, the partitioning occurs based on a probability of selection of a partitioned distinct selectable region associated with one or more control options. This may refer to a process in which a selected user interface region is subdivided into two or more partitioned distinct selectable regions, and the system may use a probability of selection (e.g., probabilistic methods) to determine how to subdivide the distinct selectable region into the two or more partitioned distinct selectable regions. This may involve determining which control option or control function the user is most likely to want to choose, and then determining the structure, layout, or segmentation of the distinct selectable region based on the probability or probabilities of selection. For instance, the system may use rule-based methods (e.g., user profiles with lists of "favorite" control options) or machine learning based approaches, which may include one or more artificial intelligence (AI) agents, Bayesian Methods, Markov Models, or any other probabilistic approach that involves machine learning.

In some disclosed embodiments, the partitioning of control options may be performed dynamically based on an analysis of the user's past decisions (e.g., past selections, past indications, user selection history). The system, for example, by utilizing at least one processor 102, may be configured to monitor and store a user's selection history in at least one memory 104. The user selection history may be analyzed to generate a predictive model or probabilistic map of the user's likely next selection. When partitioning a distinct selectable region, the processor may determine how to partition the distinct selectable region based on the control options associated with the distinct selectable region. For instance, when a display presents a keyboard and a memory stores a user's selection history associated with the keyboard, the processor may determine that the user's past actions are clustered in a specific area or region of the keyboard (e.g., the "Q-W-E-R" keys for a game, or the "J-K-L" keys for a typist). In response the processor may output signals to create distinct selectable regions that are weighted based on the user's selection patterns (e.g., behavioral patterns). As an example, one distinct selectable region may encompass a high-probability cluster of keys, while the other distinct selectable region may encompass all the remaining keys, where the distinct selectable region associated with the high-probability cluster of keys may be smaller than the other distinct selectable region associated with the remaining keys. This functionality may enable the iterative selection process to adapt to the user's habits or may reduce the number of required iterative selections.

In further embodiments, the partitioning of a distinct selectable region may be based on a predefined set of "favorite" or "high priority" control options. The system may provide an interface for a user to explicitly designate one or more control options (e.g., specific keyboard keys, application icons, or menu functions) as "favorites," which may then be stored in memory 104, such as in a user profile stored in memory 104. A user profile may refer to a data structure, record, or collection of information associated with a user (or a class of users). A user profile may define one or more characteristics, preferences, identifiers, access rights, or behavioral attributes used by a system to customize, control, or adapt operations, interfaces or outputs for the user associated with the user profile.

After receiving a selection of a distinct selectable region, the processor may subsequently determine how to partition the distinct selectable region, where the distinct selectable region is associated with a plurality of control options. Determining how to partition the distinct selectable region may include determining (e.g., first determining) if any control options in the plurality of control options are in the predefined set of "favorite" control options (e.g., a favorites list). If one or more control options is in the predefined set of "favorite" control options, then the processor may output signals to partition the distinct selectable region into a first distinct selectable region containing only the one or more "favorite" control options of the plurality of control options and a second distinct selectable region containing all other remaining options (e.g., not in the favorites list). This may provide a user with a method or controls for immediate selection of their most-used or "favorite" control options in a single step (e.g., a "shortcut"), after which the iterative partitioning process may resume for the non-favorite options or otherwise be reinitiated (e.g., from the plurality of options associated with the originally presented distinct selectable regions).

Alternatively, an artificial intelligence (AI) agent or other machine learning-based approach, as described herein, may be configured to predict or infer a set of favorites based on frequency of use or other heuristics. An AI agent may refer to a software-based entity or system component that can perceive information from its environment (e.g., a directly or indirectly received user input, selection, or indication), process or reason about that information, or take actions or make decisions toward achieving one or more defined goals (e.g., convergence). An AI agent may be based on a combination of machine learning techniques or implementations, rule-based logic (e.g., prompt-based behavioral directives), or data-driven inference. An AI agent may act automatically or autonomously within its environment (e.g., automatically respond to user input). An AI agent may be used to segment or partition a user interface by analyzing user behavior, context, or system state to determine how to partition regions of the user interface, which may enable more efficient selection of regions of the user interface for convergence in a reduced amount of selection iterations.

An AI agent may include a base model (e.g., a pretrained large language model (LLM), pretrained language model (LM), or other computational model) that is configured to provide decisions or inferential information for partitioning by a framework (e.g., by defining the interaction environment, through prompt-based engineering, or any other method of configuring an AI agent for user interface segmentation). For instance, an AI agent may be configured to perform predictive or inferential operations including context-aware segmentation (e.g., interface partitions determined based on user tasks or operating modes), usage-based refinement (e.g., organizing regions based on the more frequently used controls), cognitive load reduction (e.g., partitioning regions to only include relevant options), predictive access (e.g., predicting or anticipating the controls a user will most likely need next), or any other predictive or inferential tasks to reduce number of selections (e.g., average number of selections) to convergence.

After configuring an AI agent, the AI agent may be fine-tuned for AI alignment, AI safety, or other improvements for effective system functionality or positive user experience, where fine tuning may be accomplished through reinforcement learning techniques (e.g., through interactions with the environment and a feedback mechanism to provide feedback based on the interactions). Reinforcement learning may occur prior to system deployment (e.g., before the user starts using the system), or reinforcement learning may be conducted as the user interacts with the system.

Determining how to partition the distinct selectable region may include predicting or inferring the control options that the user is most likely interested in converging towards (e.g., the final control option or associated control function that the user intends to choose). This may involve using an AI agent or another machine learning-based approach to output a probability or to output subsets of control options based on the plurality of control options presented in the selected distinct selectable region. Based on this prediction or inference, the system may determine how to partition the selected distinct selectable region.

Some approaches to partitioning the selected distinct selectable region may include or result in partitioning the selected distinct selectable region into two or more non-square or non-rectangular distinct selectable regions. Other than a square or rectangle, possible shapes of a distinct selectable region may include distinct and individually selectable shapes, such as standard geometric shapes (e.g., circle, ellipse, polygon, rounded polygons, triangle, pentagon, or any other standard geometric shape), irregular shapes (e.g., freeform shapes, icon-shaped regions that may be based on the shape of a control option), hierarchical or nested regions (e.g., subregions within a larger region such as concentric circles including a central circle and surrounding annular regions), or any other shape that allows for distinct and individually selectable regions of a display or user interface.

In some disclosed embodiments, two distinct selectable regions have different colors. For example, two regions or areas on a display may be visually distinguished by assigning at least a portion of each region or area with a distinct color, hue, or shade. A portion refers to any subset, segment, section, border, or part of the two regions or areas. In some embodiments, two or more regions or areas on a display may be assigned a distinct color, hue, or shade. A portion may refer to a physical or virtual subset of a region of a display. A portion may be defined by spatial boundaries, logical grouping, functional association, probabilistic association, or other criteria relevant to the context. This color-based distinction between distinct selectable regions may serve to indicate selection status, active versus inactive regions, grouping, or functional differences. This color-based distinction may be based on the control options presented in a distinct selectable region or provide a user information about the control options presented in a distinct selectable region. This color-based distinction may help guide a user's attention and interactions. A difference in color may be subtle (e.g., lighter vs. darker shade) or prominent (e.g., red vs. green). The different colors may be chosen or assigned based on context, purpose, or user preferences. Examples of assigning different colors to the two portions may include: (1) when a virtual keyboard is divided into two selectable regions, one region is shaded blue and the other region shaded yellow to visually differentiate for binary selection, (2) a split-screen menu has a top portion highlighted in light gray and the bottom portion in dark gray to signal that the regions can be selected independently, (3) on a home screen with 12 application icons, the left half region of the screen is highlighted green and the right half region of the screen is highlighted purple to allow the user to choose a region and subsequently reduce the number of presented application icons, or (4) a map divides a city into two selectable zones, where the northern half is colored orange and the southern half is colored teal, guiding the user to select one zone, which causes the map to zoom in on the selected zone.

Some disclosed embodiments involve a third plurality of control options that are caused to be displayed in a third distinct selectable region of the at least two additional distinct selectable regions and a fourth plurality of control options that are caused to be displayed in a fourth distinct selectable region of the at least two additional distinct selectable regions. For example, after receiving the selection of a distinct selectable region (e.g., the second distinct selectable region), the distinct selectable region may be subdivided into smaller, individually selectable areas (e.g., sub-regions). Each of these new sub-regions may present separate sets of control options, where these separate sets of control options may be subsets of the set of control options associated with the distinct selectable region (e.g., the second distinct plurality of control options associated with the second distinct selectable region), which may allow or enable the user to make a more refined selection within the originally selected distinct selectable region. Further iterations of this selection and subdivision process may enable even finer selection of control options. Examples may include: (1) virtual keyboard: the user may select a region including the right half of a keyboard that presents the letters 'N' through 'Z' (e.g., 'N' through 'Z' are control options), and the system may subdivide this region into a third region associated with letters 'N' through 'R' and a fourth region associated with letters 'S' through 'Z,' where each region now presents or displays its respective letters and may allow the user to choose a region presenting its respective subset to further hone in on the respective subset, (2) menu interface: a 'Settings' panel region may be selected, and the system partitions this region into a third region associated with 'Display Settings' and a fourth region associated with 'Audio Settings,' where each sub-region displays the corresponding set of control options and each sub-region is individually selectable, (3) map application: a 'North Zone' region may be selected, and the system may partition it into a third region associated with 'Northwest' and a fourth region associated with 'Northeast,' where each area may be available for further selection, or (4) streaming application UI: a user may select 'Movies' (e.g., second distinct selectable region) instead of 'TV Shows' (e.g., first distinct selectable region) and the system may divide this 'Movies' region into a third region associated with 'Action Movies' and a fourth region associated with 'Comedy Movies,' where each region displays a list of corresponding movies.

By way of a nonlimiting example, FIG. 5A illustrates a third plurality of control options that are caused to be displayed in a third distinct selectable region of the at least two additional distinct selectable regions and a fourth plurality of control options that are caused to be displayed in a fourth distinct selectable region of the at least two additional distinct selectable regions. For example, in FIG. 5A, display 300 displays third distinct selectable region 308 and fourth distinct selectable region 310. Third distinct selectable region 308 displays a plurality of control options, where each control option 302*b* displayed in third distinct selectable region 308 may be included the third plurality of control options. Fourth distinct selectable region 310 displays a plurality of control options, where each control option 302*a* displayed in fourth distinct selectable region 310 may be included in the fourth plurality of control options.

By way of nonlimiting examples, FIG. 10 and FIG. 11A illustrate a third plurality of control options that are caused to be displayed in a third distinct selectable region of the at least two additional distinct selectable regions and a fourth plurality of control options that are caused to be displayed in a fourth distinct selectable region of the at least two additional distinct selectable regions. For example, in FIG. 10 and FIG. 11A, keyboard 1002 contains an arrangement of keys, where each key (e.g., key 1004*a*, key 1004*b*, key 1004X) represents a control option of keyboard 1002. Keyboard 1002 may be a virtual keyboard or another type of keyboard that is presented by a display. Keyboard 1002 may display third distinct selectable region 1010 and fourth distinct selectable region 1012. Third distinct selectable region 1010 displays a plurality of keys, where each key 1004*b* displayed in third distinct selectable region 1010 may be included in the third plurality of control options. Fourth distinct selectable region 1012 displays a plurality of keys, where each key 1004*a* displayed in fourth distinct selectable region 1012 may be included in the fourth plurality of control options.

In some disclosed embodiments, at least a portion of at least one of the third distinct selectable region and the fourth distinct selectable region occupies a location on the display previously occupied by at least a portion of the first distinct selectable region and the second distinct selectable region. For example, the system may reuse or replace display space of previously presented selectable regions when displaying new sub-regions, which may allow the user interface to efficiently manage space of the display, a screen, or a user interface while presenting progressively refined choices to the user. Examples may include: (1) virtual keyboard, where after the user selects the right half of a keyboard (second region) (e.g., 'N' through 'Z'), the system subdivides it into a third region (e.g., 'N' through 'R') and a fourth region (e.g., 'S' through 'Z'), where these new regions appear in the same area previously occupied by the original left and right halves of the keyboard, effectively replacing or overlapping the original distinct selectable regions, (2) menu interface, where the user selects a 'Settings' panel, and the system partitions it into 'Display Settings' and 'Audio Settings'; these new sub-panels may appear in the same area where the original 'Settings' panel was displayed, (3) map application, where a 'North Zone' region is selected; when subdivided into 'Northwest' and 'Northeast,' these new distinct selectable regions may occupy the space previously taken by the overall North Zone, which may maintain a consistent spatial reference for the user, or (4) streaming application UI, where a user may select a 'Movies' panel (e.g., second distinct selectable region) instead of a 'TV shows' panel (e.g., first distinct selectable region); after subdivision into 'Action Movies' and 'Comedy Movies,' the new panels may occupy the space originally occupied by the original 'Movies' panel and the original 'TV shows' panel, which may allow for efficient use of the display area, a larger sizing of control options associated with 'Action Movies' or 'Comedy Movies', or a larger amount of displayed control options associated with 'Action Movies' or 'Comedy Movies.'

In some disclosed embodiments, the third distinct selectable region maintains an associated display color and the fourth distinct selectable region changes an associated display color. The third distinct selectable region maintaining an associated display color and the fourth distinct selectable region changing an associated display color refers behavior in which, during iterative user interface region selection, partitioning, input, or updates, some distinct selectable regions may retain their original visual appearance (e.g., color, shading, texture, or highlighting) and other distinct selectable regions may change their visual appearance (e.g., by changing color, brightness, or contrast). Thus, for example, regions of the display area or user interface may be visually distinguished by their color behavior during interaction or state changes. A distinct selectable region maintaining an associated display color and another distinct selectable region changing an associated display color may include the distinct selectable region maintaining an associated display color while the other distinct selectable region changes an associated display color. For example, the third distinct selectable region may maintain its associated display color while the fourth distinct selectable region changes its associated display color. In some exemplary embodiments, the third distinct selectable region retains its existing color, which may indicate stability, inactivity, or continuity, while the fourth distinct selectable region may change color, which may indicate selection, activation, emphasis, or a transition in state. This visual distinction may help to guide the user in identifying which regions have been chosen, are active, or require attention. Examples of the third distinct selectable region maintaining an associated display color and the fourth distinct selectable region changing an associated display color may include: (1) virtual keyboard: the third region (letters 'N' through 'R') keeps its original key color and the fourth region (letters 'S' through 'Z') changes its color (e.g., from gray to blue), (2) menu interface: a 'Display Settings' sub-panel retains its default background color and a newly highlighted 'Audio Settings' sub-panel changes color (e.g., its background color), (3) map application: the 'Northwest' sub-region keeps its original color, and the border or boundary around a 'Northeast' sub-region changes color (e.g., to green or highlighted), (4) streaming application UI: the 'Action' category keeps its previous shade, and the 'Comedy' category changes the shade of its original color, or (5) split menu interface: in the split menu, the bottom region (e.g., fourth distinct selectable region presenting the fourth plurality of control options) highlights in yellow when hovered over or selected, while the top region (e.g., third distinct selectable region presenting the third plurality of control options) stays white.

Some disclosed embodiments involve receiving a selection of the fourth distinct selectable region. An input, selection, or indication of the fourth distinct selectable region may be received (e.g., received directly, received indirectly) as described and exemplified in reference to earlier received selections of a distinct selectable region (e.g., receiving a selection of the second distinct selectable region, receiving a selection of a distinct selectable region). The fourth distinct selectable region may present or be associated with one or more control options (e.g., a fourth plurality of control options). The fourth distinct selectable region may have been created by the selection and subsequent partitioning a prior-displayed distinct selectable region (e.g., the second distinct selectable region). In turn, the presented or associated control options of the prior-displayed distinct selectable region may be separated into subsets based on some subset assignment criteria, and a subset may be presented in the newly displayed or currently displayed fourth distinct selectable region. As previously described and exemplified, the subset assignment criteria may be based on—for example—spatial assignment, probabilistic assignment, rule-based assignment, model-based assignment, logical assignment, or any other method of separating control options into subsets, such as for decreasing number of user selections required for convergence or for increasing user experience, ease of user selection, or user interface usability. The fourth distinct selectable region may be received through direct or indirect input mechanisms (as described and exemplified herein), which may include touch, mouse clicks, keyboard, actuation, eye tracking, gestures, or other input signals.

By way of a nonlimiting example, FIG. 5B illustrates receiving a selection of the fourth distinct selectable region. For example, in the transition from FIG. 5A to FIG. 5B, fourth distinct selectable region 310 of display 300 is selected. This may result in a change of visual emphasis between third distinct selectable region 308, which was not selected, and fourth distinct selectable region 310, which was selected. Additionally, since fourth distinct selectable region 310 was selected, only the plurality of control options displayed in fourth distinct selectable region 310 are still presented in a region available for selection (e.g., further selection) by the user.

By way of nonlimiting examples, FIG. 10 and FIG. 11A illustrate receiving a selection of the fourth distinct selectable region. For example, in FIG. 10 and FIG. 11A, fourth distinct selectable region 1012 of keyboard 1002 is selected. For an exemplary virtual keyboard, this may result in a change in visual emphasis between third distinct selectable region 1010, which was not selected, and fourth distinct selectable region 1012, which was selected. Additionally, for keyboard 1002, since fourth distinct selectable region 1012 was selected, only the plurality of control options (e.g., represented by each of key 1004*a* presented in fourth distinct selectable region 1012) in fourth distinct selectable region 1012 are still presented in a region available for selection (e.g., further selection) by the user.

Some disclosed embodiments involve, in response to receipt of the selection of the fourth distinct selectable region, outputting third control signals for modifying the display to partition the fourth distinct selectable region into at least two further distinct selectable regions. In response to a user's selection of the fourth distinct selectable region, which may be the fourth distinct selectable region of the at least two additional selectable regions and may present or be associated with the fourth plurality of control options, signals or instructions may be generated that modify the user interface (as described and exemplified herein) and cause the partitioning of the fourth distinct selectable region (e.g., which may result in or include the subdivision of the presented or associated fourth plurality of control options into subsets as described and exemplified herein). The outputting third signals for modifying the display to partition the fourth distinct selectable region into at least two further distinct selectable regions may allow or enable an iterative, hierarchical partitioning process, which may involve progressively narrowing the selection space until convergence (e.g., a user isolates a region of a user interface presenting or associated with only a single control option). Examples of outputting third control signals in response to a user selection may include: (1) virtual keyboard: the user may select the fourth distinct selectable region containing letters 'S' through 'Z,' and the system outputs signals to split this region into a fifth distinct selectable region associated with letters 'S' through 'V' and a sixth distinct selectable region associated with letters 'W' through 'Z,' where the newly created sub-regions may occupy the space of the original fourth region, which may allow or enable the user to narrow down to the target key (e.g., convergence, moving toward convergence), (2) menu interface: within a settings menu, the user selects the 'Audio Settings' panel, and the system may partition this panel into a sub-panel for 'Volume Control' and a sub-panel for 'Equalizer,' where the user may now select a more specific option within audio settings, (3) map application: the user may select the 'Northeast' sub-region of a map, and the system may subdivide this area into a fifth distinct selectable region of 'Northeast-Urban' and a sixth distinct selectable region of 'Northeast—Rural,' which may enable finer navigation with the map, or (4) streaming application UI: after selecting 'Comedy' in a 'Movies' category, the system splits the display into a fifth distinct selectable region of 'Classic comedy' and a sixth distinct selectable region of 'Modern Comedy,' which may allow the user to focus on a narrower set of options.

By way of a nonlimiting example, FIG. 5B and FIG. 6A illustrate in response to receipt of the selection of the fourth distinct selectable region, outputting third control signals for modifying the display to partition the fourth distinct selectable region into at least two further distinct selectable regions. For example, in FIG. 5B, fourth distinct selectable region 310 of display 300 is selected and contains a plurality of control options, representing the fourth plurality of control options, where each control option 302*a* presented in fourth distinct selectable region 310 is included in the plurality of control options (e.g., the fourth plurality of control options). In response to the selection of fourth distinct selectable region 310, signals may be output to partition fourth distinct selectable region 310. In FIG. 6A, fifth distinct selectable region 312 and sixth distinct selectable region 314 are of display 300 and may result from the partitioning of fourth distinct selectable region 310. Fifth distinct selectable region 312 and sixth distinct selectable region 314 may each contain a subset of the fourth plurality of control options and collectively contain the fourth plurality of control options. Fourth distinct selectable region has been partitioned, such that the fifth distinct selectable region 312 contains a portion of the fourth plurality of control options and sixth distinct selectable region 314 contains the remaining portion of the fourth plurality of control options.

By way of nonlimiting examples, FIG. 10 and FIG. 11A illustrate in response to receipt of the selection of the fourth distinct selectable region, outputting third control signals for modifying the display to partition the fourth distinct selectable region into at least two further selectable regions. For example, in FIGS. 10 and 11A, fourth distinct selectable region 1012 of keyboard 1002 is selected and contains a plurality of control options, representing the fourth plurality of control options, where each control option is represented by key 1004*a*. Each key 1004*a* presented in fourth distinct selectable region 1012 is included in the fourth plurality of control options. In response to the selection of fourth distinct selectable region 1012, signals may be output to partition fourth distinct selectable region 1012. Fifth distinct selectable region 1014 and sixth distinct selectable region 1016 are presented by keyboard 1002 and may result from the partitioning of fourth distinct selectable region 1012. Fifth distinct selectable region 1014 and sixth distinct selectable region 1016 may each contain a subset of the fourth plurality of control options and collectively contain the fourth plurality of control options. The fourth distinct selectable region has been partitioned, such that fifth distinct selectable region 1014 contains a portion of the fourth plurality of control options and sixth distinct selectable region 1016 contains the remaining portion of the fourth plurality of control options.

Some disclosed embodiments involve one or more fifth control options that are caused to be displayed in a fifth distinct selectable region of the at least two further distinct selectable regions and one or more sixth control options that are caused to be displayed in a sixth distinct selectable region of the at least two further distinct selectable regions. Display or presentation of the one or more fifth control options and the one or more sixth control options may occur in a manner similar to display of other control options previously described. For example, after partitioning a previously selected distinct selectable region (i.e., partitioning a distinct selectable region as described and exemplified herein), at least two new distinct pluralities of control options or sets of control options may be displayed or presented in at least two corresponding distinct selectable regions, where each newly presented or partitioned distinct selectable region may contain one of the at least two new distinct pluralities of control options or sets of control options (as described and exemplified herein). This may allow or enable the user to narrow the choice of a control option toward a target control option (e.g., convergence, moving toward convergence) through the selection and subsequent partitioning of regions of a user interface. The at least two new distinct selectable regions (e.g., at least two further distinct selectable regions) may be distinguished through visual emphasis, layout, highlighting, or other cues to indicate their boundaries or contents. Examples of displaying one or more fifth control options in a fifth distinct selectable region of the at least two further distinct selectable regions and displaying one or more sixth control options in a sixth distinct selectable region of the at least two further distinct selectable regions may include: (1) virtual keyboard: after selecting the fourth distinct selectable region containing letters 'S' through 'Z' (e.g., fourth plurality of control options), subsequently partitioning the fourth distinct selectable region into a fifth distinct selectable region containing letters 'S' through 'V' (e.g., the one or more fifth control options) and a sixth distinct selectable region containing letters 'W' through 'Z' (e.g., the one or more sixth control options), where the user may now choose a newly presented or partitioned region associated with one or more control options, based on which new subset contains the desired key, (2) menu interface: after selecting 'Audio Settings,' presenting a fifth distinct selectable region that includes a single control option for 'Volume Control' and presenting a sixth distinct selectable region that includes a single control option for 'Mute,' (3) map application: after selecting 'Northeast,' presenting a fifth distinct selectable region that presents 'Northeast-Urban' areas and a sixth distinct selectable region that presents 'Northeast-Rural' areas, which may allow the user to make a more precise map selection, or (4) streaming application UI: after selecting 'Comedy,' a fifth distinct selectable region may present 'Classic Comedy' movies and a sixth distinct selectable region may present 'Modern Comedy' movies, which may allow the user to narrow the category for browsing or selection.

By way of a nonlimiting example, FIG. 6A illustrates one or more fifth control options that are caused to be displayed in a fifth distinct selectable region of the at least two further distinct selectable regions and one or more sixth control options that are caused to be displayed in a sixth distinct selectable region of the at least two further distinct selectable regions. For example, in FIG. 6A, display 300 may include fifth distinct selectable region 312 and sixth distinct selectable region 314. Fifth distinct selectable region 312 displays control options, where each control option 302*b* displayed in fifth distinct selectable region 312 may be included in the one or more fifth control options. Sixth distinct selectable region 314 displays control options, where each control option 302*a* displayed in sixth distinct selectable region 314 may be included in the one or more sixth control options.

By way of nonlimiting examples, FIG. 10 and FIG. 11A illustrate one or more fifth control options that are caused to be displayed in a fifth distinct selectable region of the at least two further distinct selectable regions and one or more sixth control options that are caused to be displayed in a sixth distinct selectable region of the at least two further distinct selectable regions. For example, in FIG. 10 and FIG. 11A, keyboard 1002 contains an arrangement of keys, where each key (e.g., key 1004*a*, key 1004*b*, key 1004X) represents a control option of keyboard 1002. Keyboard 1002 may be a virtual keyboard or another type of keyboard that is presented by a display. Keyboard 1002 may display fifth distinct selectable region 1014 and sixth distinct selectable region 1016. Fifth distinct selectable region 1014 displays keys, where each key 1004*b* displayed in fifth distinct selectable region 1014 may be included in the one or more fifth control options. Sixth distinct selectable region 1016 displays keys, where each key 1004*a* displayed in sixth distinct selectable region 1016 may be included in the one or more sixth control options.

In some disclosed embodiments, each of the one or more fifth control options and the one or more sixth control options include only a single control option associated with a single control function. This refers to an arrangement in which each of the one or more fifth control options and the one or more sixth control options (as described and exemplified herein) includes only one control option, where this only one control option is associated with only one control function. Thus, each of the newly presented or partitioned regions (e.g., the fifth distinct selectable region and the sixth distinct selectable region) may include only a single control option associated with a single control function that may correspond to exactly one individual action, command, or input. This may allow the user to precisely choose a single function or target item. Such an arrangement may indicate convergence or the completion of an iterative refinement process of the interface. In such an arrangement, after user selection of the single control option associated with the single control function, a new iterative refinement process of the interface may be initiated from the initial first distinct selectable region associated with the first plurality of control options and the initial second distinct selectable region associated with the second plurality of control options. Additionally, a new iterative refinement process may be initiated based on the convergence to the single control option or the execution of the associated single control function. An arrangement with two or more (e.g., two, each) newly presented or partitioned region having a single control option associated with a single control function may allow for or enable clarity by visually representing or isolating the individual control options, such that each one may perform only one distinct action when selected. In some embodiments, the selection of a region presenting a single control option may indicate convergence or result in the execution of a control function associated with the single control option based on the selection. Additionally, in some embodiments, a region presenting a single control option may indicate convergence or result in automatic execution of a control function associated with the single control option. Examples where only a single control option associated with a single control function is included in each of the one or more fifth control options and the one or more sixth control options may include: (1) virtual keyboard: after subdividing the distinct selectable region with letters 'S' through 'Z,' presenting a fifth distinct selectable region associated with the letter 'S' (e.g., a single control option associated with a single control function, where the letter 'S' is the content of the fifth plurality of control options) and a sixth distinct selectable region associated with the letter 'T' (e.g., a single control option associated with a single control function, where the letter 'T' is the content of the sixth plurality of control options), where each key represents only a single letter input, and this partitioning may be enabled by predictive input based on a user's past letter or typing selections (e.g., user typed 'mis' and predictive input determines 'miss' and 'mist' as highest probability options), (2) menu interface: after splitting 'Audio Settings' into smaller regions presenting a fifth distinct selectable region that presents 'Volume Up' (i.e., a single control option associated with a single control function) and a sixth distinct selectable region that presents 'Volume Down' (i.e., a single control option associated with a single control function), where each option may execute only its designated adjustment, or (3) streaming application UI: after splitting 'Classic Comedy,' presenting a fifth distinct selectable region associated with the movie 'Airplane!' (e.g., associated with only a 'Play' function) and a sixth distinct selectable region associated with the movie 'Caddyshack' (e.g., associated with only a 'Play' function), where each movie (i.e., control option) corresponds to a function of playing exactly one media item.

Some disclosed embodiments further include receiving a selection of the sixth distinct selectable region and in response thereto, executing the single control function associated with the one or more sixth control options. When a selection of a distinct selectable region is received (as described and exemplified herein), where the distinct selectable region is associated with a single control function, the associated single control function may be executed in response to the selection. Executing a control function refers to a computing device or user interface performing an action, operation, or command in response to a user selection of system instruction. Executing a control function may cause a specific effect or change in the system, application, or environment, corresponding to the intended purpose of the selected control option. Executing a control function may be triggered by a user action (e.g., selecting a key, icon, or region) or by a programmatic instruction (e.g., automatic execution of a control function associated with a control option based on convergence). Executing a control function may include carrying out the operation associated with the selected control option. Executing a control function may alter the display, modify data, activate a device feature, or perform any other defined operational behavior. Examples of executing a control function may include: (1) virtual keyboard: selecting the key 'A' of a virtual keyboard may execute the control function of entering the character 'A' into a text field, displaying the 'A' character at the display, or otherwise presenting the 'A' letter (e.g., presented by a speaker system), (2) menu interface: selecting the 'Volume Up' option may execute the control function of increasing the system's audio output level, (3) map application: selecting a location marker may execute the control function of zooming to or highlight that location, (4) streaming application UI: selecting a movie thumbnail may execute the control function of initiating playback of that specific movie, or (5) device settings: selecting 'Enable Wi-Fi" may execute the control function of activating the wireless network interface for wireless connection or networking via Wi-Fi.

Some disclosed embodiments involve automatically executing a control function associated with a control option upon convergence, wherein convergence includes a distinct selectable region including only a single control option. This may refer to a process where, once convergence occurs (e.g., when a distinct selectable region includes only one control option) the system automatically triggers or executes the function associated with that option. This may include triggering or executing the function associated with that option without requiring further user confirmation or input. In some embodiments, this may include the UI segmentation process (e.g., selection and partitioning process) narrowing down a user's selection to one control option, and upon narrowing down to one control option, the processor (e.g., associated with a UI segmentation system) may interpret this as the user's intended choice and perform the corresponding control function automatically. For example, automatically executing a control function upon convergence may include: (1) menu narrowing, where a menu of an application may be partitioned until only the region containing the "Save File" control option remains, and the control function associated with the "Save File" control option may be automatically executed without requiring further user selection, (2) voice-based segmentation, where a voice-controlled system refines regions associated with control options ("Open," "Update," "Refresh") based on user speech, and when the system converges to the region containing control option "Update" automatically executing the associated control function, or (3) gesture interface, where a user's finger movement is captured (e.g., received indirectly) to receive the user input, three distinct selectable regions are each associated with one of ("Zoom In," "Zoom Out," "Capture"), and based on the user's finger movement determining that the user selected the region containing the "Capture" control option, then subsequently and automatically executing the control function associated with the "Capture" control option.

In some disclosed embodiments, executing the single control function associated with the one or more sixth control options includes displaying a character. As discussed above, the one or more sixth control options may include a single control option associated with a single control function. Thus, when the user selects the one sixth control option in this context (e.g., selecting a single control option associated with a single control function), the single control function may specifically result in showing or rendering a character on the display. A character may include any symbol, letter, digit, mark, or other item that is part of an alphabet (as described and exemplified herein), numeral system, character set, or symbolic language (e.g., emoji). Displaying may refer to display in a text field, a message box, a document editor, or any other user interface location where visual feedback may be provided. Examples of executing the sixth control option may include: (1) virtual keyboard: the sixth distinct selectable region may display the touchscreen key for "A," where the one or more sixth control options may be a single control option for 'insert character "A",' and executing the associated single control function for 'insert character "A"' may cause the letter "A" to appear in the active text input field, (2) calculator application: the sixth distinct selectable region may display only the on-screen button "7," the one or more sixth control options (e.g., one sixth control option) may be the single control option for 'insert digit "7",' and executing the control function for 'insert digit "7"' may display "7" in the calculator's input window, or (3) programming Integrated Development Environment (IDE): the sixth distinct selectable region may display the key or shortcut for the "{" character, the one or more sixth control options may be the single control option for 'insert "{",' and the execution of the single control function may include "{" displayed in the code editor of the IDE.

In some disclosed embodiments, following the display of a single alphanumeric character, the operations further include presenting alphanumeric characters of an alphabet in two groups on the display and receiving a selection of one of the two groups. This may refer to, when a single alphanumeric character (e.g., a letter or digit) is already shown on the display as a result of a prior input or execution of a control function, two separate groups of alphabet characters may be presented in two distinct selectable regions of a display. A user may select one of the two groups, where each of the groups may be associated with a distinct selectable region, such that the user may progressively refine the available control options. Examples of may include: (1) on-screen text input: a user selects a control option that displays the character 'C,' and the system splits the alphabet into two groups (e.g., group 1 with letters 'A' through 'M' and group 2 with letters 'N' through 'Z'), where the groups are displayed in two distinct selectable regions, and the user may select one of the two groups to narrow down possible letters, (2) numeric entry: the digit "4" is displayed, and the system presents two groups of digits (e.g., group 1 with numbers '0' through '4' and group 2 with numbers '5' through '9'), where the user may select one of the groups to narrow down possible numbers, (3) language-based input (e.g., foreign script): where a character from a script may be displayed, the alphabet may then be displayed as grouped into two groups (e.g., group 1 of vowels and group 2 of consonants), where the groups appear in two regions of the UI, and the user may select the consonant or the vowel group to further refine input, or (4) emoji or symbol entry: after showing an emoji, the system may partition and display the alphabet of emojis in two groups (e.g., group 1 of facial expressions and group 2 of objects and animals), where the user may select a group of emojis.

In some disclosed embodiments, executing the single control function associated with the one or more sixth control options includes causing presentation of words. The presentation of words refers to a display of one or more words. A word may be any sequence of characters (e.g., letters, numbers, or symbols) that may form a recognizable linguistic or symbolic unit. Causing presentation of words may provide content (text), show selectable options, label controls, or present system feedback. The presented words may be drawn from a dictionary, a user's input history, a predictive model, or may be predefined as part of the interface or a language of the interface. Examples of executing the single control option associated with the one or more sixth control options to cause presentation of words may include: (1) text input system (predictive typing): a user may select a region containing a control option that is a single key (e.g., 'W'), the system may execute the control function associated with the single key by displaying suggested words such as "when", "where", or "word", (2) command execution (menu system): a user may select a sixth distinct selectable region associated with a single control function, and the display may respond by showing words such as "Open", "Save", and "Close" as menu options, (3) educational application (language learning): selecting a distinct selectable region presenting a control option of 'Start Lesson 1' may cause the system to display words in a target language (e.g., "gato", "perro", "caballo" in Spanish), and the words may serve as learning content for the user, and further, there may be flashcards or images displayed representing the associated word for learning purposes, (4) accessibility interface (speech-to-text aid): a control function may be executed that displays spoken words in text form on the screen, which may help or allow a user to follow a conversation, or (5) gaming or storytelling application: selecting a region displaying a control option may trigger the display of narrative words such as "You have entered the castle."

In some disclosed embodiments, executing the single control function associated with the one or more sixth control options includes executing a computer function. A computer function may include any operation, process, task, or routine performed by the computing device's or system's hardware, software, or a combination of both in response to the user input, instruction, or an event. A computer function may involve manipulating data, controlling resources, producing output, or enabling communications. A computer function may be low-level (e.g., system operations), mid-level (e.g., application-specific tasks), or high-level (e.g., user-facing features). A computer function may execute automatically, be triggered by user interaction, or result from programmed instructions. Computer functions may include system-level functions (e.g., managing files (open, save, delete), adjusting device settings, or allocating memory or processing resources), application-specific functions (e.g., formatting text in a word processor, applying a filter in an image editor, running a calculation in a spreadsheet), user-facing functions (e.g., displaying an alphanumeric character when a key is pressed, playing a video when a media control is activated, sending a message when a "send" button is selected), background or utility functions (e.g., synchronizing data with cloud storage, running an antivirus scan, checking for software updates, initiating a network connection), or hardware interaction functions (e.g., printing a document, capturing an image from a camera, recording audio from a microphone). A computer function may result in visible feedback on the display, a change in device behavior, or a modification of stored data. Examples of executing the single control function associated with the one or more sixth control options to execute a computer function may include: (1) system operation: a user may select the sixth distinct selectable region, which is associated with the control function "Save" and may execute the computer function to cause the device to save a document to memory, (2) application function: a drawing application may have a control option linked to the function "apply grayscale filter," and when executed, the computer function may convert the image to grayscale, (3) hardware interaction: selecting a region presenting a control option associated with brightness control may result in the execution of a computer function that adjusts the screen brightness, (4) network function: selection of a region containing a control option may result in the execution of the function "send email," and the system may connect to a mail server and transmit the message, or (5) background or utility function: a user may select region displaying a control option labeled "update," which may result in the execution of the associated computer function, which may initiate a software update check in the background.

Some disclosed embodiments further include receiving a selection of the sixth distinct selectable region and in response thereto, outputting fourth control signals dividing contents of the sixth distinct selectable region into at least a seventh distinct selectable region and an eighth distinct selectable region. This refers to a selection of a distinct selectable region (as described and exemplified elsewhere herein) by a user, and in response to the selection, generating signals for partitioning the distinct selectable region (as described and exemplified elsewhere herein), such that the partitioning results in two or more newly presented or partitioned distinct selectable regions, including a seventh distinct selectable region and an eighth distinct selectable region, which may allow for or enable a finer granularity of user choice, convergence toward the presentation of a single control option or execution of a single control function, or may expand user control by presenting new subsets of control options or content.

By way of a nonlimiting example, FIGS. 6B-7A illustrate receiving a selection of the sixth distinct selectable region and in response thereto, outputting fourth control signals dividing contents of the sixth distinct selectable region into at least a seventh distinct selectable region and an eighth distinct selectable region. For example, in FIG. 6B, sixth distinct selectable region 314 presented by display 300 is selected. This may result in a change of visual emphasis between fifth distinct selectable region 312, which is not selected, and sixth distinct selectable region 314, which is selected. Additionally, since sixth distinct selectable region 314 is selected, only the control options displayed in sixth distinct selectable region 314 are still presented in a region selectable by the user. Sixth distinct selectable region 314 of display 300 is selected and contains control options, where each control option 302*a* presented in the sixth distinct selectable region 314 is included in the sixth control options. In response to the selection of sixth distinct selectable region 314, signals may be output to partition sixth distinct selectable region 314. In FIG. 7A, seventh distinct selectable region 316 and eighth distinct selectable region 318 are presented by display 300. Seventh distinct selectable region 316 and eighth distinct selectable region 318 each contain a subset of the one or more sixth control options and collectively contain the one or more sixth control options. The sixth control options have been partitioned such that seventh distinct selectable region 316 contains a portion of the one or more sixth control options and eighth distinct selectable region 318 contains the remaining portion of the one or more sixth control options.

By way of nonlimiting examples, FIGS. 10-11B illustrate receiving a selection of the sixth distinct selectable region and in response thereto, outputting fourth control signals dividing contents of the sixth distinct selectable region into at least a seventh distinct selectable region and an eighth distinct selectable region. For example, in FIG. 10 and FIG. 11A, sixth distinct selectable region 1016 presented by keyboard 1002 is selected. For an exemplary virtual keyboard, this may result in a change of visual emphasis between fifth distinct selectable region 1014, which is not selected, and sixth distinct selectable region 1016, which was selected. Additionally, for keyboard 1002, since sixth distinct selectable region 1016 was selected, only the control options (represented by each of key 1004*a* presented in sixth distinct selectable region 1016) in sixth distinct selectable region 1016 are available for selection by the user. Sixth distinct selectable region 1016 of display 300 is selected and contains control options, where each key 1004*a* presented in the sixth distinct selectable region 1016 is included in the one or more sixth control options. In response to the selection of sixth distinct selectable region 1016, signals may be output to partition sixth distinct selectable region 1016. In FIG. 10 and FIG. 11B, seventh distinct selectable region 1018 and eighth distinct selectable region 1020 are presented by display 300. Seventh distinct selectable region 1018 and eighth distinct selectable region 1020 each include a subset of the one or more sixth control options and collectively contain the one or more sixth control options. The sixth control options have been partitioned such that seventh distinct selectable region 1018 contains a portion of the sixth control options and eighth distinct selectable region 1020 contains the remaining portion of the sixth control options.

Some disclosed embodiments further include, in response to receiving a selection of the eighth distinct selectable region, dividing contents of the eighth distinct selectable region into a ninth distinct selectable region and a tenth distinct selectable region. This refers to a selection of a distinct selectable region (as described and exemplified elsewhere herein) by a user, and in response to the selection, generating signals (e.g., control signals) for partitioning the distinct selectable region (as described and exemplified elsewhere herein), such that the partitioning results in two newly presented or partitioned distinct selectable regions, including a ninth distinct selectable region and a tenth distinct selectable region, which may allow for or enable a finer granularity of choice for the selection of user controls and may expand user control by presenting subsets of prior-presented control options or content.

By way of a nonlimiting example, FIGS. 7B-8A illustrate in response to receiving a selection of the eighth distinct selectable region, dividing contents of the eighth distinct selectable region into a ninth distinct selectable region and a tenth distinct selectable region. For example, in FIG. 7B, eighth distinct selectable region 318 presented by display 300 is selected. This may result in a change of visual emphasis between seventh distinct selectable region 316, which is not selected, and eighth distinct selectable region 318, which was selected. Additionally, since eighth distinct selectable region 318 was selected, only the control options displayed in eighth distinct selectable region 318 are still presented in a region selectable by the user. Eighth distinct selectable region 318 of display 300 is selected and contains control options, where each control option 302*a* presented in the eighth distinct selectable region 318 is included in the eighth control options. In response to the selection of eighth distinct selectable region 318, signals may be output to partition eighth distinct selectable region 318. In FIG. 8A, ninth distinct selectable region 320 and tenth distinct selectable region 322 are presented by display 300. Ninth distinct selectable region 320 and tenth distinct selectable region 322 may each include a subset of the eighth control options and collectively contain the eighth control options. The eighth control options have been partitioned such that ninth distinct selectable region 320 contains a portion of the eighth control options and tenth distinct selectable region 322 contains the remaining portion of the eighth control options.

By way of nonlimiting examples, FIG. 10 and FIG. 11B illustrate in response to receiving a selection of the eighth distinct selectable region, dividing contents of the eighth distinct selectable region into a ninth distinct selectable region and a tenth distinct selectable region. For example, in FIG. 10 and FIG. 11A, eighth distinct selectable region 1020 presented by keyboard 1002 is selected. For an exemplary virtual keyboard, this may result in a change of visual emphasis between seventh distinct selectable region 1018, which is not selected, and eighth distinct selectable region 1020, which was selected. Additionally, for keyboard 1002, since eighth distinct selectable region 1020 was selected, only the control options (e.g., represented by each of key 1004*a* presented in eighth distinct selectable region 1020) in eighth distinct selectable region 1020 are available for selection by the user. Eighth distinct selectable region 1020 of display 300 is selected and contains control options, where each key 1004*a* presented in the eighth distinct selectable region 1020 is included in the eighth control options. In response to the selection of eighth distinct selectable region 1020, signals may be output to partition eighth distinct selectable region 1020. In FIG. 10 and FIG. 11B, ninth distinct selectable region 1022 and tenth distinct selectable region 1024 are presented by display 300. Ninth distinct selectable region 1022 and tenth distinct selectable region 1024 may each present a portion of the eighth control options and collectively contain the eighth control options. The eighth control options have been partitioned such that ninth distinct selectable region 1022 contains a portion of the eighth control options and tenth distinct selectable region 1024 contains the remaining portion of the eighth control options.

In some disclosed embodiments, each of the ninth distinct selectable region and the tenth distinct selectable region contain only a single control option corresponding to only a single control function. This refers to the ninth distinct selectable region presenting or being associated with only one control option and the tenth distinct selectable region presenting or being associated with only one control option, where each control option is associated with a single control function. In this arrangement, each control option within the newly presented or partitioned, selectable regions (e.g., the ninth distinct selectable region and the tenth distinct selectable region) corresponds to an action, command, or input. This arrangement may allow the user to precisely choose or select a single function or target item and may indicate the completion of an iterative refinement process of the interface (e.g., convergence). Moreover, in this arrangement, after a user selection of the single control option associated with the single control function, the system or process may initiate another iterative refinement process based on the executed control function. Additionally, another iterative refinement process of the interface may be initiated by starting from the initial first distinct selectable region associated with the first plurality of control options and the initial second distinct selectable region associated with the second plurality of control options. This arrangement may allow for or enable clarity by visually representing or isolating the individual control options, such that each one may perform only one distinct action when selected. An example of each of the ninth distinct selectable region and the tenth distinct selectable region presenting only a single control option corresponding to only a single control function may include a virtual keyboard, where after subdividing a distinct selectable region of letters 'A' and 'B,' presenting a ninth distinct selectable region associated with the letter 'A' (e.g., a single control option associated with a single control function) and a tenth distinct selectable region associated with the letter 'B' (e.g., a single control option associated with a single control function), where each key represents only a single letter input. In some disclosed embodiments, the single control option includes a single alphanumeric character (as described and exemplified elsewhere herein), where the single control function may be presented in or associated with the ninth distinct selectable region or the tenth distinct selectable region. In some disclosed embodiments, the single control function includes displaying the single alphanumeric character (as described and exemplified elsewhere herein), where the single control function may be associated with the ninth distinct selectable region or the tenth distinct selectable region.

In some disclosed embodiments, the operations further include, in response to receiving a selection of the tenth distinct selectable region, executing the single control function associated with the tenth distinct selectable region. This refers to executing a control function (as described and exemplified elsewhere herein), where the control function is associated with the single control option (as described and exemplified elsewhere herein) that is presented by the tenth distinct selectable region.

Some disclosed embodiments involve a pair of control elements, each corresponding to one of a pair of differing distinct selectable regions. A pair of control elements (e.g., physical buttons, virtual buttons, touch zones, toggles, icons) may each be linked to one distinct selectable region of the interface, where the pair of control elements is linked to different distinct selectable regions, such that when a user activates (e.g., by pressing, clicking, tapping, or gesturing toward) one of these control elements, the activation of one of a pair of control elements may therefore result in selection of the linked distinct selectable region (e.g., the first of the pair is linked to the first distinct selectable region and the second of the pair is linked to the second distinct selectable region). Upon the selection of a distinct selectable region by an activation one of the pair of control elements, the distinct selectable region may be partitioned into two newly presented or partitioned distinct selectable regions, where these two newly presented or partitioned distinct selectable regions may each be separately associated with one of the pair of control elements.

In some disclosed embodiments, a first of the pair of control elements is associated with receiving a selection of a first of the pair of differing distinct selectable regions, and a second of the pair of control elements is associated with receiving a selection of the second of the pair of differing distinct selectable regions. This may refer to where one of the pair of control elements is linked to a distinct selectable region (e.g., first distinct selectable region) and the other of the pair of control elements is linked to another distinct selectable region (e.g., second distinct selectable region). Upon the selection of the second distinct selectable region, by the activation of the second of the pair of control elements, the second distinct selectable region may be partitioned into two distinct selectable regions (e.g., a third distinct selectable region and a fourth distinct selectable region). As an example, a third distinct selectable region may be associated with one of the pair of control elements, and a fourth distinct selectable region may be associated with the other of the pair of control elements. Upon receiving a selection of the fourth distinct selectable region by the activation of the other of the pair of control elements (e.g., the second of the pair of control elements), the fourth distinct selectable region may be partitioned into two new distinct selectable regions, and the newly resulting partitions may be individually associated with the pair of control elements. This process may continue on until the progressive UI segmentation reaches convergence. Further, this progressive UI segmentation process and the association of the pair of control elements may terminate with convergence at any number of segmentation iterations.

Some disclosed embodiments involve a pair of control elements each corresponding to a pair of differing distinct selectable regions, and wherein receiving selection of the second distinct selectable region and the fourth distinct selectable region occurs in response to an activation of an associated one of the pair of control elements. A pair of control elements (e.g., physical buttons, virtual buttons, touch zones, toggles, icons) may each be linked to two different distinct selectable regions of the interface, such that when a user activates (e.g., by pressing, clicking, tapping, or gesturing toward) one of these control elements, the activation of one of a pair of control elements may therefore result in selection of the two separate display regions (e.g., the second distinct selectable region and the fourth distinct selectable region). In some disclosed embodiments, the pair of control elements includes a pair of physical buttons or virtual buttons, as described earlier.

By way of a non-limiting example, reference is made to FIGS. 3-9B illustrating a user interface following six successive partitions, before and after receiving six successive selections, consistent with some disclosed embodiments. At least one processor (e.g., processor 102 of FIG. 1) may indicate non-selected partitions, e.g., by using a faded and/or black and white color scheme, to contrast non-selected partitions from a selected partition. Each successive partition may halve a size of the user interface, e.g., until the user interface includes only a single control element in a selected partition. In some embodiments, upon reducing a size of a selected partition such that only a single control element remains, at least one processor may automatically select the single remaining control element.

By way of another non-limiting example, reference is made to FIG. 10 illustrating successive partitions of a virtual keyboard, consistent with some disclosed embodiments. For example, the virtual keyboard of FIG. 10 may be displayed on display 110 of FIG. 1. Each partition may divide the number of available keys for selection approximately by two. In some embodiments, a user interface presenting a plurality of control elements may be partitioned based on the number of remaining selectable control elements, such that the number of remaining selectable control elements is halved after each partition. In some embodiments, a user interface presenting a plurality of control elements may be partitioned based on size, such that the number of remaining selectable control elements may be more or less than half after each partition, e.g., if the control elements are not uniform in size. As shown in FIG. 10, after a sixth partition, a single key remains for selection, e.g., representing the alphanumeric letter "T". In some embodiments, after partitioning the keyboard until a single key remains available for selecting, at least one processor may automatically select the single remaining key.

FIGS. 11A-11B illustrate an alternative approach in which two selectable regions persist at each step. Instead of visually masking the unselected portion, the interface maintains both regions with borders or shading, ensuring that the user is presented with a clear choice between two equally emphasized options. Each row in FIGS. 11A-11B illustrate a keyboard before and after selection of a section.

At the initial stage (FIG. 11A, top left), the full keyboard is divided into two sections, with each section highlighted by a different border (e.g., solid and dashed lines) to indicate its selection eligibility. Upon user input selecting or indicating one of the two regions, the system performs another division, but both newly formed, presented, or partitioned regions remain fully visible and distinguishable. This continues iteratively, with each step reducing the number of selectable options while preserving two contrasting areas to maintain clarity.

This method provides a visual reinforcement of choice at every stage, reducing ambiguity and improving the user experience. Additionally, maintaining both sections visible rather than progressively dimming or masking one may enhance accessibility, particularly for users with cognitive or visual impairments. The use of two shades and/or borders further differentiates the options, ensuring an intuitive interaction model that does not rely solely on contrast or brightness changes.

Figure 12:
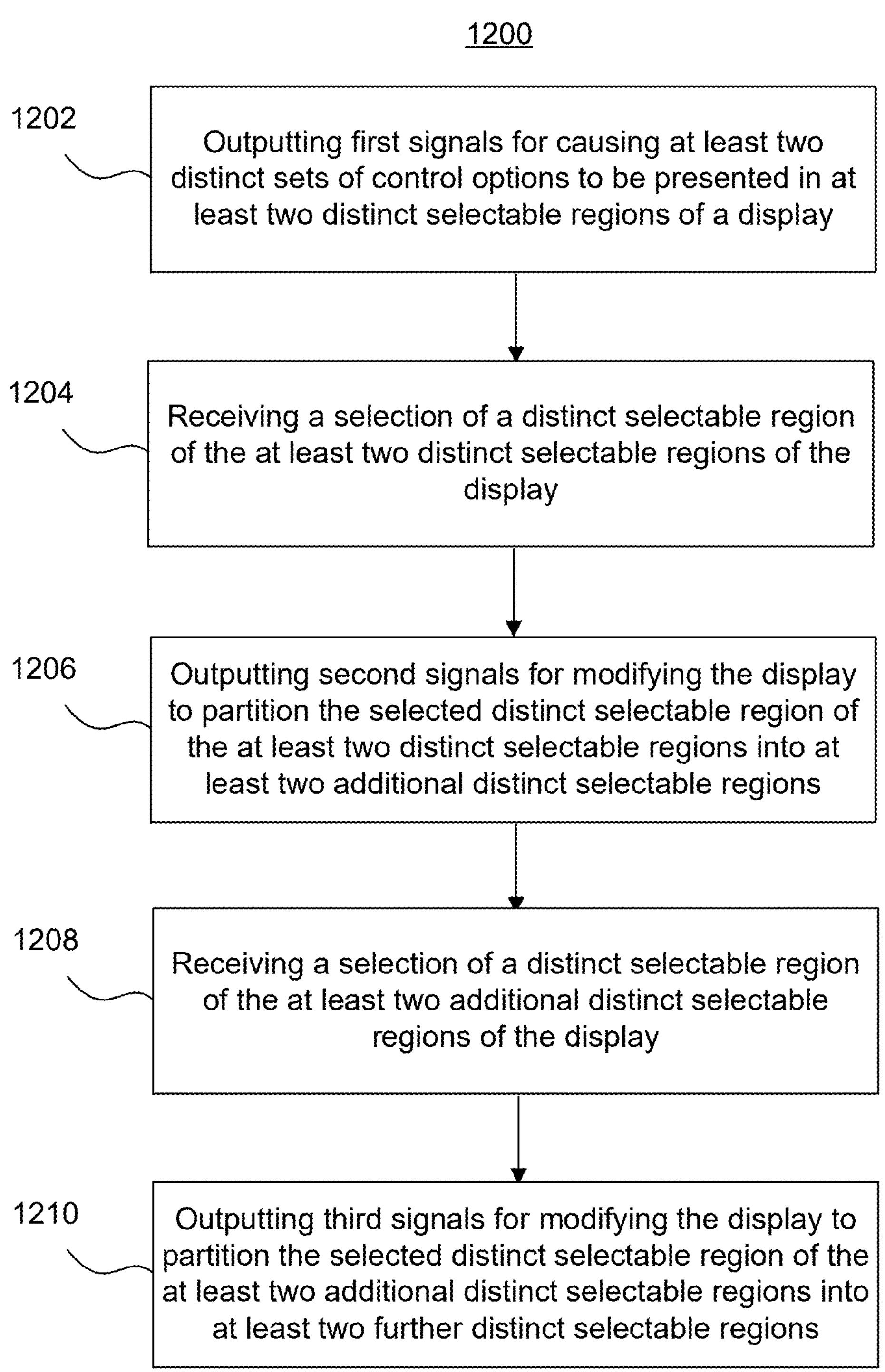
FIG. 12 is a flow chart of an example process for control option segmentation, consistent with some disclosed embodiments.

FIG. 12 is a flowchart of example process 1200 for control option segmentation (e.g., user interface control via control option segmentation, progressive UI segmentation for precision selection), consistent with some disclosed embodiments. In some embodiments, process 1200 may be performed by at least one processor (e.g., processor 102 in FIG. 1) to perform operations or functions described herein. In some embodiments, process 1200 may be implemented as software (e.g., program codes, instructions) that are stored in a memory (e.g., memory 104 in FIG. 1) or a non-transitory computer readable medium. In some embodiments, some aspects of process 1200 may be implemented as hardware (e.g., a specific-purpose circuit). In some embodiments, process 1200 may be implemented as a combination of software and hardware.

Referring to FIG. 12, process 1200 may include step 1202 of outputting first signals for causing at least two distinct sets of control options to be presented in at least two distinct selectable regions of a display. Some embodiments may involve outputting first signals for causing at least two distinct sets of control options to be presented in at least two distinct selectable regions of a display, wherein the at least two distinct sets of control options include a first plurality of control options displayed in a first distinct selectable region of the at least two distinct selectable regions and a second plurality of control options displayed in a second distinct selectable region of the at least two distinct selectable regions.

Process 1200 may include step 1204 of receiving a selection of a distinct selectable region of the at least two distinct selectable regions of the display. Some disclosed embodiments may involve receiving a selection of the second distinct selectable region. In some embodiments, a selection of the distinct selectable regions may be received directly or indirectly.

Process 1200 may include step 1206 of outputting second signals for modifying the display to partition the selected distinct selectable region of the at least two distinct selectable regions into at least two additional distinct selectable regions. Some disclosed embodiments may involve, in response to receipt of the selection of the second distinct selectable region, outputting second signals for modifying the display to partition the second distinct selectable region into at least two additional distinct selectable regions including a third plurality of control options that are caused to be displayed in a third distinct selectable region of the at least two additional distinct selectable regions and a fourth plurality of control options that are caused to be displayed in a fourth distinct selectable region of the at least two additional distinct selectable regions. In some embodiments, the partitioning of a distinct selectable region may involve subdividing control options into subsets of an originally presented set of control options.

Process 1200 may include step 1208 of receiving a selection of a distinct selectable region of the at least two additional distinct selectable regions of the display. Some disclosed embodiments may involve receiving a selection of the fourth distinct selectable region.

Responsive to a selection of the plurality of control options, process 1200 may include step 1210 of outputting third signals for modifying the display to partition the selected distinct selectable region of the at least two additional distinct selectable regions into at least two further distinct selectable regions. Some disclosed embodiment may involve, in response to receipt of the selection of the fourth plurality of control options, outputting third control signals for modifying the display to partition the fourth plurality of control options into at least two further distinct selectable regions including a one or more fifth control options that are caused to be displayed in a fifth distinct selectable regions and one or more sixth control options that are caused to be displayed in a sixth distinct selectable region.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The elements in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Various terms used in the specification and claims may be defined or summarized differently when discussed in connection with differing disclosed embodiments. It is to be understood that the definitions, summaries, and explanations of terminology in each instance apply to all instances, even when not repeated, unless the transitive definition, explanation or summary would result in inoperability of an embodiment.

Unless otherwise defined, all technical and scientific terms used herein have the same meaning as commonly understood by one of ordinary skill in the art. The materials, methods, and examples provided herein are illustrative only and not intended to be limiting.

As used herein, the term "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

The computing units and other functional units described in the present disclosure can be implemented by hardware, or software, or a combination of hardware and software. One of ordinary skill in the art will also understand that multiple ones of the above-described modules/units can be combined as one module or unit, and each of the above-described modules/units can be further divided into a plurality of sub-modules or sub-units.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally include a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a touch-sensitive layer such as a touchscreen, or keyboard and a pointing device (e.g., a mouse or a trackball), by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

The invention claimed is:

1. A non-transitory computer readable medium containing instructions that when executed by at least one processor cause the at least one processor to implement operations for user interface control via control option segmentation, the operations comprising:

outputting first signals for partitioning an initial selectable region, including a set of control options, into at least two distinct subsets of control options to be presented in at least two distinct selectable regions of a display, wherein the at least two distinct sets subsets of control options include a first plurality of a subset of control options displayed in a first distinct selectable region of the at least two distinct selectable regions and a second plurality of a subset of control options displayed in a second distinct selectable region of the at least two distinct selectable regions, and wherein the first and the second subsets of control options are subsets of the initial set of control options;

receiving a selection of the second distinct selectable region;

in response to receipt of the selection of the second distinct selectable region, outputting second signals for modifying the display to:

cause the second distinct selectable region to be displayed with a visual emphasis over the first distinct selectable region on the display;

maintain display of the first distinct selectable region while disabling the first distinct selectable region from further selection and displaying the first distinct selectable region with reduced visual emphasis relative to the second distinct selectable region; and partition the second distinct selectable region into at least two additional distinct selectable regions including a third plurality of control options that are caused to be displayed in a third distinct selectable region of the at least two additional distinct selectable regions and a fourth plurality of control options that are caused to be displayed in a fourth distinct selectable region of the at least two additional distinct selectable regions;

receiving a selection of the fourth distinct selectable region; and in response to receipt of the selection of the fourth distinct selectable region, outputting third control signals for modifying the display to partition the fourth distinct selectable region into at least two further distinct selectable regions including one or more fifth control options that are caused to be displayed in a fifth distinct selectable region of the at least two further distinct selectable regions and one or more sixth control options that are caused to be displayed in a sixth distinct selectable region of the at least two further distinct selectable regions;

wherein each partitioning of a selectable region partitions a selected subset of control options into at least two further subsets of control options, each further subset being a subset of the selected subset of control options;

wherein each of the one or more fifth control options and the one or more sixth control options include only a single control option associated with a single control function;

receiving a selection of the sixth distinct selectable region; and in response to receipt of the selection of the sixth distinct selectable region, executing the single control function associated with the one or more sixth control options, wherein executing the single control function includes executing a computer function, wherein, in response to each selection of a selectable region resulting from a partitioning, the selected selectable region is displayed with visual emphasis, and one or more other selectable regions resulting from the partitioning are subjected to at least one of being disabled from further selection while remaining displayed or being removed from the display.

2. The non-transitory computer readable medium of claim 1, wherein executing the single control function associated with the one or more sixth control options includes displaying a character.

3. The non-transitory computer readable medium of claim 1, wherein executing the single control function associated with the one or more sixth control options includes causing presentation of words.

4. The non-transitory computer readable medium of claim 1, wherein the operations further include:

receiving a selection of the sixth distinct selectable region and in response thereto, outputting fourth control signals dividing contents of the sixth distinct selectable region into at least a seventh distinct selectable region and an eighth distinct selectable region;

in response to receiving a selection of the eighth distinct selectable region, dividing contents of the eighth distinct selectable region into a ninth distinct selectable region and a tenth distinct selectable region, each of the ninth distinct selectable region and the tenth distinct selectable region containing only a single control option corresponding to only a single control function; and in response to receiving a selection of the tenth distinct selectable region, executing the single control function associated with the tenth distinct selectable region.

5. The non-transitory computer readable medium of claim 1, wherein the first plurality of control options and the second plurality of control options collectively include all characters of an alphabet.

6. The non-transitory computer readable medium of claim 1, wherein the at least two distinct sets of control options include at least three distinct sets of control options to be presented in at least three distinct selectable regions of the display.

7. The non-transitory computer readable medium of claim 1, wherein receiving a selection of the second distinct selectable region causes the first distinct selectable region to disappear from the display.

8. The non-transitory computer readable medium of claim 1, wherein the visual emphasis includes changing a relative intensity between the first distinct selectable region and the second distinct selectable region.

9. The non-transitory computer readable medium of claim 1, wherein the visual emphasis includes an enlarged graphical property.

10. The non-transitory computer readable medium of claim 1, wherein the visual emphasis includes an increase in brightness.

11. The non-transitory computer readable medium of claim 1, wherein following a display of a single alphanumeric character, the operations further include presenting alphanumeric characters of an alphabet in two groups on the display and receiving a selection of one of the two groups.

12. The non-transitory computer readable medium of claim 1, wherein at least a portion of at least one of the third distinct selectable region and the fourth distinct selectable region occupies a location on the display previously occupied by at least a portion of the first distinct selectable region and the second distinct selectable region.

13. The non-transitory computer readable medium of claim 1, wherein the selection of the distinct selectable regions is received by associating a first actuatable portion of a UI control device with one of the presented distinct selectable regions and a second actuatable portion of a UI control device with another one of the presented distinct selectable regions and having a user physically actuating one of the portions.

14. The non-transitory computer readable medium of claim 1, wherein the selection of the distinct selectable regions is received indirectly.

15. The non-transitory computer readable medium of claim 14, wherein receiving indirectly includes receiving remote indication from a user.

16. The non-transitory computer readable medium of claim 15, wherein receiving indirectly includes determining that the indication is associated with one of the at least two distinct sets of control options.

17. The non-transitory computer readable medium of claim 16, wherein receiving indirectly includes initiating the output of signals for partitioning of the selected distinct selectable region.

18. The non-transitory computer readable medium of claim 1, wherein the control options include at least one of an icon associated with running a software application, a screen area capturable as a screen shot, a screen area selected for zooming in, or a keyboard key.

19. The non-transitory computer readable medium of claim 1, further comprising automatically executing a control function associated with a control option upon convergence, wherein convergence includes a distinct selectable region including only a single control option.

20. The non-transitory computer readable medium of claim 1, wherein the partitioning occurs based on a probability of selection of a partitioned distinct selectable region associated with one or more control options.

21. A control option segmentation method, comprising:

outputting first signals for partitioning an initial selectable region, including a set of control options, into at least two distinct subsets of control options to be presented in at least two distinct selectable regions of a display, wherein the at least two distinct sets subsets of control options include a first plurality of a subset of control options displayed in a first distinct selectable region of the at least two distinct selectable regions and a second plurality of a subset of control options displayed in a second distinct selectable region of the at least two distinct selectable regions, and wherein the first and the second subsets of control options are subsets of the initial set of control options;

receiving a selection of the second distinct selectable region;

in response to receipt of the selection of the second distinct selectable region, outputting second signals for modifying the display to:

cause the second distinct selectable region to be displayed with a visual emphasis over the first distinct selectable region on the display;

maintain display of the first distinct selectable region while disabling the first distinct selectable region from further selection and displaying the first distinct selectable region with reduced visual emphasis relative to the second distinct selectable region; and partition the second distinct selectable region into at least two additional distinct selectable regions including a third plurality of control options that are caused to be displayed in a third distinct selectable region of the at least two additional distinct selectable regions and a fourth plurality of control options that are caused to be displayed in a fourth distinct selectable region of the at least two additional distinct selectable regions;

receiving a selection of the fourth distinct selectable region; and in response to receipt of the selection of the fourth distinct selectable region, outputting third control signals for modifying the display to partition the fourth distinct selectable region into at least two further distinct selectable regions including one or more fifth control options that are caused to be displayed in a fifth distinct selectable region of the at least two further distinct selectable regions and one or more sixth control options that are caused to be displayed in a sixth distinct selectable region of the at least two further distinct selectable regions;

wherein each partitioning of a selectable region partitions a selected subset of control options into at least two further subsets of control options, each further subset being a subset of the selected subset of control options;

wherein each of the one or more fifth control options and the one or more sixth control options include only a single control option associated with a single control function;

receiving a selection of the sixth distinct selectable region; and in response to receipt of the selection of the sixth distinct selectable region, executing the single control function associated with the one or more sixth control options, wherein executing the single control function includes executing a computer function;

wherein, in response to each selection of a selectable region resulting from a partitioning, the selected selectable region is displayed with visual emphasis, and one or more other selectable regions resulting from the partitioning are subjected to at least one of being disabled from further selection while remaining displayed or being removed from the display.

22. A system for enabling control option segmentation, the system comprising:

at least one processor configured to:

outputting first signals for partitioning an initial selectable region, including a set of control options, into at least two distinct subsets of control options to be presented in at least two distinct selectable regions of a display, wherein the at least two distinct sets subsets of control options include a first plurality of a subset of control options displayed in a first distinct selectable region of the at least two distinct selectable regions and a second plurality of a subset of control options displayed in a second distinct selectable region of the at least two distinct selectable regions, and wherein the first and the second subsets of control options are subsets of the initial set of control options;

receive a selection of the second distinct selectable region;

in response to receipt of the selection of the second distinct selectable region, output second signals for modifying the display to:

cause the second distinct selectable region to be displayed with a visual emphasis over the first distinct selectable region on the display;

maintain display of the first distinct selectable region while disabling the first distinct selectable region from further selection and displaying the first distinct selectable region with reduced visual emphasis relative to the second distinct selectable region; and partition the second distinct selectable region into at least two additional distinct selectable regions including a third plurality of control options that are caused to be displayed in a third distinct selectable region of the at least two additional distinct selectable regions and a fourth plurality of control options that are caused to be displayed in a fourth distinct selectable region of the at least two additional distinct selectable regions;

receive a selection of the fourth distinct selectable region; and in response to receipt of the selection of the fourth distinct selectable region, output third control signals for modifying the display to partition the fourth distinct selectable region into at least two further distinct selectable regions including one or more fifth control options that are caused to be displayed in a fifth distinct selectable region of the at least two further distinct selectable regions and one or more sixth control options that are caused to be displayed in a sixth distinct selectable region of the at least two further distinct selectable regions;

wherein each partitioning of a selectable region partitions a selected subset of control options into at least two further subsets of control options, each further subset being a subset of the selected subset of control options wherein each of the one or more fifth control options and the one or more sixth control options include only a single control option associated with a single control function;

receive a selection of the sixth distinct selectable region; and in response to receipt of the selection of the sixth distinct selectable region, execute the single control function associated with the one or more sixth control options, wherein executing the single control function includes executing a computer function;

wherein, in response to each selection of a selectable region resulting from a partitioning, the selected selectable region is displayed with visual emphasis, and one or more other selectable regions resulting from the partitioning are subjected to at least one of being disabled from further selection while remaining displayed or being removed from the display.

23. The system of claim 22, further comprising a pair of control elements each corresponding to a pair of differing distinct selectable regions, and wherein receiving a selection of the second distinct selectable region and the fourth distinct selectable region occurs in response to an activation of an associated one of the pair of control elements.

24. The system of claim 23, wherein the pair of control elements includes a pair of physical buttons.

25. The system of claim 23, wherein the pair of control elements includes a pair of virtual buttons.

26. The system of claim 22, further comprising a pair of control elements, each corresponding to one of a pair of differing distinct selectable regions.

27. The system of claim 26, wherein a first of the pair of control elements is associated with receiving a selection of a first of the pair of differing distinct selectable regions, and a second of the pair of control elements is associated with receiving a selection of a second of the pair of differing distinct selectable regions.

* * * * *